(12) United States Patent
Atkisson et al.

(10) Patent No.: US 8,825,937 B2
(45) Date of Patent: Sep. 2, 2014

(54) WRITING CACHED DATA FORWARD ON READ

(71) Applicant: Fusion-io, Inc., Salt Lake City, UT (US)

(72) Inventors: David Atkisson, Draper, UT (US); David Flynn, Sandy, UT (US)

(73) Assignee: Fusion-io, Inc., Salt Lake City, UT (US)

( * ) Notice: Subject to any disclaimer, the term of this patent is extended or adjusted under 35 U.S.C. 154(b) by 0 days.

(21) Appl. No.: 13/776,406

(22) Filed: Feb. 25, 2013

(65) Prior Publication Data

US 2013/0166816 A1    Jun. 27, 2013

Related U.S. Application Data

(63) Continuation of application No. 13/406,287, filed on Feb. 27, 2012.

(60) Provisional application No. 61/446,889, filed on Feb. 25, 2011.

(51) Int. Cl.
*G06F 12/12* (2006.01)
*G06F 12/08* (2006.01)
*G06F 12/02* (2006.01)

(52) U.S. Cl.
CPC .......... *G06F 12/0246* (2013.01); *G06F 12/126* (2013.01); *G06F 12/0895* (2013.01); *G06F 12/0802* (2013.01)
USPC .................... 711/102; 711/118; 711/E12.041

(58) Field of Classification Search
CPC . G06F 12/0815; G06F 12/0866; G06F 12/08; G06F 12/0246; G06F 12/0875; G06F 12/0897; G06F 12/126; G06F 12/0868; G06F 12/02; G06F 12/877; G06F 12/0888; G06F 12/0893; G06F 12/128; G06F 12/0846; G06F 12/12; G06F 12/127; G06F 13/1621; G06F 13/1626; G06F 13/18; G06F 3/061; G06F 3/0688; G06F 17/30132; G06F 1/3275; G06F 2201/885; G06F 2201/87; G06F 17/30902; G06F 1/3325
USPC .................. 711/133, 102, 118, E12.026, 122, 711/E12.024, 103, E12.008, 143, E12.002, 711/E12.021, E12.043, 113, E12.041, 711/E12.084, 165
See application file for complete search history.

(56) References Cited

U.S. PATENT DOCUMENTS

| 4,571,674 A | 2/1986 | Hartung |
| 4,980,861 A | 12/1990 | Herdt et al. |

(Continued)

FOREIGN PATENT DOCUMENTS

| CN | 1771495 | 5/2006 |
| EP | 0747822 | 9/1997 |

(Continued)

OTHER PUBLICATIONS

U.S. Appl. No. 13/931,897, Office Action, Sep. 6, 2013.

(Continued)

*Primary Examiner* — Tuan Thai
*Assistant Examiner* — Edward Waddy, Jr.
(74) *Attorney, Agent, or Firm* — Kunzler Law Group, PC

(57) ABSTRACT

Apparatuses, systems, and methods are disclosed for managing contents of a cache. A method includes receiving a read request for data stored in a non-volatile cache. A method includes determining whether a read request satisfies a frequent read threshold for a cache. A method includes writing data of a read request forward on a sequential log-based writing structure of a cache in response to determining that the read request satisfies a frequent read threshold.

19 Claims, 18 Drawing Sheets

(56) References Cited

U.S. PATENT DOCUMENTS

| | | | |
|---|---|---|---|
| 5,151,905 A | 9/1992 | Yokono et al. | |
| 5,193,184 A | 3/1993 | Belsan et al. | |
| 5,261,068 A | 11/1993 | Gaskins et al. | |
| 5,291,496 A | 3/1994 | Andaleon et al. | |
| 5,307,497 A | 4/1994 | Feigenbaum et al. | |
| 5,313,475 A | 5/1994 | Cromer et al. | |
| 5,325,509 A | 6/1994 | Lautzenheiser | |
| 5,381,528 A | 1/1995 | Brunelle | |
| 5,392,427 A | 2/1995 | Barrett et al. | |
| 5,394,531 A | 2/1995 | Smith | |
| 5,404,485 A | 4/1995 | Ban | |
| 5,438,671 A | 8/1995 | Miles | |
| 5,469,555 A | 11/1995 | Ghosh et al. | |
| 5,499,354 A | 3/1996 | Aschoff et al. | |
| 5,504,882 A | 4/1996 | Chai et al. | |
| 5,535,399 A | 7/1996 | Blitz et al. | |
| 5,551,003 A | 8/1996 | Mattson et al. | |
| 5,553,261 A | 9/1996 | Hasbun et al. | |
| 5,559,988 A | 9/1996 | Durante et al. | |
| 5,561,784 A | 10/1996 | Chen et al. | |
| 5,566,315 A * | 10/1996 | Milillo et al. | 711/113 |
| 5,586,291 A | 12/1996 | Lasker et al. | |
| 5,594,883 A | 1/1997 | Pricer | |
| 5,596,736 A | 1/1997 | Kerns | |
| 5,598,370 A | 1/1997 | Niijima et al. | |
| 5,603,001 A | 2/1997 | Sukegawa et al. | |
| 5,651,133 A | 7/1997 | Burkes | |
| 5,680,579 A | 10/1997 | Young et al. | |
| 5,682,497 A | 10/1997 | Robinson | |
| 5,682,499 A | 10/1997 | Bakke et al. | |
| 5,701,434 A | 12/1997 | Nakagawa | |
| 5,734,861 A | 3/1998 | Cohn et al. | |
| 5,745,671 A | 4/1998 | Hodges | |
| 5,745,792 A | 4/1998 | Jost | |
| 5,754,563 A | 5/1998 | White | |
| 5,754,567 A | 5/1998 | Norman | |
| 5,757,567 A | 5/1998 | Hetzler et al. | |
| 5,787,486 A | 7/1998 | Chin et al. | |
| 5,797,022 A | 8/1998 | Shimotono et al. | |
| 5,798,968 A | 8/1998 | Lee et al. | |
| 5,802,602 A | 9/1998 | Rahman et al. | |
| 5,809,527 A | 9/1998 | Cooper et al. | |
| 5,809,543 A | 9/1998 | Byers et al. | |
| 5,822,759 A | 10/1998 | Treynor | |
| 5,835,935 A | 11/1998 | Estakhri et al. | |
| 5,845,313 A | 12/1998 | Estakhri et al. | |
| 5,845,329 A | 12/1998 | Onishi et al. | |
| 5,860,083 A | 1/1999 | Sukegawa | |
| 5,890,192 A | 3/1999 | Lee et al. | |
| 5,893,086 A | 4/1999 | Schmuck et al. | |
| 5,893,138 A | 4/1999 | Judd et al. | |
| 5,907,856 A | 5/1999 | Estakhri et al. | |
| 5,924,113 A | 7/1999 | Estakhri et al. | |
| 5,930,815 A | 7/1999 | Estakhri et al. | |
| 5,957,158 A | 9/1999 | Volz et al. | |
| 5,960,462 A | 9/1999 | Solomon et al. | |
| 5,961,660 A | 10/1999 | Capps, Jr. et al. | |
| 5,969,986 A | 10/1999 | Wong et al. | |
| 5,996,054 A * | 11/1999 | Ledain et al. | 711/203 |
| 6,000,019 A | 12/1999 | Dykstal et al. | |
| 6,014,724 A | 1/2000 | Jennett | |
| 6,061,511 A | 5/2000 | Marantz et al. | |
| 6,073,232 A | 6/2000 | Kroeker et al. | |
| 6,101,601 A | 8/2000 | Matthews et al. | |
| 6,105,076 A | 8/2000 | Beardsley et al. | |
| 6,128,695 A | 10/2000 | Estakhri et al. | |
| 6,141,249 A | 10/2000 | Estakhri et al. | |
| 6,145,051 A | 11/2000 | Estakhri et al. | |
| 6,170,039 B1 | 1/2001 | Kishida | |
| 6,170,047 B1 | 1/2001 | Dye | |
| 6,172,906 B1 | 1/2001 | Estakhri et al. | |
| 6,173,381 B1 | 1/2001 | Dye | |
| 6,185,654 B1 | 2/2001 | Van Doren | |
| 6,209,088 B1 | 3/2001 | Reneris | |
| 6,223,308 B1 | 4/2001 | Estakhri et al. | |
| 6,230,234 B1 | 5/2001 | Estakhri et al. | |
| 6,236,593 B1 | 5/2001 | Hong et al. | |
| 6,240,040 B1 | 5/2001 | Akaogi et al. | |
| 6,256,642 B1 | 7/2001 | Krueger et al. | |
| 6,278,633 B1 | 8/2001 | Wong et al. | |
| 6,279,069 B1 | 8/2001 | Robinson et al. | |
| 6,289,413 B1 | 9/2001 | Rogers et al. | |
| 6,295,577 B1 * | 9/2001 | Anderson et al. | 711/113 |
| 6,330,688 B1 | 12/2001 | Brown | |
| 6,334,173 B1 | 12/2001 | Won et al. | |
| 6,336,174 B1 | 1/2002 | Li et al. | |
| 6,356,986 B1 | 3/2002 | Solomon et al. | |
| 6,370,631 B1 | 4/2002 | Dye | |
| 6,385,688 B1 | 5/2002 | Mills | |
| 6,385,710 B1 | 5/2002 | Goldman et al. | |
| 6,393,513 B2 | 5/2002 | Estakhri et al. | |
| 6,404,647 B1 | 6/2002 | Minne | |
| 6,412,080 B1 | 6/2002 | Fleming et al. | |
| 6,418,478 B1 | 7/2002 | Ignatius et al. | |
| 6,418,509 B1 | 7/2002 | Yanai et al. | |
| 6,424,872 B1 | 7/2002 | Glanzer et al. | |
| 6,467,022 B1 | 10/2002 | Buckland et al. | |
| 6,477,617 B1 | 11/2002 | Golding | |
| 6,507,911 B1 | 1/2003 | Langford | |
| 6,515,928 B2 | 2/2003 | Sato et al. | |
| 6,516,380 B2 | 2/2003 | Kenchammana-Hoskote et al. | |
| 6,519,185 B2 | 2/2003 | Harari et al. | |
| 6,523,102 B1 | 2/2003 | Dye et al. | |
| 6,532,527 B2 | 3/2003 | Selkirk et al. | |
| 6,552,955 B1 | 4/2003 | Miki | |
| 6,564,285 B1 | 5/2003 | Mills | |
| 6,567,889 B1 | 5/2003 | DeKoning et al. | |
| 6,587,915 B1 | 7/2003 | Kim | |
| 6,601,211 B1 | 7/2003 | Norman | |
| 6,608,793 B2 | 8/2003 | Park et al. | |
| 6,625,685 B1 | 9/2003 | Cho et al. | |
| 6,629,112 B1 | 9/2003 | Shank | |
| 6,633,956 B1 | 10/2003 | Mitani | |
| 6,658,438 B1 | 12/2003 | Moore et al. | |
| 6,671,757 B1 | 12/2003 | Multer et al. | |
| 6,675,349 B1 | 1/2004 | Chen | |
| 6,710,901 B2 | 3/2004 | Pastor | |
| 6,715,027 B2 | 3/2004 | Kim et al. | |
| 6,715,046 B1 | 3/2004 | Shoham et al. | |
| 6,728,851 B1 | 4/2004 | Estakhri et al. | |
| 6,735,546 B2 | 5/2004 | Scheuerlein | |
| 6,745,292 B1 | 6/2004 | Stevens | |
| 6,748,487 B1 | 6/2004 | Takamoto et al. | |
| 6,751,155 B2 | 6/2004 | Gorobets | |
| 6,754,774 B2 | 6/2004 | Gruner et al. | |
| 6,754,800 B2 | 6/2004 | Wong et al. | |
| 6,757,800 B1 | 6/2004 | Estakhri et al. | |
| 6,760,806 B2 | 7/2004 | Jeon | |
| 6,775,185 B2 | 8/2004 | Fujisawa et al. | |
| 6,779,088 B1 | 8/2004 | Benveniste et al. | |
| 6,779,094 B2 | 8/2004 | Selkirk et al. | |
| 6,785,768 B2 | 8/2004 | Peters et al. | |
| 6,785,776 B2 | 8/2004 | Arimilli et al. | |
| 6,785,785 B2 | 8/2004 | Piccirillo et al. | |
| 6,801,979 B1 | 10/2004 | Estakhri | |
| 6,804,755 B2 | 10/2004 | Selkirk et al. | |
| 6,816,917 B2 | 11/2004 | Dicorpo et al. | |
| 6,839,819 B2 | 1/2005 | Martin | |
| 6,845,053 B2 | 1/2005 | Chevalier | |
| 6,845,428 B1 | 1/2005 | Kedem | |
| 6,871,257 B2 | 3/2005 | Conley et al. | |
| 6,877,076 B1 | 4/2005 | Cho et al. | |
| 6,880,049 B2 | 4/2005 | Gruner et al. | |
| 6,883,068 B2 | 4/2005 | Tsirigotis et al. | |
| 6,883,069 B2 | 4/2005 | Yoshida | |
| 6,883,079 B1 | 4/2005 | Priborsky | |
| 6,910,170 B2 | 6/2005 | Choi et al. | |
| 6,912,537 B2 | 6/2005 | Selkirk et al. | |
| 6,912,618 B2 | 6/2005 | Estakhri et al. | |
| 6,922,754 B2 | 7/2005 | Liu et al. | |
| 6,928,505 B1 | 8/2005 | Klingman | |
| 6,938,133 B2 | 8/2005 | Johnson et al. | |
| 6,957,158 B1 | 10/2005 | Hancock et al. | |
| 6,959,369 B1 | 10/2005 | Ashton et al. | |

(56) References Cited

U.S. PATENT DOCUMENTS

| | | |
|---|---|---|
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo et al. |
| 7,010,652 B2 | 3/2006 | Piccirillo et al. |
| 7,010,662 B2 | 3/2006 | Aasheim et al. |
| 7,010,663 B2 | 3/2006 | George et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,057,936 B2 | 6/2006 | Yaegashi et al. |
| 7,058,769 B1 | 6/2006 | Danilak |
| 7,069,380 B2 | 6/2006 | Ogawa et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,130,960 B1 | 10/2006 | Kano |
| 7,143,228 B2 | 11/2006 | Lida et al. |
| 7,149,947 B1 | 12/2006 | MacLellan et al. |
| 7,162,571 B2 | 1/2007 | Kilian et al. |
| 7,167,944 B1 | 1/2007 | Estakhri |
| 7,167,953 B2 | 1/2007 | Megiddo et al. |
| 7,171,536 B2 | 1/2007 | Chang |
| 7,173,852 B2 | 2/2007 | Gorobets |
| 7,177,197 B2 | 2/2007 | Cernea |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,567 B1 | 3/2007 | Tobias |
| 7,197,657 B1 | 3/2007 | Tobias |
| 7,203,815 B2 | 4/2007 | Haswell |
| 7,215,580 B2 | 5/2007 | Gorobets |
| 7,219,197 B2 | 5/2007 | Hatakeyama |
| 7,219,238 B2 | 5/2007 | Saito et al. |
| 7,227,777 B2 | 6/2007 | Roohparvar |
| 7,234,082 B2 | 6/2007 | Lai et al. |
| 7,237,141 B2 | 6/2007 | Fredin |
| 7,243,203 B2 | 7/2007 | Scheuerlein |
| 7,246,179 B2 | 7/2007 | Camara et al. |
| 7,248,691 B1 | 7/2007 | Pandit et al. |
| 7,254,686 B2 | 8/2007 | Islam |
| 7,257,129 B2 | 8/2007 | Lee et al. |
| 7,263,591 B2 | 8/2007 | Estakhri et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voigt et al. |
| 7,328,307 B2 | 2/2008 | Hoogterp |
| 7,337,201 B1 | 2/2008 | Yellin et al. |
| 7,340,558 B2 | 3/2008 | Lee et al. |
| 7,340,566 B2 | 3/2008 | Voth et al. |
| 7,340,581 B2 | 3/2008 | Gorobets et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,370,163 B2 | 5/2008 | Yang et al. |
| 7,392,365 B2 | 6/2008 | Selkirk et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,067 B2 | 10/2008 | Gorobets et al. |
| 7,441,081 B2 | 10/2008 | Humlicek |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,460,432 B2 | 12/2008 | Warner |
| 7,463,521 B2 | 12/2008 | Li |
| 7,464,221 B2 | 12/2008 | Nakamura |
| 7,480,766 B2 | 1/2009 | Gorobets |
| 7,487,235 B2 | 2/2009 | Andrews et al. |
| 7,487,320 B2 | 2/2009 | Bansal et al. |
| 7,500,000 B2 | 3/2009 | Groves et al. |
| 7,523,249 B1 | 4/2009 | Estakhri et al. |
| 7,523,546 B2 | 4/2009 | Vatanparast et al. |
| 7,526,614 B2 | 4/2009 | Van Riel |
| 7,529,905 B2 | 5/2009 | Sinclair |
| 7,536,491 B2 | 5/2009 | Kano et al. |
| 7,549,013 B2 | 6/2009 | Estakhri et al. |
| 7,552,271 B2 | 6/2009 | Sinclair et al. |
| 7,565,569 B2 | 7/2009 | Zohar et al. |
| 7,580,287 B2 | 8/2009 | Aritome |
| 7,620,773 B2 | 11/2009 | Nicholson et al. |
| 7,631,138 B2 | 12/2009 | Gonzalez et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee |
| 7,664,239 B2 | 2/2010 | Groff et al. |
| 7,669,019 B2 | 2/2010 | Fujibayashi |
| 7,676,628 B1 | 3/2010 | Compton et al. |
| 7,689,803 B2 | 3/2010 | Karr et al. |
| 7,702,873 B2 | 4/2010 | Greiss et al. |
| 7,721,059 B2 | 5/2010 | Mylly |
| 7,725,628 B1 | 5/2010 | Phan et al. |
| 7,725,661 B2 | 5/2010 | Liu et al. |
| 7,831,783 B2 | 11/2010 | Pandit |
| 7,853,772 B2 | 12/2010 | Chang et al. |
| 7,856,528 B1 | 12/2010 | Frost et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal |
| 7,908,501 B2 | 3/2011 | Kim et al. |
| 7,913,051 B1 | 3/2011 | Todd et al. |
| 7,917,803 B2 | 3/2011 | Stefanus |
| 7,941,591 B2 | 5/2011 | Aviles |
| 7,944,762 B2 | 5/2011 | Gorobets |
| 7,984,230 B2 | 7/2011 | Nasu et al. |
| 8,019,938 B2 | 9/2011 | Flynn et al. |
| 8,046,526 B2 | 10/2011 | Yeh |
| 8,055,820 B2 | 11/2011 | Sebire |
| 8,127,103 B2 | 2/2012 | Kano |
| 8,135,900 B2 | 3/2012 | Kunimatsu |
| 8,151,082 B2 | 4/2012 | Flynn et al. |
| 8,156,281 B1 | 4/2012 | Grosner et al. |
| 8,171,204 B2 | 5/2012 | Chow |
| 8,214,583 B2 | 7/2012 | Sinclair |
| 8,402,069 B2 * | 3/2013 | Rajaram et al. ............... 707/821 |
| 8,463,846 B2 | 6/2013 | Girbal |
| 8,489,817 B2 | 7/2013 | Flynn et al. |
| 2001/0013087 A1 * | 8/2001 | Ronstrom .................. 711/133 |
| 2002/0053009 A1 | 5/2002 | Selkirk et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0133743 A1 | 9/2002 | Oldfield et al. |
| 2002/0161855 A1 | 10/2002 | Manczak et al. |
| 2002/0181134 A1 | 12/2002 | Bunker et al. |
| 2002/0194451 A1 | 12/2002 | Mukaida et al. |
| 2003/0028704 A1 | 2/2003 | Mukaida et al. |
| 2003/0061296 A1 | 3/2003 | Craddock et al. |
| 2003/0065866 A1 | 4/2003 | Spencer |
| 2003/0070034 A1 | 4/2003 | Friedmann et al. |
| 2003/0093741 A1 | 5/2003 | Argon et al. |
| 2003/0131182 A1 | 7/2003 | Kumar et al. |
| 2003/0140051 A1 | 7/2003 | Fujiwara |
| 2003/0145230 A1 | 7/2003 | Chiu et al. |
| 2003/0149753 A1 | 8/2003 | Lamb |
| 2003/0163630 A1 | 8/2003 | Aasheim et al. |
| 2003/0163633 A1 | 8/2003 | Aasheim |
| 2003/0163663 A1 | 8/2003 | Aasheim et al. |
| 2003/0165076 A1 | 9/2003 | Gorobets et al. |

(56) References Cited

U.S. PATENT DOCUMENTS

| | | |
|---|---|---|
| 2003/0198084 A1 | 10/2003 | Fujisawa et al. |
| 2004/0003002 A1 | 1/2004 | Adelmann |
| 2004/0034750 A1 | 2/2004 | Horn |
| 2004/0059870 A1 | 3/2004 | Ash et al. |
| 2004/0064647 A1 | 4/2004 | DeWhitt et al. |
| 2004/0093463 A1 | 5/2004 | Shang |
| 2004/0103245 A1 | 5/2004 | Fukusawa et al. |
| 2004/0117586 A1 | 6/2004 | Estakhri et al. |
| 2004/0139282 A1 | 7/2004 | Yoshioka et al. |
| 2004/0148360 A1 | 7/2004 | Mehra et al. |
| 2004/0158589 A1* | 8/2004 | Liang et al. ............ 707/206 |
| 2004/0186946 A1 | 9/2004 | Lee |
| 2004/0225719 A1 | 11/2004 | Kisley et al. |
| 2004/0236761 A1 | 11/2004 | Both |
| 2004/0268359 A1 | 12/2004 | Hanes |
| 2005/0002263 A1 | 1/2005 | Iwase et al. |
| 2005/0015539 A1 | 1/2005 | Horii |
| 2005/0018527 A1 | 1/2005 | Gorobets |
| 2005/0027951 A1 | 2/2005 | Piccirillo et al. |
| 2005/0055497 A1 | 3/2005 | Estakhri et al. |
| 2005/0076107 A1 | 4/2005 | Goud et al. |
| 2005/0080994 A1 | 4/2005 | Cohen et al. |
| 2005/0097278 A1 | 5/2005 | Hsu et al. |
| 2005/0120177 A1 | 6/2005 | Black |
| 2005/0132148 A1 | 6/2005 | Arimilli et al. |
| 2005/0132259 A1 | 6/2005 | Emmot et al. |
| 2005/0141313 A1 | 6/2005 | Gorobets |
| 2005/0144361 A1 | 6/2005 | Gonzales et al. |
| 2005/0149618 A1 | 7/2005 | Cheng |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0235132 A1 | 10/2005 | Karr et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0257213 A1 | 11/2005 | Chu et al. |
| 2005/0262150 A1 | 11/2005 | Krishnaswamy |
| 2005/0268037 A1 | 12/2005 | Hama et al. |
| 2005/0273476 A1 | 12/2005 | Wertheimer |
| 2005/0276092 A1 | 12/2005 | Hansen et al. |
| 2005/0283489 A1 | 12/2005 | Shiozawa et al. |
| 2006/0004955 A1 | 1/2006 | Ware |
| 2006/0020744 A1 | 1/2006 | Sinclair |
| 2006/0026339 A1 | 2/2006 | Rostampour |
| 2006/0059326 A1 | 3/2006 | Aasheim |
| 2006/0064556 A1 | 3/2006 | Aasheim et al. |
| 2006/0075057 A1 | 4/2006 | Gildea et al. |
| 2006/0085471 A1 | 4/2006 | Rajan et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0106990 A1 | 5/2006 | Benhase et al. |
| 2006/0107097 A1 | 5/2006 | Zohar et al. |
| 2006/0129778 A1 | 6/2006 | Clark et al. |
| 2006/0136657 A1 | 6/2006 | Rudelic et al. |
| 2006/0136779 A1 | 6/2006 | Lee et al. |
| 2006/0143396 A1 | 6/2006 | Cabot et al. |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0184736 A1 | 8/2006 | Benhase et al. |
| 2006/0190552 A1 | 8/2006 | Henze et al. |
| 2006/0224849 A1 | 10/2006 | Islam et al. |
| 2006/0230295 A1 | 10/2006 | Schumacher et al. |
| 2006/0236061 A1 | 10/2006 | Koclanes |
| 2006/0248387 A1 | 11/2006 | Nicholson et al. |
| 2006/0265624 A1 | 11/2006 | Moshayedi |
| 2006/0265635 A1 | 11/2006 | Hummler |
| 2006/0265636 A1 | 11/2006 | Hummler |
| 2006/0848387 | 11/2006 | Nicholson |
| 2006/0294336 A1* | 12/2006 | Gibble et al. ............ 711/171 |
| 2007/0016699 A1 | 1/2007 | Minami et al. |
| 2007/0028053 A1 | 2/2007 | Shet et al. |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0061515 A1 | 3/2007 | Kano |
| 2007/0073975 A1 | 3/2007 | Yong et al. |
| 2007/0074092 A1 | 3/2007 | Dammann et al. |
| 2007/0088666 A1 | 4/2007 | Saito |
| 2007/0118676 A1 | 5/2007 | Kano et al. |
| 2007/0118713 A1 | 5/2007 | Guterman |
| 2007/0124474 A1 | 5/2007 | Margulis |
| 2007/0124540 A1 | 5/2007 | Van Riel et al. |
| 2007/0136555 A1 | 6/2007 | Sinclair et al. |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0147356 A1 | 6/2007 | Gorobets |
| 2007/0150689 A1 | 6/2007 | Pandit et al. |
| 2007/0156998 A1 | 7/2007 | Gorobets |
| 2007/0162830 A1 | 7/2007 | Stek et al. |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0204197 A1 | 8/2007 | Yokokawa |
| 2007/0204199 A1 | 8/2007 | Chung et al. |
| 2007/0208790 A1 | 9/2007 | Reuter et al. |
| 2007/0230253 A1 | 10/2007 | Kim |
| 2007/0233455 A1 | 10/2007 | Zimmer et al. |
| 2007/0233937 A1 | 10/2007 | Coulson et al. |
| 2007/0233938 A1 | 10/2007 | Cho et al. |
| 2007/0234021 A1 | 10/2007 | Ruberg et al. |
| 2007/0245094 A1 | 10/2007 | Lee et al. |
| 2007/0245217 A1 | 10/2007 | Valle |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata |
| 2007/0266037 A1 | 11/2007 | Terry |
| 2007/0271468 A1 | 11/2007 | McKenney et al. |
| 2007/0271572 A1 | 11/2007 | Gupta et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005465 A1 | 1/2008 | Matthews |
| 2008/0005748 A1 | 1/2008 | Mathew |
| 2008/0010395 A1 | 1/2008 | Mylly et al. |
| 2008/0016301 A1 | 1/2008 | Chen |
| 2008/0022187 A1 | 1/2008 | Bains |
| 2008/0034153 A1 | 2/2008 | Lee et al. |
| 2008/0043769 A1 | 2/2008 | Hirai |
| 2008/0052377 A1 | 2/2008 | Light |
| 2008/0052477 A1 | 2/2008 | Lee |
| 2008/0052483 A1 | 2/2008 | Rangarajan et al. |
| 2008/0059752 A1 | 3/2008 | Serizawa |
| 2008/0059820 A1 | 3/2008 | Vaden et al. |
| 2008/0080243 A1 | 4/2008 | Edahiro et al. |
| 2008/0082724 A1 | 4/2008 | Dunlop et al. |
| 2008/0091876 A1 | 4/2008 | Fujibayashi et al. |
| 2008/0098159 A1 | 4/2008 | Song et al. |
| 2008/0104344 A1 | 5/2008 | Shimozono et al. |
| 2008/0117686 A1 | 5/2008 | Yamada |
| 2008/0120303 A1 | 5/2008 | Selkirk et al. |
| 2008/0120469 A1 | 5/2008 | Kornegay |
| 2008/0123211 A1 | 5/2008 | Chng et al. |
| 2008/0126507 A1 | 5/2008 | Wilkinson |
| 2008/0126700 A1 | 5/2008 | El-Batal et al. |
| 2008/0126704 A1* | 5/2008 | Ulrich et al. ............ 711/114 |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0141043 A1 | 6/2008 | Flynn |

(56) References Cited

U.S. PATENT DOCUMENTS

| | | |
|---|---|---|
| 2008/0163007 A1* | 7/2008 | Shaeffer et al. ............... 714/52 |
| 2008/0183965 A1 | 7/2008 | Shiga et al. |
| 2008/0183968 A1 | 7/2008 | Huang |
| 2008/0195801 A1 | 8/2008 | Cheon et al. |
| 2008/0201535 A1 | 8/2008 | Hara |
| 2008/0205286 A1 | 8/2008 | Li et al. |
| 2008/0209090 A1 | 8/2008 | Kano et al. |
| 2008/0229045 A1 | 9/2008 | Qi |
| 2008/0229046 A1 | 9/2008 | Raciborski |
| 2008/0235443 A1 | 9/2008 | Chow et al. |
| 2008/0243966 A1 | 10/2008 | Croisettier |
| 2008/0244181 A1 | 10/2008 | Walz et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0266973 A1 | 10/2008 | Sekar et al. |
| 2008/0276040 A1 | 11/2008 | Moritoki |
| 2008/0294847 A1 | 11/2008 | Maruyama et al. |
| 2008/0313364 A1 | 12/2008 | Flynn et al. |
| 2009/0037651 A1* | 2/2009 | Gorobets ............... 711/103 |
| 2009/0043952 A1 | 2/2009 | Estakhri et al. |
| 2009/0070526 A1 | 3/2009 | Tetrick |
| 2009/0070541 A1 | 3/2009 | Yochai |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0089518 A1 | 4/2009 | Hobbet |
| 2009/0091996 A1 | 4/2009 | Chen et al. |
| 2009/0125650 A1 | 5/2009 | Sebire |
| 2009/0125700 A1 | 5/2009 | Kisel |
| 2009/0144496 A1 | 6/2009 | Kawaguchi |
| 2009/0150599 A1 | 6/2009 | Bennett |
| 2009/0150605 A1 | 6/2009 | Flynn et al. |
| 2009/0150621 A1 | 6/2009 | Lee |
| 2009/0150641 A1 | 6/2009 | Flynn et al. |
| 2009/0157956 A1 | 6/2009 | Kano |
| 2009/0172250 A1 | 7/2009 | Allen et al. |
| 2009/0204750 A1 | 8/2009 | Estakhri et al. |
| 2009/0210636 A1 | 8/2009 | Karamcheti |
| 2009/0216944 A1 | 8/2009 | Gill et al. |
| 2009/0228637 A1 | 9/2009 | Moon et al. |
| 2009/0235017 A1 | 9/2009 | Estakhri et al. |
| 2009/0248763 A1 | 10/2009 | Rajan |
| 2009/0276588 A1 | 11/2009 | Murase |
| 2009/0276654 A1 | 11/2009 | Butterworth et al. |
| 2009/0287887 A1 | 11/2009 | Matsuki |
| 2009/0292861 A1 | 11/2009 | Kanevsky et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi |
| 2010/0017556 A1 | 1/2010 | Chin et al. |
| 2010/0023674 A1 | 1/2010 | Aviles |
| 2010/0023676 A1 | 1/2010 | Moon et al. |
| 2010/0023682 A1 | 1/2010 | Lee et al. |
| 2010/0030946 A1 | 2/2010 | Kano et al. |
| 2010/0076936 A1 | 3/2010 | Rajan |
| 2010/0077194 A1 | 3/2010 | Zhao |
| 2010/0082890 A1* | 4/2010 | Heo et al. ............... 711/103 |
| 2010/0091535 A1 | 4/2010 | Sommer et al. |
| 2010/0095059 A1 | 4/2010 | Kisley et al. |
| 2010/0102999 A1 | 4/2010 | Lee et al. |
| 2010/0106917 A1 | 4/2010 | Ruberg et al. |
| 2010/0153617 A1* | 6/2010 | Miroshnichenko et al. ...... 711/6 |
| 2010/0169542 A1 | 7/2010 | Sinclair |
| 2010/0174870 A1 | 7/2010 | Banerjee |
| 2010/0205231 A1 | 8/2010 | Cousins |
| 2010/0205335 A1 | 8/2010 | Phan et al. |
| 2010/0205368 A1 | 8/2010 | Gregg et al. |
| 2010/0211737 A1 | 8/2010 | Flynn |
| 2010/0217948 A1 | 8/2010 | Mason et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0318744 A1 | 12/2010 | Benhase et al. |
| 2011/0016260 A1 | 1/2011 | Lomelino et al. |
| 2011/0022819 A1 | 1/2011 | Post et al. |
| 2011/0029728 A1 | 2/2011 | Popovski et al. |
| 2011/0047437 A1 | 2/2011 | Flynn |
| 2011/0055458 A1 | 3/2011 | Kuehne |
| 2011/0060861 A1* | 3/2011 | Warren ............... 711/103 |
| 2011/0072207 A1* | 3/2011 | Jin et al. ............... 711/112 |
| 2011/0093687 A1* | 4/2011 | Chen et al. ............... 712/225 |
| 2011/0099323 A1 | 4/2011 | Syu |
| 2011/0119441 A1 | 5/2011 | Peake et al. |
| 2011/0182119 A1 | 7/2011 | Strasser et al. |
| 2011/0191534 A1 | 8/2011 | Ash et al. |
| 2011/0214011 A1 | 9/2011 | Grube et al. |
| 2011/0219169 A1 | 9/2011 | Zhang et al. |
| 2011/0225347 A1* | 9/2011 | Goss et al. ............... 711/103 |
| 2011/0258391 A1 | 10/2011 | Atkisson et al. |
| 2011/0258512 A1 | 10/2011 | Flynn et al. |
| 2011/0314071 A1 | 12/2011 | Johnson et al. |
| 2012/0084489 A1 | 4/2012 | Gorobets et al. |
| 2012/0102298 A1 | 4/2012 | Sengupta et al. |
| 2012/0117304 A1 | 5/2012 | Worthington et al. |

FOREIGN PATENT DOCUMENTS

| | | |
|---|---|---|
| EP | 1100001 | 10/2000 |
| EP | 1418502 | 10/2003 |
| EP | 1607868 | 2/2004 |
| EP | 1814039 | 12/2006 |
| GB | 0123416.0 | 9/2001 |
| JP | 04-242848 | 8/1992 |
| JP | 08-153014 | 11/1996 |
| JP | 20000259525 | 9/2000 |
| JP | 2009122850 | 6/2009 |
| KR | 2010022811 | 3/2010 |
| WO | 9419746 | 9/1994 |
| WO | 9518407 | 7/1995 |
| WO | 9612225 | 4/1996 |
| WO | 131512 | 5/2001 |
| WO | 0131512 | 5/2001 |
| WO | 0201365 | 1/2002 |
| WO | 02067529 | 8/2002 |
| WO | 2004099989 | 11/2004 |
| WO | 2005010773 | 2/2005 |
| WO | 2005103878 | 11/2005 |
| WO | 2006050455 | 5/2006 |
| WO | 2006062511 | 6/2006 |
| WO | 2006065626 | 6/2006 |
| WO | 2008070173 | 6/2008 |
| WO | 2008070796 | 6/2008 |
| WO | 2008070799 | 6/2008 |
| WO | 2008073421 | 6/2008 |
| WO | 2010036757 | 4/2010 |
| WO | 2011106394 | 9/2011 |

OTHER PUBLICATIONS

U.S. Appl. No. 12/877,971, Notice of Allowance, Sep. 20, 2013.
U.S. Appl. No. 12/711,113, Office Action, Jun. 6, 2012.
U.S. Appl. No. 13/118,237, Office Action, Apr. 22, 2013.
U.S. Appl. No. 13/607,486, Office Action, Jan. 10, 2013.
U.S. Appl. No. 13/607,486, Notice of Allowance, Jul. 11, 2013.
U.S. Appl. No. 12/711,113, Office Action, Nov. 23, 2013.
Application No. PCT/US2012/021094, International Search Report, Sep. 24, 2012.

(56) References Cited

OTHER PUBLICATIONS

Shu, Frank, "Data Set Management Commands Proposal for ATA8-ACS2", Microsoft Corporation, Sep. 5, 2007, pp. 8, Revision 2, Redmond, Washington, US.
"Non-Volatile Memory Host Controller Interface (NVMHCI) Working Group Announces 1.0 Specification", NVMHCI Working Group, Apr. 15, 2008, pp. 2, http://www.businesswire.com/news/home/20080415005169/en/Non-Vola. . . .
"Open NAND Flash Interface Specification", Hynix Semiconductor, et al., Feb. 27, 2008, pp. 174, Revision 2.0.
U.S. Appl. No. 12/986,117, Notice of Allowance, Jun. 5, 2013.
U.S. Appl. No. 12/986,117, Office Action, Apr. 4, 2013.
U.S. Appl. No. 13/107,820, Notice of Allowance, Jul. 31, 2013.
U.S. Appl. No. 13/107,820, Office Action, Feb. 22, 2013.
Shimpi, Anand Lal, "The SSD Anthology Understanding SSDs and New Drives", Revised Mar. 18, 2009, pp. 59.
Walp, David, "System Integrated Flash Storage", Microsoft Corporation, 2008, pp. 35.
Probert, David B., "Windows Kernel Internals Cache Manager", Microsoft Corporation, May 13, 2010, pp. 48.
Application No. PCT/US2011/046005, International Search Report and Written Opinion, Apr. 6, 2012.
Bulletproof Memory for RAID Servers, Part 1-3, agigatech com, 2009, pp. 12, http://agigatech.com/blog/bulletproof-memory-for-raid-servers-part-1/3.
Wu, Michael, "eNVy: A Non-Volatile, Main Memory Storage System", 1994, pp. 12, ASPLOS VI-10/94 San Jose, California, US.
IBM, "Method to Improve Reliability of SSD Arrays", Prior Art Database, Nov. 5, 2009, www.ip.com.
"Method for Fault Tolerance in Nonvolatile Storage", Prior Art Database, Feb. 3, 2005, www.ip.com.
"ioDrive-Frequently Asked Questions", Clustered Storage Solutions: Products, 2008, http://www.clusteredstorage.com/clustered_storage_solutions.html.
U.S. Appl. No. 11/952,123 Office Action, Oct. 5, 2010.
Windows PC Accelerators, XP-002476842, Microsoft Corporation, Nov. 30, 2006, pp. 1-16.
Application No. PCT/US2007/025049, International Search Report, May 14, 2008.
Application No. PCT/US2007/025049, International Preliminary Report on Patentability, Mar. 11, 2009.
"White Paper: S2A9550 Overview", DataDirect Networks, www.datadirectnet.com, 2007, 17 pages.
"Pivot3 RAIGE Cluster: Technology Overview", White Paper, www.pivot3,com, Jun. 2007, pp. 1-17.
Plank, James S. "A Tutorial on Reed-Solomon coding for Fault Tolerance in RAID-like Systems", Dept of Computer Science, Univ. of Tennessee, Sep. 1997, pp. 995-1012.
Morgenstern, David, "Is There a Flash Memory RAID in Your Future?", Nov. 2006.
"File System Primer", http://wiki.novell.com/index.php?File_System_Primer, Jul. 2006.
Singer, Dan, "Implementing MLC NAND Flash for Cost-Effective, High-Capacity Memory", M-systems, White Paper, Sep. 2003.
"Introduction to Samsungs Linux Flash File System"—RFS, Samsung Electronics, Nov. 2006.
Mesnier, Ganger, Riedel, "Object-Based Storage", IEEE Comm Magazine, Aug. 2003.
Hensbergen, "Dynamic Policy Disk Caching for Storage Networking", Nov. 2006.
Application No. 200780050973.4, Office Action, Jan. 26, 2011.
Application No. 07867661.6, Office Action, Oct. 6, 2011.
"Design and Use Considerations for NAND Flash Memory", Micron TN-29-17:NAND Flash Memory Introduction, 2006, pp. 8, Boise, Idaho, US.
"Am29DL322D/323D/324D", Spansion Data Sheet, Oct. 7, 2004, 58 pages, Pub. No. 21534, Revision D, Amendment 7, Fujitsu.
Ismail, Ari, "Performance Boosting and Workload Isolation in Storage Area Networks with SANCache", Proceedings of the 23rd IEEE/14th NASA Goddard Conference on Mass Storage Systems and Technologies, May 2006, pp. 263-273, Hewlett Packard Laboratories.
"ASPMC-660 Rugged IDE Flash Disk PMC Module", http://www.asinegroup.com/products/aspmc660.html.
Bandulet, Christian, "Object-Based Storage Devices", Sun Developer Network Site, Jul. 2007, http://developers.sun.com/solaris/articles/osd.html.
"BiTMICRO Introduces E-Disk PMC Flash Disk Module", Military & Aerospace Electronics East, 2004, http://www.bitmicro.com/press_news_releases_20040518_prt.php.
Casey, Michael, "Solid State File—Caching for Performance and Scalability", SolidData, http://www.storagesearch.com/3dram.html.
Casey, Michael, "Disk I/O Performance Scaling: the File Caching Solution", Solid Data Systems, Inc., pp. 8, Paper #528.
"EMC Virtual Infrastructure for Microsoft Applications—Data Center Solution Enabled by EMC Symmetrix V-Max and VMware ESX3. 5", White Paper, Apr. 2009, pp. 30.
Feresten, Paul, "NETAPP Thin Provisioning: Better for Business", NETAPP White Paper, Mar. 2007, pp. 11, WP-7017-0307.
Gill, Binny S., "WOW: Wise Ordering for Writes—Combining Spatial and Temporal Locality in Non-Volatile Caches", IBM Almaden Research Center, {binnyg.dmodha}@us.ibm.com.
"How NTFS Works", Mar. 28, 2003, pp. 34.
"Information Technology—SCSI Object-Based Storage Device Commands (OSD)", American National Standards Institute, Jul. 30, 2004, pp. 187, Project T10/1355-D, Revision 10, New York, New York, US.
"Intel Turbo Memory with User Pinning", Intel NAND Storage Solutions, 2008, pp. 4.
Johnson, Michael K., "An Introduction to Block Device Drivers", Jan. 1, 1995, pp. 6.
Kawaguchi, Atsuo, "A Flash-Memory Based File System", Advanced Research Laboratory, Hitachi, Ltd., Hatoyama, Saitama, JP.
Leventhal, Adam, "Flash Storage Memory", Communications of the ACM, Jul. 2008, pp. 47-51, vol. 61, No. 7.
U.S. Appl. No. 11/952,091, Notice of Allowance, Jun. 28, 2012.
U.S. Appl. No. 11/92,091, Office Action, Feb. 7, 2012.
U.S. Appl. No. 11/952,123, Notice of Allowance, Jan. 19, 2011.
U.S. Appl. No. 11/952,123, Notice of Allowance, Apr. 8, 2011.
PCT/US2007/025048, International Preliminary Report on Patentability, Jun. 18, 2009.
Application No. 200780050974.9, Office Action, May 23, 2012.
PCT/US2007/086683, International Preliminary Report on Patentability, Nov. 5, 2009.
PCT/US2007/086683, International Search Report and Written Opinion, Oct. 26, 2009.
U.S. Appl. No. 13/600,077, Office Action, Jan. 7, 2013.
U.S. Appl. No. 12/098,427, Notice of Allowance, Sep. 27, 2012.
U.S. Appl. No. 12/098,427, Office Action, Jun. 19, 2012.
U.S. Appl. No. 12/098,427, Office Action, Aug. 5, 2011.
PCT/US2007/086686, International Preliminary Report on Patentability, Dec. 16, 2008.
PCT/US2007/086686, International Search Report and Written Opinion, Apr. 28, 2008.
U.S. Appl. No. 12/981,394, Notice of Allowance, Oct. 12, 2011.
U.S. Appl. No. 12/981,394, Notice of Allowance, Feb. 6, 2012.
U.S. Appl. No. 12/885,285, Notice of Allowance, Feb. 4, 2013.
U.S. Appl. No. 13/209,007, Notice of Allowance, Apr. 4, 2013.
PCT/US2011/047659, International Preliminary Report on Patentability, Feb. 21, 2013.
PCT/US2011/047659, International Search Report and Written Opinion, Apr. 9, 2012.
"Actel Fusion FPGAs Supporting Intelligent Peripheral Management Interface (IPMI) Applications", Actel, Oct. 2006, pp. 17, Application Note AC286.
"Adaptive Replacement Cache", Wikipedia, last modified Apr. 2010, pp. 3, http://en.wikipedia.org/wiki/Adaptive-replacement_cache.
Benjauthrit, Boonsieng, "An Overview of Error Control Codes for Data Storage", International NonVolatile Memory Technology Conference, 1996, pp. 7.

(56) References Cited

OTHER PUBLICATIONS

Cardarilli, G. C., "Design of Fault-tolerant Solid State Mass Memory", Consortium ULISSE, Nov. 1999, pp. 9, Italy.
"High Speed, Elevated Board Stacking", Samtec, 2007, pp. 1.
PCT/US2009/039572, International Preliminary Report on Patentability, Oct. 14, 2010.
PCT/US2009/039572, International Search Report and Written Opinion, Jul. 30, 2009.
"ECC Algorithm", Samsung Electronics, Mar. 2005, pgs.
Application No. PCT/US2007/025048, International Search Report and Written Opinion, May 27, 2008.
Gill, Binny S., "STOW: Spatially and Temporally Optimized Write Caching Algorithm", IBM, 2009, pp. 21.
Sears, Russell, "Stasis: Flexible Transactional Storage", OSDI, 2006, pp. 16, http://www.cs.berkely.edu/~sears/stasis/.
Seltzer, Margo Ilene, "File System Performance and Transaction Support", A. B. Harvard/Radcliffe College, 1992, pp. 131.
Seltzer, Margo I., "Transaction Support in a Log-Structured File System", Harvard University Division of Applied Sciences, Jan. 1, 1993, pp. 8.
"Data Management Software (DMS) for AMD Simultaneous Read/Write Flash Memory Devices", Spansion, Jul. 2003, pp. 10, Publication No. 22274, Revision A, Amendment 0, Issue Date Nov. 1, 1998.
Spillane, Richard P., "Enabling Transactional File Access via Lightweight Kernel Extensions", USENIX Association, published Feb. 25, 2009, pp. 14, 7th USENIX Conference on File and Storage Technologies.
Tal, Arie, "NAND vs. NOR Flash Technology", M-Systems, posted on Feb. 1, 2002, pp. 3, Newark, California, US.
Bandulet, Christian, "The Storage Evolution: From Blocks, Files and Objects to Object Storage Systems", SNIA, 2008, pp. 63.
Application No. PCT/US2009/039626, International Preliminary Report on Patentability, Oct. 21, 2010.
Porter, Donald E., "Operating System Transactions", SOSP'09, Oct. 11-14, 2009, pp. 20, 2009 ACM 978-1-60558-752-3/09/10, Big Sky, Montana, US.
Arpaci-Dusseau, Andrea C., "Removing the Costs of Indirection in Flash-based SSDs with Nameless Writes", University of Wisconsin-Madison and Microsoft Research, Jun. 2010, pp. 5.
Application No. 200780050974.9, Office Action, Jul. 27, 2011.
Gill, Binny S., "STOW: Spatially and Temporally Optimized Write Caching Algorithm", IBM Corporation, 2009, pp. 21.
Application No. PCT/US2009/039673, International Preliminary Report on Patentability, Oct. 21, 2010.
U.S. Appl. No. 12/877,971, Office Action, Apr. 18, 2013.
U.S. Appl. No. 12/877,971, Office Action, Sep. 27, 2012.
Application No. 200780050989.5, Office Action, Dec. 31, 2010.
Application No. 200780050989.5, Office Action, Dec. 19, 2011.
Application No. 200780050989.5, Final Office Action, Jul. 20, 2012.
Application No. PCT/US2012/026790, International Preliminary Report on Patentability, Sep. 6, 2013.
U.S. Appl. No. 13/204,551, Office Action, Jan. 13, 2012.
U.S. Appl. No. 13/204,551, Notice of Allowance, Jul. 12, 2012.
"T10/05-270r0 SAT—Write Same (10) command (41h)", Netapp. Com, Jul. 7, 2005, pp. 2.
Application No. 200780050983.8, Office Action, May 18, 2011.
Application No. PCT/US2007/086687, International Search Report and Written Opinion, May 9, 2008.
Mesnier, Mike, "Object-Based Storage", IEEE Communications Magazine, Aug. 2003, pp. 7, Storage Area Networking.
Application No. PCT/US2007/086687, International Preliminary Report on Patentability, Mar. 18, 2009.
U.S. Appl. No. 12/879,004, Office Action, Feb. 25, 2013.
Application No. PCT/US2010/048325, International Preliminary Report on Patentability, Jun. 1, 2011.
Application No. PCT/2010/048325, International Search Report, Jun. 1, 2011.
Application No. PCT/2010/048325, Written Opinion, Jun. 1, 2011.
Application No. PCT/US2011/025885, International Search Report and Written Opinion, Sep. 28, 2011.
Application No. PCT/US2011/025885, International Preliminary Report on Patentability, Sep. 7, 2012.
Application No. PCT/US2007/086688, International Preliminary Report on Patentability, Mar. 16, 2009.
Application No. PCT/US2007/086688, International Search Report and Written Opinion, Apr. 28, 2008.
Application No. PCT/US2012/026790, International Search Report and Written Opinion, Dec. 27, 2012.
U.S. Appl. No. 11/952,109, Office Action, Nov. 29, 2011.
U.S. Appl. No. 11/952,109, Office Action, May 1, 2012.
U.S. Appl. No. 11/952,109, Office Action, Jul. 1, 2011.
U.S. Appl. No. 11/952,109, Office Action, Mar. 17, 2011.
Application No. 200780050970.0, Office Action, Oct. 28, 2010.
Application No. 200780050970.0, Office Action, Jun. 29, 2011.
Application No. 200780050970.0, Office Action, Jan. 5, 2012.
Application No. PCT/US20071086691, International Preliminary Report on Patentability, Feb. 16, 2009.
Application No. PCT/US2007/086691, International Search Report and Written Opinion, May 8, 2008.
U.S. Appl. No. 11/952,113, Office Action, Dec. 15, 2010.
U.S. Appl. No. 11/952,1113, Office Action, Mar. 6, 2012.
Application No. 200780051020.X, Office Action, Jul. 6, 2011.
Application No. 200780051020.X, Office Action, Nov. 7, 2011.
Application No. 200780051020.X, Office Action, Nov. 11, 2010.
Application No. 07865345.8, Examination Report, Jan. 30, 2012.
Application No. 07865345.8, Examination Report, Nov. 17, 2010.
Application No. PCT/US2007/086701, International Preliminary Report on Patentability, Mar. 16, 2009.
Application No. PCT/US2007/086701, International Search Report and Written Opinion, Jun. 5, 2008.
U.S. Appl. No. 13/607,486, Office Action, May 2, 2013.
U.S. Appl. No. 60/625,495, Application, Nov. 6, 2004.
U.S. Appl. No. 60/718,768, Application, Aug. 20, 2005.
U.S. Appl. No. 60/797,127, Application, May 3, 2006.
Application No. PCT/US2011/065927, International Preliminary Report on Patentability, Aug. 28, 2012.
Application No. PCT/US2011/065927, International Search Report, Aug. 28, 2012.
Application No. PCT/US2011/065927, Written Opinion, Aug. 28, 2012.
"NAND Flash Memories and Programming NAND Flash Memories Using ELNEC Device Programmers", ELNEC, Aug. 2008, pp. 44, Application Note, Version 2.10/08.2008, an_elnec_nand_flash, version 2.10.
Wright, Charles P., "Extending ACID Semantics to the File System", IBM, May 2007, pp. 40, ACM Transactions on Storage, vol. 3, No. 2.
Gal, Eran, "A Transactional Flash File System for Microcontrollers", USENIX Annual Technical Conference, 2005, pp. 16.
Garfinkel, Simson L., "One Big File is Not Enough", Harvard University, Jun. 28, 2006, pp. 31.
Gutmann, Peter, "Secure Deletion of Data from Magnetic and Solid-State Memory", Sixth USENIX Security Symposium, Jul. 22-25, 1996, pp. 18, San Jose, California, US.
Application No. PCT/US2009/039626, International Search Report and Written Opinion, Aug. 27, 2009.
"Hamming Codes for NAND Flash Memory Devices", Micron TN-29-08: Technical Note, 2005, pp. 7, Boise, Idaho, US.
"The Advantages of Object-Based Storage—Secure, Scalable, Dynamic Storage Devices", Seagate Research Technology Paper, Apr. 2005, pp. 7, Scotts Valley, California, US.
Wacha, Rosie, "Improving RAID-Based Storage Systems with Flash Memory", First Annual ISSDM/SRL Research Symposium, Oct. 20-21, 2009, pp. 21.
Wang, Feng, "OBFS: A File System for Object-based Storage Devices", 21st IEEE/12th NASA Goddard Conference on Mass Storage Systems and Technologies, Apr. 2004, pp. 18, College Park, Maryland, US.
U.S. Appl. No. 11/952,123, Notice of Allowance, May 5, 2011.
"DataDirect Storage Systems Selected for NCSA Cluster", HPCWire, Aug. 15, 2003, pp. 2, vol. 12, No. 32, http://www.hpcwire.com/hpcwire/hpcwireWWW/03/0815/105731.html.

(56) References Cited

OTHER PUBLICATIONS

"EEL-6892-Virtual Computers", Lecture 18, http://www.acis.ufl.edu/ming/lectures.
"Hystor: Making SSDs the 'Survival of the Fittest' in High-Performance Storage Systems", pp. 14.
"Introducing Box Hill's Fibre Box", Box Hill Systems Corporation, Jan. 16, 1997, p. 5.
jZip A Free WinZip Alternative, First JZip by Greg Kowal, 2012.
Application No. PCT/US2012/022244, International Search Report and Written Opinion, Jul. 30, 2012.
Yerrick, Damian, "Block Device", downloaded Mar. 1, 2010, pp. 3, http://www.pineight.com/ds/block/.
Weber, Ralph O., "Information Technology—SCSI Object-Based Storage Device Commands (OSD)", Seagate Technology, Jul. 30, 2004, p. 171, Project T10/1355-D, Revision 10, Reference No. ISO/IEC 14776-391 : 200x ANSI INCITS.***200x.
Makulowich, John, "Strategies, Players and Emerging Markets", Washington Technology, Jun. 26, 1997, pp. 6, http://washingtontechnology.com/Articles/1997/06/26/Strategies-Players-and-Emerging-Ma....
Casey, Michael, "SAN Cache: SSD in the SAN", Computer Technology Review's Storage Inc., Quarter 1, 2000, pp. 4, SolidData, Santa Clara, California, US.
Application No. PCT/US2010/048321, International Search Report and Written Opinion, Apr. 28, 2011.
Dan, Raz, "Implementing MLC NAND Flash for Cost-Effective, High-Capacity Memory", M-Systems White Paper, Sep. 2003, pp. 13, 91-SR-014-02-8L, REV 1.1, Newark, California, US.
U.S. Appl. No. 12/885,285, Notice of Allowance, Oct. 17, 2012.
Whyte, Barry, "IBM SAN Volume Controller 4.2.1 Cache Partitioning", Redpaper IBM Corporation, Apr. 30, 2008, pp. 12, REDP-4426-00, Poughkeepsie, New York, US.
Woodhouse, David, "JFFS: The Journalling Flash File System", Red Hat, Inc., pp. 12, dwmw2@cambridge.redhat.com.
"Hynix 48-GB Flash MCP", Slashdot, pp. 17, http://hardware.slashdot.org/article.pl?sid=07/09/06/146218&from=rss.
"Sybase: Maximizing Performance through Solid State File-Caching", SolidData Best Practices Guide, May 2000, pp. 4, Santa Clara, California, US.
Megiddo, Nimrod, "ARC: A Self-Tuning, Low Overhead Replacement Cache", Proceedings of FAST '03: 2nd USENIX Conference on File and Storage Technologies, Mar. 31-Apr. 2, 2003, pp. 17, http://www.usenix.org.
Application No. PCT/US2012/023373, International Search Report and Written Opinion, Jul. 30, 2012.
Volos, Haris, "Mnemosyne: Lightweight Persistent Memory", ASPLOS'11, Mar. 5-11, 2011, Newport Beach, California, US.
"NAND Flash 101: An Introduction to NAND Flash and How to Design It in to Your Next Product", Micron, Nov. 2006, pp. 27, Boise, Idaho, US.
Coburn, Joel, "NV-Heaps: Making Persistent Objects Fast and Safe with Next-Generation, Non-Volatile Memories", ASPLOS'11, Mar. 5-11, 2011, pp. 13, Newport Beach, California, US.
Brandon, Daniel, "Sparse Matrices in CS Education", Consortium for Computing Sciences in Colleges, 2009, pp. 6.
Rosenblum, Mendel, "The Design and Implementation of a Log-structured File System", 1992.
Stokes, Jon, "Intel's New Flash Tech to Bring Back Turbo Memory, For Real", http://arstechnica.com/hardware/news/2009/09/intels-new-flash-tech-to-b....
U.S. Appl. No. 13/776,389, Office Action, Dec. 16, 2013.
U.S. Appl. No. 13/406,287, Pre-Office Action, Dec. 16, 2013.
U.S. Appl. No. 13/406,287, Office Action, Jun. 2, 2014.
U.S. Appl. No. 13/776,389, Final Office Action, Jun. 20, 2014.

* cited by examiner

WRITING CACHED DATA FORWARD ON READ

CROSS-REFERENCE TO RELATED APPLICATIONS

This application is a continuation of and claims priority to U.S. patent application Ser. No. 13/406,287 entitled "APPARATUS, SYSTEM, AND METHOD FOR MANAGING CONTENTS OF A CACHE" and filed on Feb. 27, 2012 for David Atkisson et al., which claims priority to U.S. Provisional Patent Application No. 61/446,889 entitled "APPARATUS, SYSTEM, AND METHOD FOR MANAGING CONTENTS OF A CACHE" and filed on Feb. 25, 2011 for David Atkisson et al., both of which are incorporated herein by reference in their entirety.

FIELD

The subject matter disclosed herein relates to caching data and more particularly relates to managing contents of a cache.

BACKGROUND

Description of the Related Art

A cache device typically has a smaller storage capacity than the backing store with which the cache device is associated. As a cache device fills with cached data, certain cached data may be evicted to free up room to cache additional data. If data is evicted from a cache device, a subsequent request for the evicted data yields a cache miss. Evicting the wrong data from a cache device can increase the number of cache misses and decrease the efficiency of the cache device.

In cache devices that store both read data and write data, available storage capacity is also shared between read data and write data. A static division of a cache device between read data and write data can also be an inefficient use of the cache device if the static division does not reflect a user's working data set of read data and write data.

BRIEF SUMMARY

Methods are presented for managing contents of a cache. In one embodiment, a method includes receiving a read request for data stored in a non-volatile cache. A method, in another embodiment, includes determining whether a read request satisfies a frequent read threshold for a cache. In a further embodiment, a method includes writing data of a read request forward on a sequential log-based writing structure in response to determining that the read request satisfies a frequent read threshold.

Apparatuses for managing contents of a cache are presented. In one embodiment, a read request module is configured to cause data stored in non-volatile storage media of a cache to be read into volatile memory in response to a read request for the data. In a further embodiment, a read pool module is configured to determine whether a read request satisfies a frequent read threshold. A write forward module, in one embodiment, is configured to cause data to be copied from volatile memory to an append point of a sequential log-based writing structure of a cache in response to a read pool module determining that the read request satisfies a frequent read threshold.

In one embodiment, an apparatus includes means for receiving a read request for data stored in a non-volatile cache. In a further embodiment, an apparatus includes means for reading data from a storage region of a non-volatile storage medium of a cache into volatile memory to service a read request. An apparatus, in another embodiment, includes means for writing data from volatile memory to a different storage region of a cache in response to determining that a read request for the data satisfies a frequent read threshold for the cache.

Systems are presented for managing contents of a cache. In one embodiment, a computing system has a memory and one or more processors for managing contents of a cache. A storage controller, in certain embodiments, is for a non-volatile solid-state storage device. In a further embodiment, a non-volatile solid-state storage device is in communication with a processor over one or more communications buses. A cache controller, in another embodiment, is in communication with a storage controller. A cache controller, in one embodiment, includes a storage request module configured to monitor read requests received for the cache controller. In another embodiment, a cache controller includes a read request module configured to cause data stored in a non-volatile storage medium of a solid-state storage device to be read into volatile memory in response to a storage request module monitoring a read request for the data. A cache controller, in a further embodiment, includes a read pool module configured to determine whether a read request satisfies a frequent read threshold. In one embodiment, a cache controller includes a write forward module configured to cause data of a read request to be preserved from a volatile memory to a different region of the non-volatile storage medium without an additional read transaction with a non-volatile storage medium in response to a read pool module determining that a read request satisfies a frequent read threshold.

Computer program products comprising a computer readable storage medium storing computer usable program code executable to perform operations for managing contents of a cache are presented. In one embodiment, an operation includes monitoring read requests received for a non-volatile cache. In a further embodiment, an operation includes determining whether a read request satisfies a frequent read threshold for a cache. An operation, in another embodiment, includes causing data of a read request to be copied to an append point of a sequential log-based writing structure of a cache in response to determining that the read request satisfies a frequent read threshold.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
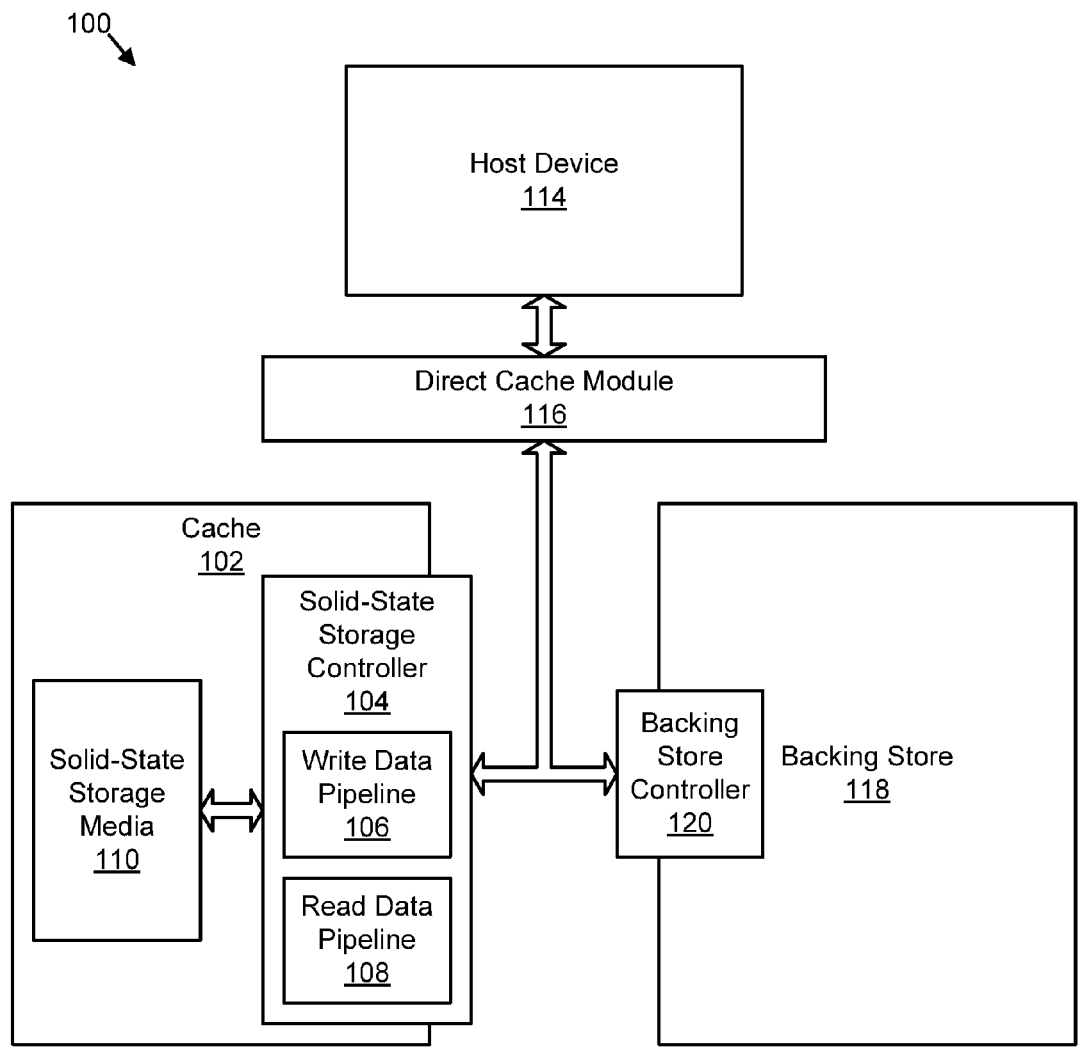
FIG. 1A is a schematic block diagram illustrating one embodiment of a system for managing contents of a cache in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on or in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Caching System

FIG. 1A depicts one embodiment of a system 100 for managing contents of a cache 102. The system 100, in the depicted embodiment, includes a cache 102 a host device 114, a direct cache module 116, and a backing store 118. The cache 102, in the depicted embodiment, includes a solid-state storage controller 104, a write data pipeline 106, a read data pipeline 108, and a solid-state storage media 110. In general, the system 100 caches data for the backing store 118 in the cache 102 and the direct cache module 116 manages contents of the cache 102 to maximize a read hit rate of the cache 102, a dirty write hit rate of the cache 102, or the like.

The cache 102 has a finite physical storage capacity for caching data for the backing store 118. In certain embodiments, the direct cache module 116 tracks data of the cache 102 in one or more data pools, such as a read pool, a write pool, a clean pool, a dirty pool, a recent read pool, a frequent read pool, and/or other data pools to optimize the use of the finite storage capacity of the cache 102. A data pool, as used herein, is a set of data related by one or more data characteristics. In one embodiment, data pools of the cache 102 only include data that the cache 102 currently stores, and the data pools are sized to fit within a storage capacity of the cache 102. In a further embodiment, the data pools of the cache 102 may include data that the backing store 118 stores that the cache 102 does not store, but for which the direct cache module 116 maintains metadata, and the data pools may have a combined size that is greater than a storage capacity of the cache 102. The data pools of the cache 102, in certain embodiments, may span both data that the cache 102 stores and data for which the direct cache module 116 maintains metadata but that the cache 102 does not store. The direct cache module 116, in one embodiment, tracks data pools as counts or tallies of different types of data, such as read data, write data, clean data, dirty data, recent data, frequent data, and the like.

The direct cache module 116 may manage contents of the cache 102 by dynamically adjusting sizes of various data pools of the cache 102 to match a user's working data set of read data and write data. In various embodiments, the direct cache module 116 adjusts sizes of data pools by selectively destaging data from the cache 102 to the backing store 118, selectively evicting data from the cache 102, and/or by otherwise adjusting membership in data pools of the cache 102. For example, in one embodiment, the direct cache module 116 monitors storage requests for the cache 102 and adjusts data pool sizes to maximize a read hit rate and a dirty write hit rate for the cache 102.

In the depicted embodiment, the system 100 includes a single cache 102. In another embodiment, the system 100 may include two or more caches 102. For example, in various embodiments, the system 100 may minor cached data between several caches 102, may virtually stripe cached data across multiple caches 102, or otherwise cache data in more than one cache 102. In general, the cache 102 serves as a read and/or a write cache for the backing store 118 and the backing store 118 is a storage device that serves as a backing store for the cache 102. In one embodiment, the cache 102 operates in a write-back mode and the direct cache module 116 destages cached write data to the backing store 118 opportunistically after caching the write data in the cache 102. In certain embodiments, the cache 102 may operate, at least temporarily, in another mode, such as a write-back mode, a write-around mode, or the like, and the direct cache module 116 may write data to the backing store 118 substantially simultaneously with caching the data in the cache 102 or without caching the data in the cache 102.

In the depicted embodiment, the cache 102 is embodied by a non-volatile, solid-state storage device, with a solid-state storage controller 104 and non-volatile, solid-state storage media 110. The non-volatile, solid-state storage media 110 may include flash memory, nano random access memory ("nano RAM or NRAM"), magneto-resistive RAM ("MRAM"), dynamic RAM ("DRAM"), phase change RAM ("PRAM"), racetrack memory, memristor memory, nanocrystal wire-based memory, silicon-oxide based sub-10 nanometer process memory, graphene memory, silicon-oxide-nitride-oxide-silicon ("SONOS") memory, resistive random-access memory ("RRAM"), programmable metallization cell ("PMC"), conductive-bridging RAM ("CBRAM"), or the like. Embodiments of the cache 102 that include a solid-state storage controller 104 and solid-state storage media 110 are described in more detail with respect to FIGS. 2 and 3. In further embodiments, the cache 102 may include other types of non-volatile and/or volatile data storage, such as dynamic RAM ("DRAM"), static RAM ("SRAM"), magnetic data storage, optical data storage, and/or other data storage technologies.

The cache 102, in one embodiment, stores or preserves data in a log. The log, in a further embodiment, comprises a sequential, append-only log-based structure, or the like. The cache 102 stores at least a portion of the log on the solid-state storage media 110. The cache 102, in certain embodiments, may store a portion of the log, metadata for the log, or the like in volatile memory, such as RAM, and may store at least enough data of the log in the solid-state storage media 110 to recreate the log structure after an improper shutdown or other failure. In one embodiment, the log includes a head at an append point and a tail at an end of the log with the oldest data (data written earliest in time). In certain embodiments, the log may include multiple append points, multiple sub-logs, or the like. In a further embodiment, the cache 102 may store or preserve data in multiple logs.

In general, the cache 102 caches data for the backing store 118. The backing store 118, in one embodiment, is a backing store associated with the cache 102 and/or with the direct cache module 116. The backing store 118 may include a hard disk drive, an optical drive with optical media, a magnetic tape drive, or another type of storage device. In one embodiment, the backing store 118 may have a greater data storage capacity than the cache 102. In another embodiment, the backing store 118 may have a higher latency, a lower throughput, or the like, than the cache 102.

The backing store 118 may have a higher latency, a lower throughput, or the like due to properties of the backing store 118 itself or due to properties of a connection to the backing store 118. For example, in one embodiment, the cache 102 and the backing store 118 may each include non-volatile, solid-state storage media 110 with similar properties, but the backing store 118 may be in communication with the host device 114 over a data network, while the cache 102 may be directly connected to the host device 114, causing the backing store 118 to have a higher latency relative to the host 114 than the cache 102.

In one embodiment, the cache 102 and/or the backing store 118 are in communication with a processor of the host device 114 over one or more communications buses. In the depicted embodiment, the cache 102 and the backing store 118 are in communication with the host device 114 through the direct cache module 116. The cache 102 and/or the backing store 118, in one embodiment, may be direct attached storage ("DAS") of the host device 114. DAS, as used herein, is data storage that is connected to a device, either internally or externally, without a storage network in between.

In one embodiment, the cache 102 and/or the backing store 118 are internal to the host device 114 and are connected using a system bus, such as a peripheral component interconnect express ("PCI-e") bus, a Serial Advanced Technology Attachment ("SATA") bus, or the like. In another embodiment, the cache 102 and/or the backing store 118 may be external to the host device 114 and may be connected using a universal serial bus ("USB") connection, an Institute of Electrical and Electronics Engineers ("IEEE") 1394 bus ("FireWire"), an external SATA ("eSATA") connection, or the like. In other embodiments, the cache 102 and/or the backing store 118 may be connected to the host device 114 using a peripheral component interconnect ("PCI") express bus using external electrical or optical bus extension or bus networking solution such as Infiniband or PCI Express Advanced Switching ("PCIe-AS"), or the like.

In various embodiments, the cache 102 and/or the backing store 118 may be in the form of a dual-inline memory module ("DIMM"), a daughter card, or a micro-module. In another embodiment, the cache 102 and/or the backing store 118 may be elements within a rack-mounted blade. In another embodiment, the cache 102 and/or the backing store 118 may be contained within packages that are integrated directly onto a higher level assembly (e.g. mother board, lap top, graphics processor). In another embodiment, individual components comprising the cache 102 and/or the backing store 118 are integrated directly onto a higher level assembly without intermediate packaging.

In the depicted embodiment, the cache 102 includes one or more solid-state storage controllers 104 with a write data pipeline 106 and a read data pipeline 108, and a solid-state storage media 110, which are described in more detail below with respect to FIGS. 2 and 3. The backing store 118, in the depicted embodiment, includes a backing store controller 120. The solid-state storage controller 104 and the backing store controller 120, in certain embodiments, may receive storage requests, perform management functions and the like for the cache 102 and the backing store 118, or perform other functions. The solid-state storage controller 104 and/or the backing store controller 120, in various embodiments, may comprise one or more device drivers installed on the host device 114, logic hardware or firmware of the cache 102 and/or the backing store 118, a combination of one or more device drivers and logic hardware or firmware, or the like.

In a further embodiment, instead of being connected directly to the host device 114 as DAS, the cache 102 and/or the backing store 118 may be connected to the host device 114 over a data network. For example, the cache 102 and/or the backing store 118 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 114 and the cache 102 and/or the backing store 118.

In one embodiment, at least the cache 102 is connected directly to the host device 114 as a DAS device. In a further embodiment, the cache 102 is directly connected to the host device 114 as a DAS device and the backing store 118 is directly connected to the cache 102. For example, the cache 102 may be connected directly to the host device 114, and the backing store 118 may be connected directly to the cache 102 using a direct, wire-line connection, such as a PCI express bus, an SATA bus, a USB connection, an IEEE 1394 connection, an eSATA connection, a proprietary direct connection, an external electrical or optical bus extension or bus networking solution such as Infiniband or PCIe-AS, or the like. One of skill in the art, in light of this disclosure, will recognize other arrangements and configurations of the host device 114, the cache 102, and the backing store 118 suitable for use in the system 100.

The system 100 includes the host device 114 in communication with the cache 102 and the backing store 118 through the direct cache module 116. A host device 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like.

In the depicted embodiment, the host device 114 is in communication with the direct cache module 116. The direct cache module 116, in general, receives or otherwise detects read and write requests from the host device 114 directed to the backing store 118 and manages the caching of data in the cache 102 and destaging of cached data to the backing store 118. In one embodiment, the direct cache module 116 comprises a software application, file system filter driver, combination of filter drivers, or the like on the host device 114.

Figure 1B:
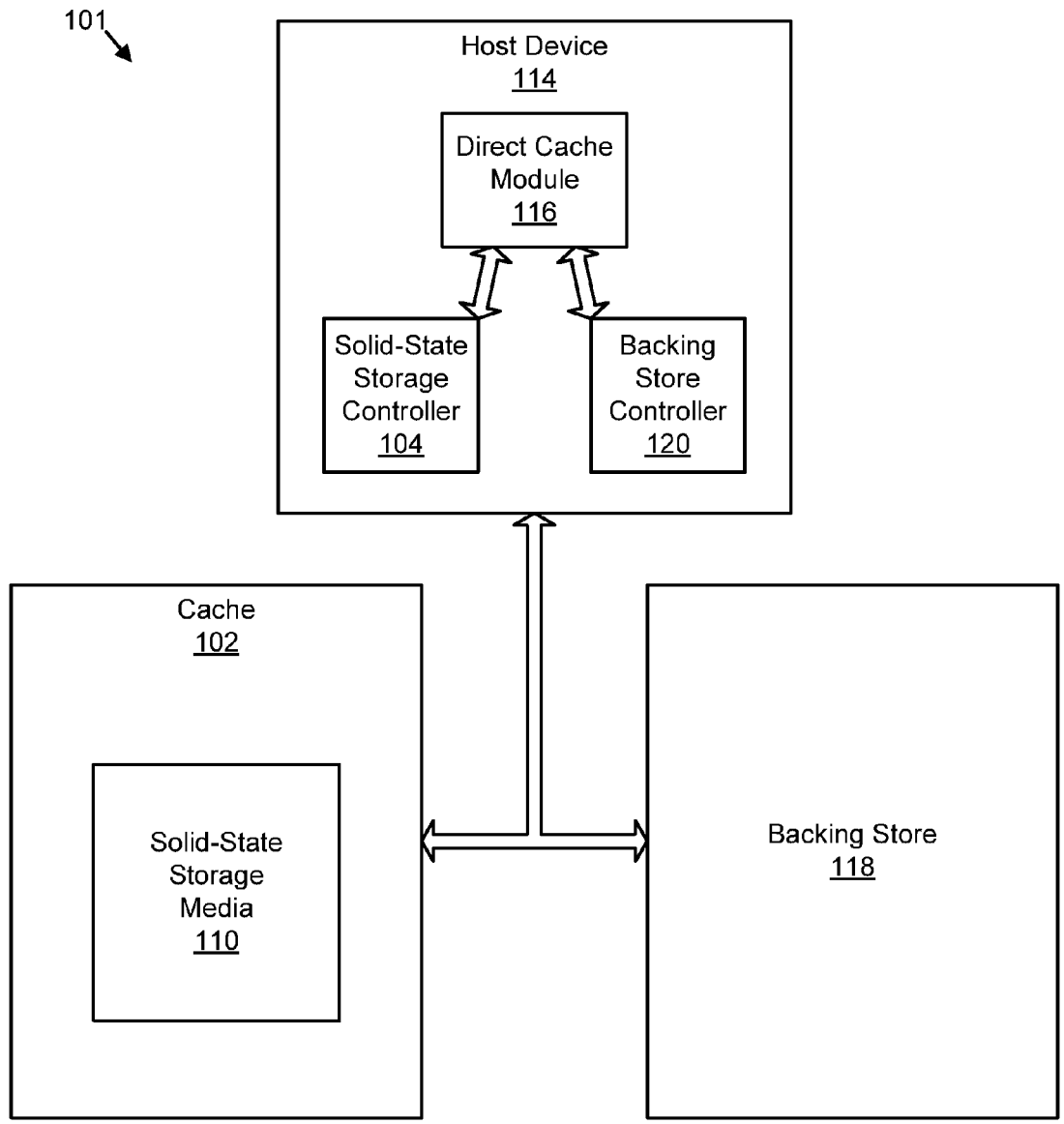
FIG. 1B is a schematic block diagram illustrating another embodiment of a system for managing contents of a cache in accordance with the present invention.

In another embodiment, the direct cache module 116 comprises one or more storage controllers, such as the solid-state storage controller 104 of the cache 102 and/or the backing store controller 120 of the backing store 118. FIG. 1B depicts a system 101 that is substantially similar to the system 100 of FIG. 1A, but with the storage controller 104 and the backing store controller 120 integrated with the direct cache module 116 as device drivers and/or filter drivers on the host device 114. The storage controller 104 and the backing store controller 120 may be integrated with the direct cache module 116 as device drivers on the host device 114, as dedicated hardware logic circuits or firmware of the cache 102 and/or the backing store 118, as a combination of one or more device drivers and dedicated hardware, or the like. In a further embodiment, the direct cache module 116 comprises a combination of one or more software drivers of the host device 114 and one or more storage controllers, or the like. The direct cache module 116, in various software, hardware, and combined software and hardware embodiments, may generally be referred to as a cache controller.

In one embodiment, the host device 114 loads one or more device drivers for the cache 102 and/or the backing store 118 and the direct cache module 116 communicates with the one or more device drivers on the host device 114. As described above, in certain embodiments, the solid-state storage controller 104 of the cache 102 and/or the backing store controller 120 may comprise device drivers on the host device 114. In another embodiment, the direct cache module 116 may communicate directly with a hardware interface of the cache 102 and/or the backing store 118. In a further embodiment, the direct cache module 116 may be integrated with the cache 102 and/or the backing store 118.

In one embodiment, the cache 102 and/or the backing store 118 have block device interfaces that support block device commands. For example, the cache 102 and/or the backing store 118 may support the standard block device interface, the ATA interface standard, the ATA Packet Interface ("ATAPI") standard, the small computer system interface ("SCSI") standard, and/or the Fibre Channel standard which are maintained by the International Committee for Information Technology Standards ("INCITS"). The direct cache module 116 may interact with the cache 102 and/or the backing store 118 using block device commands to read, write, and clear (or trim) data. In one embodiment, the solid-state storage controller 104 and/or the backing store controller 120 provide block device interfaces to the direct cache module 116.

In one embodiment, the direct cache module 116 serves as a proxy for the backing store 118, receiving read and write requests for the backing store 118 directly from the host device 114. The direct cache module 116 may represent itself to the host device 114 as a storage device having a capacity similar to and/or matching the capacity of the backing store 118. The direct cache module 116, upon receiving a read request or write request from the host device 114, in one embodiment, fulfills the request by caching write data in the cache 102 or by retrieving read data from one of the cache 102 and the backing store 118 and returning the read data to the host device 114.

Data caches are typically organized into cache lines which divide up the physical capacity of the cache, these cache lines may be divided into several sets. A cache line is typically larger than a block or sector of a backing store associated with a data cache, to provide for prefetching of additional blocks or sectors and to reduce cache misses and increase the cache hit rate. Data caches also typically evict an entire, fixed size, cache line at a time to make room for newly requested data in satisfying a cache miss. Data caches may be direct mapped, fully associative, N-way set associative, or the like.

In a direct mapped cache, each block or sector of a backing store has a one-to-one mapping to a cache line in the direct mapped cache. For example, if a direct mapped cache has T number of cache lines, the backing store associated with the direct mapped cache may be divided into T sections, and the direct mapped cache caches data from a section exclusively in the cache line corresponding to the section. Because a direct mapped cache always caches a block or sector in the same location or cache line, the mapping between a block or sector address and a cache line can be a simple manipulation of an address of the block or sector.

In a fully associative cache, any cache line can store data from any block or sector of a backing store. A fully associative cache typically has lower cache miss rates than a direct mapped cache, but has longer hit times (i.e., it takes longer to locate data in the cache) than a direct mapped cache. To locate data in a fully associative cache, either cache tags of the entire cache can be searched, a separate cache index can be used, or the like.

In an N-way set associative cache, each sector or block of a backing store may be cached in any of a set of N different cache lines. For example, in a 2-way set associative cache, either of two different cache lines may cache data for a sector or block. In an N-way set associative cache, both the cache and the backing store are typically divided into sections or sets, with one or more sets of sectors or blocks of the backing store assigned to a set of N cache lines. To locate data in an N-way set associative cache, a block or sector address is typically mapped to a set of cache lines, and cache tags of the set of cache lines are searched, a separate cache index is searched, or the like to determine which cache line in the set is storing data for the block or sector. An N-way set associative cache typically has miss rates and hit rates between those of a direct mapped cache and those of a fully associative cache.

The cache 102, in one embodiment, may have characteristics of both a directly mapped cache and a fully associative cache. A logical address space of the cache 102, in one embodiment, is directly mapped to an address space of the backing store 118 while the physical storage media 110 of the cache 102 is fully associative with regard to the backing store 118. In other words, each block or sector of the backing store 118, in one embodiment, is directly mapped to a single logical address of the cache 102 while any portion of the physical storage media 110 of the cache 102 may store data for any block or sector of the backing store 118. In one embodiment, a logical address is an identifier of a block of data and is distinct from a physical address of the block of data, but may be mapped to the physical address of the block of data. Examples of logical addresses, in various embodiments, include logical block addresses ("LBAs"), logical identifiers, object identifiers, pointers, references, and the like.

Instead of traditional cache lines, in one embodiment, the cache 102 has logical or physical cache data blocks associated with logical addresses that are equal in size to a block or sector of the backing store 118. In a further embodiment, the cache 102 caches ranges and/or sets of ranges of blocks or sectors for the backing store 118 at a time, providing dynamic or variable length cache line functionality. A range or set of ranges of blocks or sectors, in a further embodiment, may include a mixture of contiguous and/or noncontiguous blocks. For example, the cache 102, in one embodiment, supports block device requests that include a mixture of contiguous and/or noncontiguous blocks and that may include "holes" or intervening blocks that the cache 102 does not cache or otherwise store.

In one embodiment, one or more groups of logical addresses of the cache 102 are directly mapped to corresponding logical addresses of the backing store 118. Directly mapping logical addresses of the cache 102 to logical addresses of the backing store 118, in one embodiment, provides a one-to-one relationship between the logical addresses of the backing store 118 and the logical addresses of the cache 102. Directly mapping logical addresses of the cache 102 to the logical or physical address space of the backing store 118, in one embodiment, precludes the use of an extra translation layer in the direct cache module 116, such as the use of cache tags, a cache index, the maintenance of a translation data structure, or the like. In one embodiment, while the logical address space of the cache 102 may be larger than a logical address space of the backing store 118, both logical address spaces include at least logical addresses 0-N. In a further embodiment, at least a portion of the logical address space of the cache 102 represents or appears as the logical address space of the backing store 118 to a client, such as the host device 114.

Alternatively, in certain embodiments where physical blocks or sectors of the backing store 118 are directly accessible using physical addresses, at least a portion of logical addresses in a logical address space of the cache 102 may be mapped to physical addresses of the backing store 118. At least a portion of the logical address space of the cache 102, in one embodiment, may correspond to the physical address space of the backing store 118. At least a subset of the logical addresses of the cache 102, in this embodiment, is directly mapped to corresponding physical addresses of the backing store 118.

In one embodiment, the logical address space of the cache 102 is a sparse address space that is either as large as or is larger than the physical storage capacity of the cache 102. This allows the backing store 118 to have a larger storage capacity than the cache 102, while maintaining a direct mapping between the logical addresses of the cache 102 and logical or physical addresses of the backing store 118. The sparse logical address space may be thinly provisioned, in one embodiment. In a further embodiment, as the direct cache module 116 writes data to the cache 102 using logical addresses, the cache 102 directly maps the logical addresses to distinct physical addresses or locations on the solid-state storage media 110 of the cache 102, such that the physical addresses or locations of data on the solid-state storage media 110 are fully associative with the backing store 118.

In one embodiment, the direct cache module 116 and/or the cache 102 use the same mapping structure to map addresses (either logical or physical) of the backing store 118 to logical addresses of the cache 102 and to map logical addresses of the cache 102 to locations/physical addresses of a block or sector (or range of blocks or sectors) on the physical solid-state storage media 110. In one embodiment, using a single mapping structure for both functions eliminates the need for a separate cache map, cache index, cache tags, or the like, decreasing access times of the cache 102.

Once the direct cache module 116 has destaged dirty data from the cache 102, the data is clean and the direct cache module 116 may clear, trim, replace, expire, and/or evict the data from the cache 102 and the physical addresses and associated physical storage media 110 may be freed to store data for other logical addresses. In one embodiment, as described above, the solid state storage controller 104 stores data at physical addresses using a log-based, append-only writing structure such that data evicted from the cache 102 or overwritten by a subsequent write request invalidates other data in the log. Consequently, a garbage collection or grooming process recovers the physical capacity of the invalid data in the log. One embodiment of the log-based, append only writing structure is logically ring-like data structure, as new data is appended to the log-based writing structure, previously used physical capacity is reused in a circular, theoretically infinite manner.

Solid-State Storage Device

Figure 2:
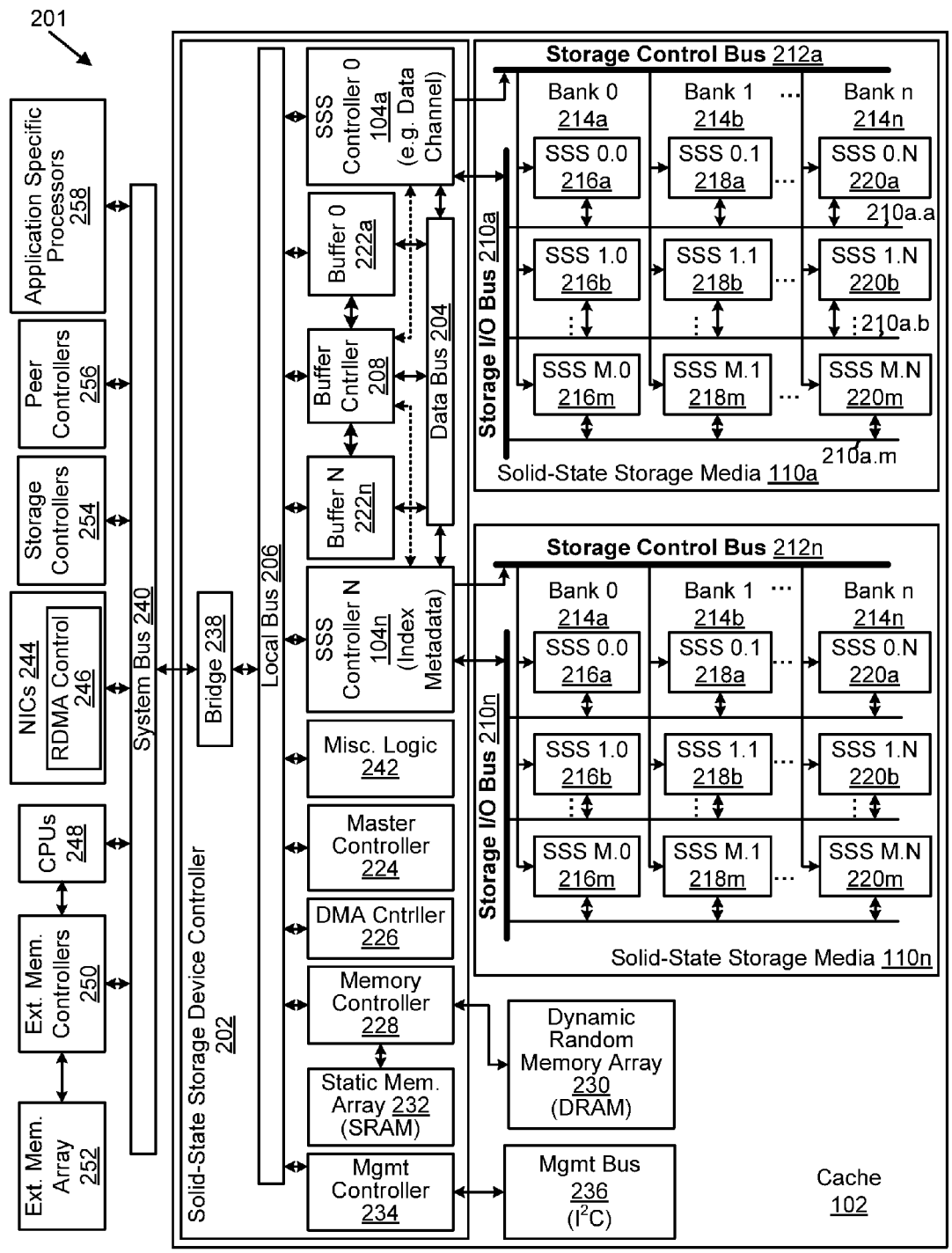
FIG. 2 is a schematic block diagram illustrating one embodiment of a solid-state storage device controller in a cache device in accordance with the present invention.

FIG. 2 is a schematic block diagram illustrating one embodiment 201 of a solid-state storage device controller 202 that includes a write data pipeline 106 and a read data pipeline 108 in a cache 102. The solid-state storage device controller 202 may be embodied as hardware, as software, or as a combination of hardware and software.

The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a column of solid-state storage elements 216, 218, 220 is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. In one embodiment, a solid-state storage media 110a includes twenty solid-state storage elements per bank (e.g. 216a-m in bank 214a, 218 a-m in bank 214b, 220a-m in bank 214n, where m=22) with eight banks (e.g. 214a-n where n=8) and a solid-state storage media 110n includes two solid-state storage elements (e.g. 216a-m where m=2) per bank 214 with one bank 214a. There is no requirement that two solid-state storage media 110a, 110n have the same number of solid-state storage elements and/or same number of banks 214. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements for multiple banks that share a common storage I/O bus 210a row (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216a-220a, each in a separate bank 214a-n. In another embodiment, 20 storage elements (e.g. SSS 0.0-SSS 20.0) 216 form a virtual bank 214a so that each of the eight virtual banks has 20 storage elements (e.g. SSS0.0-SSS 20.8). Data is sent to the solid-state storage media 110 over the storage I/O bus 210 to all storage elements of a particular group of storage elements (SSS 0.0-SSS 0.8) 216a, 218a, 220a. The storage control bus 212a is used to select a particular bank (e.g. Bank-0 214a) so that the data received over the storage I/O bus 210 connected to all banks 214 is written just to the selected bank 214a.

In certain embodiments, the storage control bus 212 and storage I/O bus 210 are used together by the solid-state controller 104 to communicate addressing information, storage element command information, and data to be stored. Those of skill in the art recognize that this address, data, and command information may be communicated using one or the other of these buses 212, 210, or using separate buses for each type of control information. In one embodiment, addressing information, storage element command information, and storage data travel on the storage I/O bus 210 and the storage control bus 212 carries signals for activating a bank as well as identifying whether the data on the storage I/O bus 210 lines constitute addressing information, storage element command information, or storage data.

For example, a control signal on the storage control bus 212 such as "command enable" may indicate that the data on the storage I/O bus 210 lines is a storage element command such as program, erase, reset, read, and the like. A control signal on the storage control bus 212 such as "address enable" may indicate that the data on the storage I/O bus 210 lines is addressing information such as erase block identifier, page identifier, and optionally offset within the page within a particular storage element. Finally, an absence of a control signal on the storage control bus 212 for both "command enable" and "address enable" may indicate that the data on the storage I/O bus 210 lines is storage data that is to be stored on the storage element at a previously addressed erase block, physical page, and optionally offset within the page of a particular storage element.

In one embodiment, the storage I/O bus 210 is comprised of one or more independent I/O buses ("IIOBa-m" comprising 210a.a-m, 210n.a-m) wherein the solid-state storage elements within each row share one of the independent I/O buses across each solid-state storage element 216, 218, 220 in parallel so that all banks 214 are accessed simultaneously. For example, one IIOB 210a.a of the storage I/O bus 210 may access a first solid-state storage element 216a, 218a, 220a of each bank 214a-n simultaneously. A second IIOB 210a.b of the storage I/O bus 210 may access a second solid-state storage element 216b, 218b, 220b of each bank 214a-n simultaneously. Each row of solid-state storage elements 216, 218, 220 is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220 using either of the chip select signal and the chip enable signal. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. A typical page is 2000 bytes ("2 kB"). In one example, a solid-state storage element (e.g. SSS0.0) includes two registers and can program two pages so that a two-register solid-state storage element has a page size of 4 kB. A single bank 214a of 20 solid-state storage elements 216a-m would then have an 80 kB capacity of pages accessed with the same address going out of the storage I/O bus 210.

This group of pages in a bank 214 of solid-state storage elements 216, 218, 220 of 80 kB may be called a logical or virtual page. Similarly, an erase block of each storage element 216a-m of a bank 214a may be grouped to form a logical erase block. In one embodiment, erasing a logical erase block causes a physical erase block ("PEB") of each storage element 216a-m of a bank 214a to be erased. In one embodiment, an erase block of pages within a solid-state storage element 216, 218, 220 is erased when an erase command is received within a solid-state storage element 216, 218, 220. In another embodiment, a single physical erase block on each storage element (e.g. SSS M.N) collectively forms a logical erase block for the solid-state storage media 110a. In such an embodiment, erasing a logical erase block comprises erasing an erase block at the same address within each storage element (e.g. SSS M.N) in the solid-state storage media 110a. Whereas the size and number of erase blocks, pages, planes, or other logical and physical divisions within a solid-state storage element 216, 218, 220 may change over time with advancements in technology, it is to be expected that many embodiments consistent with new configurations are possible and are consistent with the general description herein.

In one embodiment, data is written in packets to the storage elements. The solid-state controller 104 uses the storage I/O bus 210 and storage control bus 212 to address a particular bank 214, storage element 216, 218, 220, physical erase block, physical page, and optionally offset within a physical page for writing the data packet. In one embodiment, the solid-state controller 104 sends the address information for the data packet by way of the storage I/O bus 210 and signals that the data on the storage I/O bus 210 is address data by way of particular signals set on the storage control bus 212. The solid-state controller 104 follows the transmission of the address information with transmission of the data packet of data that is to be stored. The physical address contains enough information for the solid-state storage element 216, 218, 220 to direct the data packet to the designated location within the page.

In one embodiment, the storage I/O bus 210a.a connects to each storage element in a row of storage elements (e.g. SSS 0.0-SSS 0.N 216a, 218a, 220a). In such an embodiment, the solid-state controller 104a activates a desired bank 214a using the storage control bus 212a, such that data on storage I/O bus 210a.a reaches the proper page of a single storage element (e.g. SSS 0.0 216a).

In addition, in certain embodiments, the solid-state controller 104a simultaneously activates the same bank 214a using the storage control bus 212a, such that different data (a different data packet) on storage I/O bus 210a.b reaches the proper page of a single storage element on another row (e.g. SSS 1.0 216b). In this manner, multiple physical pages of multiple storage elements 216, 218, 220 may be written to simultaneously within a single bank 214 to store a logical page.

Similarly, a read command may require a command on the storage control bus 212 to select a single bank 214a and the appropriate page within that bank 214a. In one embodiment, a read command reads an entire physical page from each storage element, and because there are multiple solid-state storage elements 216, 218, 220 in parallel in a bank 214, an entire logical page is read with a read command. However, the read command may be broken into subcommands, as will be explained below with respect to bank interleave. A logical page may also be accessed in a write operation.

In one embodiment, a solid-state controller 104 may send an erase block erase command over all the lines of the storage I/O bus 210 to erase a physical erase block having a particular erase block address. In addition, the solid-state controller 104 may simultaneously activate a single bank 214 using the storage control bus 212 such that each physical erase block in the single activated bank 214 is erased as part of a logical erase block.

In another embodiment, the solid-state controller 104 may send an erase block erase command over all the lines of the storage I/O bus 210 to erase a physical erase block having a particular erase block address on each storage element 216, 218, 220 (SSS 0.0-SSS M.N). These particular physical erase blocks together may form a logical erase block. Once the address of the physical erase blocks is provided to the storage elements 216, 218, 220, the solid-state controller 104 may initiate the erase command on a bank 214a by bank 214b by bank 214n basis (either in order or based on some other sequence). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, the storage controller 104 sequentially writes data on the solid-state storage media 110 in a log structured format and within one or more physical structures of the storage elements, the data is sequentially stored on the solid-state storage media 110. Sequentially writing data involves the storage controller 104 streaming data packets into storage write buffers for storage elements, such as a chip (a package of one or more dies) or a die on a circuit board. When the storage write buffers are full, the data packets are programmed to a designated virtual or logical page ("LP"). Data packets then refill the storage write buffers and, when full, the data packets are written to the next LP. The next virtual page may be in the same bank 214a or another bank (e.g. 214b). This process continues, LP after LP, typically until a virtual or logical erase block ("LEB") is filled. LPs and LEBs are described in more detail below.

In another embodiment, the streaming may continue across LEB boundaries with the process continuing, LEB after LEB. Typically, the storage controller 104 sequentially stores data packets in an LEB by order of processing. In one embodiment, where a write data pipeline 106 is used, the storage controller 104 stores packets in the order that they come out of the write data pipeline 106. This order may be a result of data segments arriving from a requesting device mixed with packets of valid data that are being read from another storage location as valid data is being recovered from another LEB during a recovery operation.

The sequentially stored data, in one embodiment, can serve as a log to reconstruct data indexes and other metadata using information from data packet headers. For example, in one embodiment, the storage controller 104 may reconstruct a storage index by reading headers to determine the data structure to which each packet belongs and sequence information to determine where in the data structure the data or metadata belongs. The storage controller 104, in one embodiment, uses physical address information for each packet and timestamp or sequence information to create a mapping between the physical locations of the packets and the data structure identifier and data segment sequence. Timestamp or sequence information is used by the storage controller 104 to replay the sequence of changes made to the index and thereby reestablish the most recent state.

In one embodiment, erase blocks are time stamped or given a sequence number as packets are written and the timestamp or sequence information of an erase block is used along with information gathered from container headers and packet headers to reconstruct the storage index. In another embodiment, timestamp or sequence information is written to an erase block when the erase block is recovered.

In a read, modify, write operation, data packets associated with the logical structure are located and read in a read operation. Data segments of the modified structure that have been modified are not written to the location from which they are read. Instead, the modified data segments are again converted to data packets and then written to the next available location in the virtual page currently being written. Index entries for the respective data packets are modified to point to the packets that contain the modified data segments. The entry or entries in the index for data packets associated with the same logical structure that have not been modified will include pointers to original location of the unmodified data packets. Thus, if the original logical structure is maintained, for example to maintain a previous version of the logical structure, the original logical structure will have pointers in the index to all data packets as originally written. The new logical structure will have pointers in the index to some of the original data packets and pointers to the modified data packets in the virtual page that is currently being written.

In a copy operation, the index includes an entry for the original logical structure mapped to a number of packets stored on the solid-state storage media 110. When a copy is made, a new logical structure is created and a new entry is created in the index mapping the new logical structure to the original packets. The new logical structure is also written to the solid-state storage media 110 with its location mapped to the new entry in the index. The new logical structure packets may be used to identify the packets within the original logical structure that are referenced in case changes have been made in the original logical structure that have not been propagated to the copy and the index is lost or corrupted. In another embodiment, the index includes a logical entry for a logical block.

Beneficially, sequentially writing packets facilitates a more even use of the solid-state storage media 110 and allows the solid-storage device controller 202 to monitor storage hot spots and level usage of the various virtual pages in the solid-state storage media 110. Sequentially writing packets also facilitates a powerful, efficient garbage collection system, which is described in detail below. One of skill in the art will recognize other benefits of sequential storage of data packets.

The system 100 may comprise a log-structured storage system or log-structured array similar to a log-structured file system and the order that data is stored may be used to recreate an index. Typically an index that includes a logical-to-physical mapping is stored in volatile memory. If the index is corrupted or lost, the index may be reconstructed by addressing the solid-state storage media 110 in the order that the data was written. Within a logical erase block ("LEB"), data is typically stored sequentially by filling a first logical page, then a second logical page, etc. until the LEB is filled. The solid-state storage controller 104 then chooses another LEB and the process repeats. By maintaining an order that the LEBs were written to and by knowing that each LEB is written sequentially, the index can be rebuilt by traversing the solid-state storage media 110 in order from beginning to end. In other embodiments, if part of the index is stored in non-volatile memory, such as on the solid-state storage media 110, the solid-state storage controller 104 may only need to replay a portion of the solid-state storage media 110 to rebuild a portion of the index that was not stored in non-volatile memory. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host device 114 or may be other devices.

In one embodiment, the solid-state storage controller(s) 104 communicate data to the solid-state storage media 110 over a storage I/O bus 210. In a certain embodiment where the solid-state storage is arranged in banks 214 and each bank 214 includes multiple storage elements 216, 218, 220 accessible in parallel, the storage I/O bus 210 comprises an array of busses, one for each row of storage elements 216, 218, 220 spanning the banks 214. As used herein, the term "storage I/O bus" may refer to one storage I/O bus 210 or an array of data independent busses 204. In one embodiment, each storage I/O bus 210 accessing a row of storage elements (e.g. 216a, 218a, 220a) may include a logical-to-physical mapping for storage divisions (e.g. erase blocks) accessed in a row of storage elements 216a, 218a, 220a. This mapping allows a logical address mapped to a physical address of a storage division to be remapped to a different storage division if the first storage division fails, partially fails, is inaccessible, or has some other problem. Remapping is explained further in relation to the remapping module 430 of FIG. 4.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device 155 can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the cache 102.

The local bus 206 is typically a bidirectional bus or set of busses that allows for communication of data and commands between devices internal to the solid-state storage device controller 202 and between devices internal to the cache 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204 and bridges 238.

The system bus 240 is typically a bus of a host device 114 or other device in which the cache 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The cache 102 may be packaged to fit internally to a device or as an externally connected device.

The solid-state storage device controller 202 includes a master controller 224 that controls higher-level functions within the cache 102. The master controller 224, in various embodiments, controls data flow by interpreting requests, directs creation of indexes to map identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. The master controller 224 may be embodied as hardware, as software, or as a combination of hardware and software. One skilled in the art will recognize many embodiments for the master controller 224.

In one embodiment, where the storage controller 152/solid-state storage device controller 202 manages multiple data storage devices/solid-state storage media 110a-n, the master controller 224 divides the work load among internal controllers, such as the solid-state storage controllers 104a-n. For example, the master controller 224 may divide a data structure to be written to the data storage devices (e.g. solid-state storage media 110a-n) so that a portion of the data structure is stored on each of the attached data storage devices. This feature is a performance enhancement allowing quicker storage and access to a data structure. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224 emulates block storage such that a host device 114 or other device connected to the storage device/cache 102 views the storage device/cache 102 as a block storage device and sends data to specific physical or logical addresses in the storage device/cache 102. The master controller 224 then divides up the blocks and stores the data blocks. The master controller 224 then maps the blocks and physical or logical address sent with the block to the actual locations determined by the master controller 224. The mapping is stored in the index. Typically, for block emulation, a block device application program interface ("API") is provided in a driver in the host device 114, or other device wishing to use the storage device/cache 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host device 114 may have access to a computer network through an I/O memory driver using a standard stack API and operating in conjunction with NICs 244.

In one embodiment, the master controller 224 is also a redundant array of independent drive ("RAID") controller. Where the data storage device/cache 102 is networked with one or more other data storage devices, the master controller 224 may be a RAID controller for single tier RAID, multi-tier RAID, progressive RAID, etc. The master controller 224 may also allows some objects and other data structures to be stored in a RAID array and other data structures to be stored without RAID. In another embodiment, the master controller 224 may be a distributed RAID controller element. In another embodiment, the master controller 224 may comprise many RAID, distributed RAID, and other functions as described elsewhere.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/cache 102 may appear as a storage device connected through a SCSI bus, Internet SCSI ("iSCSI"), fiber channel, etc. Meanwhile the storage device/cache 102 may autonomously manage objects or other data structures and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/cache 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 152, or more specifically in a cache 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the logical-to-physical index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/cache 102 and one or more external memory controllers 250 and associated external memory arrays 252 and CPUs 248. Note that the external memory controllers 250 and external memory arrays 252 are called external because they are external to the storage device/cache 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/cache 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/cache 102. The management controller 234 may communicate alerts, interrupts, etc. over the local bus 206 or may include a separate connection to a system bus 240 or other bus. In one embodiment the management bus 236 is an Inter-Integrated Circuit ("I²C") bus. One of skill in the art will recognize other related functions and uses of a management controller 234 connected to components of the storage device/cache 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
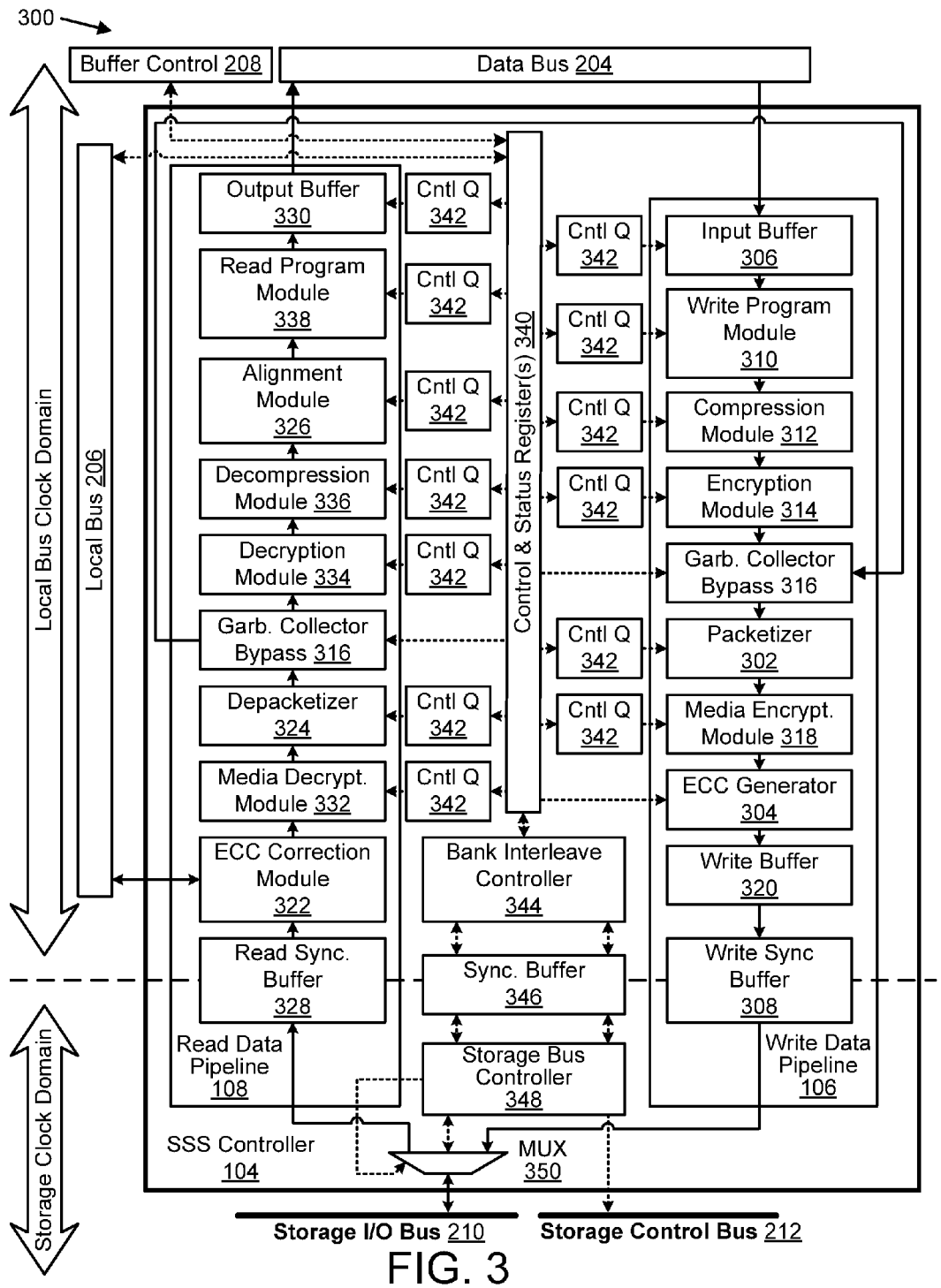
FIG. 3 is a schematic block diagram illustrating one embodiment of a solid-state storage controller with a write data pipeline and a read data pipeline in a solid-state storage device in accordance with the present invention.

FIG. 3 is a schematic block diagram illustrating one embodiment 300 of a solid-state storage controller 104 with a write data pipeline 106 and a read data pipeline 108 in a cache 102. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host device 114, or other computer or device and is transmitted to the cache 102 in data segments streamed to the cache 102 and/or the host device 114. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the cache 102, the cache 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the cache 102, but outside the write data pipeline 106, in the host device 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the cache 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, cache 102, or server, the contents of the solid-state storage media 110 typically could not be read without use of the same encryption key used during the write of the data to the solid-state storage media 110 without significant effort.

In a typical embodiment, the cache 102 does not store the encryption key in non-volatile storage and allows no external access to the encryption key. The encryption key is provided to the solid-state storage controller 104 during initialization. The cache 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host device 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the cache 102 but may vary on a per-data-structure basis and received in conjunction with receiving data segments as described below. For example, an encryption key for a data segment to be encrypted by the encryption module 314 may be received with the data segment or may be received as part of a command to write a data structure to which the data segment belongs. The cache 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host device 114, a computer, key manager, or other device that holds the encryption key to be used to encrypt the data segment. In one embodiment, encryption keys are transferred to the solid-state storage controller 104 from one of a cache 102, a computer, a host device 114, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the cache 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the cache 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific cache 102 if the solid-state storage media 110 is connected to a different solid-state storage controller 104, cache 102, or host device 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the cache 102 is beneficial so that the host device 114 or other devices writing data to the cache 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the cache 102. This allows the cache 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by a host device 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write data pipeline 106 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the cache 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the cache 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the cache 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host device 114, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
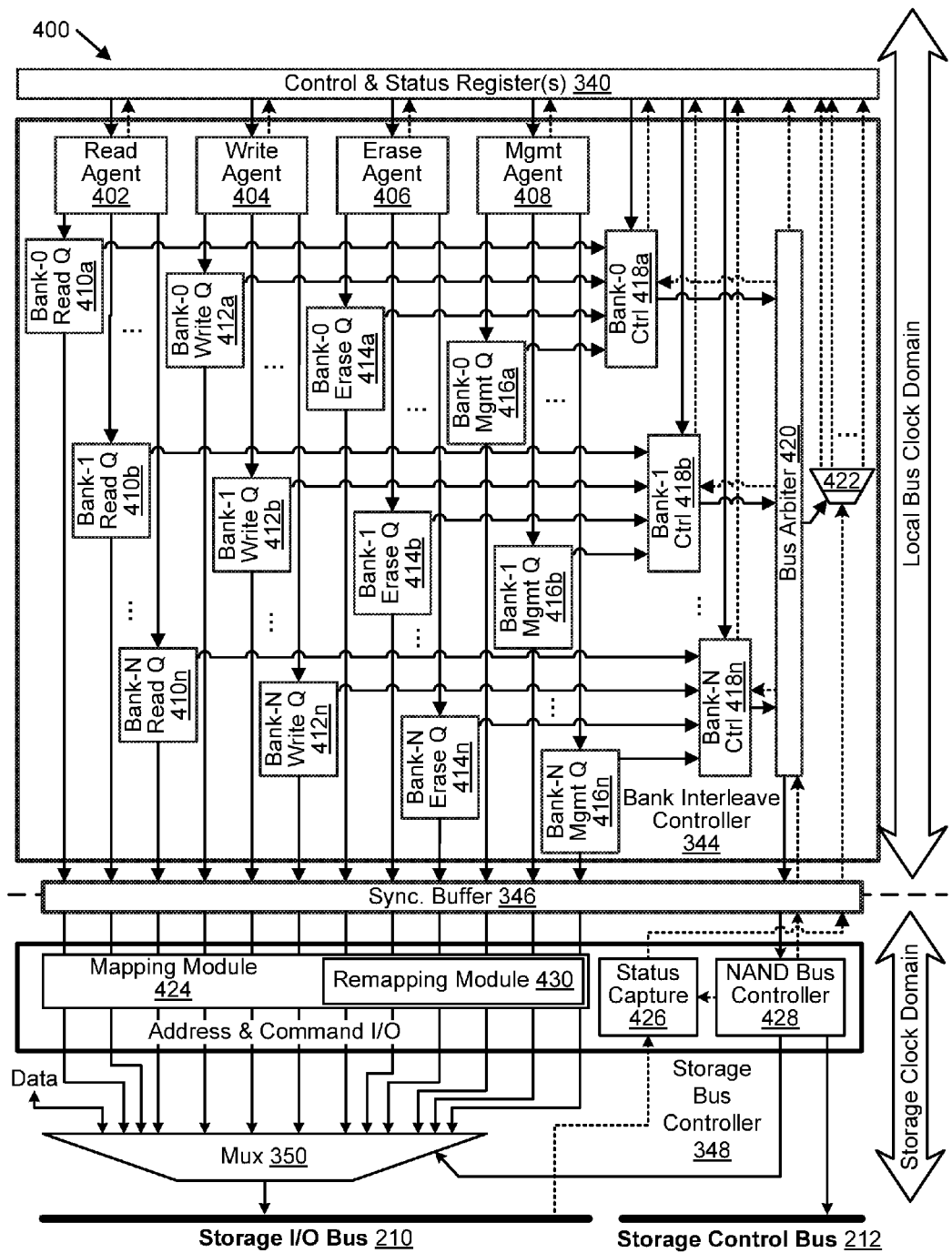
FIG. 4 is a schematic block diagram illustrating one embodiment of a bank interleave controller in the solid-state storage controller in accordance with the present invention.

The solid-state storage controller 104 and or the cache 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410*a-n*, write queues 412*a-n*, erase queues 414*a-n*, and management queues 416*a-n* for the banks 214 in the solid-state storage media 110, bank controllers 418*a-n*, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214*a* while a command of a second type executes on a second bank 214*b*. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214*a* while a command of a second type executes on a second bank 214*b*. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214*a* to the correct queue for the bank 214*a*. For example, the read agent 402 may receive a read command for bank-1 214*b* and directs the read command to the bank-1 read queue 410*b*. The write agent 404 may receive a write command to write data to a location in bank-0 214*a* of the solid-state storage media 110 and will then send the write command to the bank-0 write queue 412*a*. Similarly, the erase agent 406 may receive an erase command to erase an erase block in bank-1 214*b* and will then pass the erase command to the bank-1 erase queue 414*b*. The management agent 408 typically receives management commands, status requests, and the like, such as a reset command or a request to read a configuration register of a bank 214, such as bank-0 214*a*. The management agent 408 sends the management command to the bank-0 management queue 416*a*.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412*a* may receive a command to write a page of data packets to bank-0 214*a*. The bank-0 controller 418*a* may receive the write command at an appropriate time and may generate one or more write subcommands for each data packet stored in the write buffer 320 to be written to the page in bank-0 214*a*. For example, bank-0 controller 418*a* may generate commands to validate the status of bank 0 214*a* and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210*a-n* with the logical address of the command mapped to a first physical addresses for storage I/O bus 210*a*, and mapped to a second physical address for storage I/O bus 210*b*, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418*a* which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the cache 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each row of solid-state storage elements (e.g. SSS 0.1 216a, SSS 0.2 218a, SSS 0.N 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS M.0 216) per block 214a may have a logical address for a particular erase block mapped to twenty physical addresses of the erase block, one physical address per storage element. Because the storage elements are accessed in parallel, erase blocks at the same position in each storage element in a row of storage elements 216a, 218a, 220a will share a physical address. To select one erase block (e.g. in storage element SSS 0.0 216a) instead of all erase blocks in the row (e.g. in storage elements SSS 0.0, 0.1, . . . 0.N 216a, 218a, 220a), one bank (in this case bank-0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 1.0 216b, . . . , and to storage element M.0 216m, virtual erase block 2 may be mapped to erase block 2 of storage element SSS 0.1 218a, to erase block 2 of storage element SSS 1.1 218b, . . . , and to storage element M.1 218m, etc. Alternatively, virtual erase block 1 may be mapped to one erase block from each storage element in an array such that virtual erase block 1 includes erase block 1 of storage element SSS 0.0 216a to erase block 1 of storage element SSS 1.0 216b to storage element M.0 216m, and erase block 1 of storage element SSS 0.1 218a to erase block 1 of storage element SSS 1.1 218b, . . . , and to storage element M.1 218m, for each storage element in the array up to erase block 1 of storage element M.N 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 1.0 216b, erase block 1 of storage element SSS 2.0 (not shown) . . . , and to storage element M.0 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Data Caching

Figure 5:
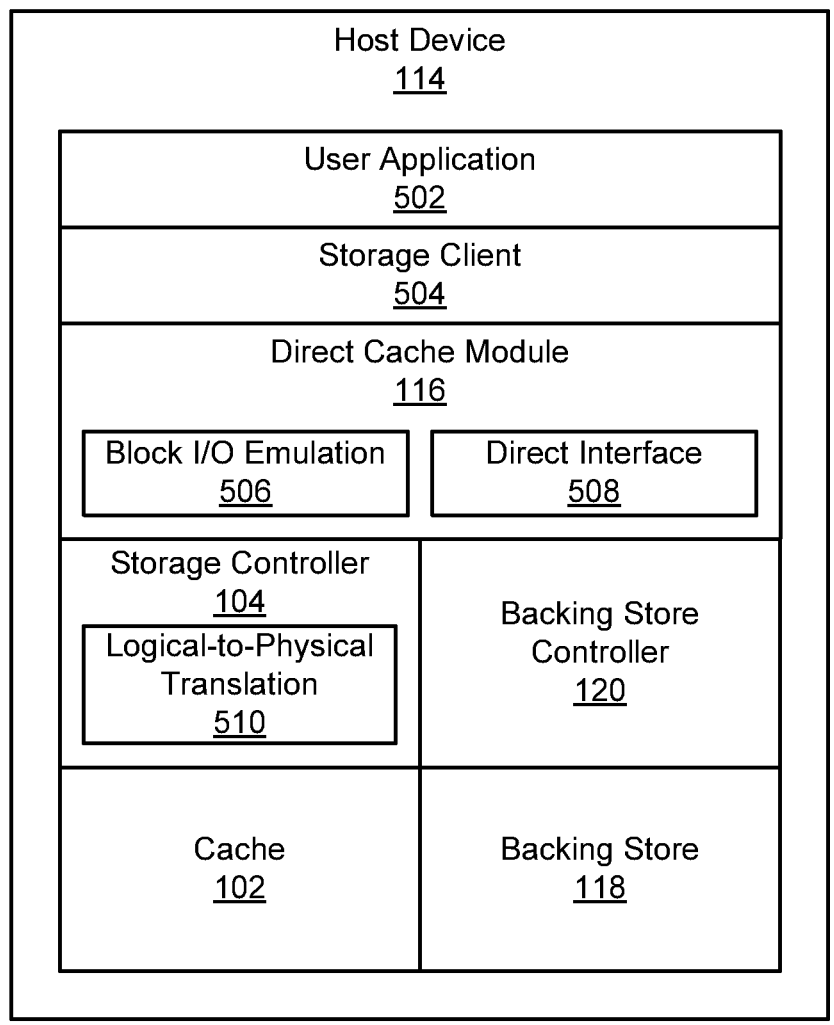
FIG. 5 is a schematic block diagram illustrating one embodiment of a host device in accordance with the present invention.

FIG. 5 depicts one embodiment of a host device 114. The host device 114 may be similar, in certain embodiments, to the host device 114 depicted in FIGS. 1A and 1B. The depicted embodiment includes a user application 502 in communication with a storage client 504. The storage client 504 is in communication with a direct cache module 116, which, in one embodiment, is substantially similar to the direct cache module 116 of FIGS. 1A and 1B, described above. The direct cache module 116, in the depicted embodiment, is in communication with the cache 102 and the backing store 118 through the storage controller 104 and the backing store controller 120.

In one embodiment, the user application 502 is a software application operating on or in conjunction with the storage client 504. The storage client 504 manages file systems, files, data, and the like and utilizes the functions and features of the direct cache module 116, the cache 102, and the backing store 118. Representative examples of storage clients include, but are not limited to, a server, a file system, an operating system, a database management system ("DBMS"), a volume manager, and the like.

In the depicted embodiment, the storage client 504 is in communication with the direct cache module 116. In a further embodiment, the storage client 504 may also be in communication with the cache 102 and/or the backing store 118 directly. The storage client 504, in one embodiment, reads data from and writes data to the backing store 118 through the direct cache module 116, which uses the cache 102 to cache read data and/or write data for the backing store 118. In a further embodiment, the direct cache module 116 caches data in a manner that is substantially transparent to the storage client 504, with the storage client 504 sending read requests and write requests directly to the direct cache module 116.

In one embodiment, the direct cache module 116 has exclusive access to and/or control over the cache 102 and the backing store 118. The direct cache module 116 may represent itself to the storage client 504 as a storage device. For example, the direct cache module 116 may represent itself as a conventional block storage device, or the like. In a particular embodiment, the direct cache module 116 may represent itself to the storage client 504 as a storage device having the same number of logical blocks (0 to N) as the backing store 118. In another embodiment, the direct cache module 116 may represent itself to the storage client 504 as a storage device have the more logical blocks (0 to N+X) as the backing store 118, where X=the number of logical blocks addressable by the direct cache module 116 beyond N. In certain embodiments, $X=2^{64}-N$.

As described above with regard to the direct cache module 116 depicted in the embodiments of FIGS. 1A and 1B, in various embodiments, the direct cache module 116 may be embodied by one or more of a storage controller 104 of the cache 102 and/or a backing store controller 120 of the backing store 118; a separate hardware controller device that interfaces with the cache 102 and the backing store 118; a device driver loaded on the host device 114; and the like.

In one embodiment, the host device 114 loads a device driver for the direct cache module 116. In a further embodiment, the host device 114 loads device drivers for the cache 102 and/or the backing store 118, such as one or more device drivers of the storage controller 104 and/or the backing store controller 120. The direct cache module 116 may communicate with the cache 102 and/or the backing store 118 through device drivers loaded on the host device 114, through the storage controller 104 of the cache 102 and/or through the backing store controller 120 of the backing store 118, or the like.

In one embodiment, the storage client 504 communicates with the direct cache module 116 through an Input/Output ("I/O") interface represented by a block I/O emulation layer 506. In certain embodiments, the fact that the direct cache module 116 is providing caching services in front of one or more caches 102, and/or one or more backing stores, such as the backing store 118, may be transparent to the storage client 504. In such an embodiment, the direct cache module 116 may present (i.e., identify itself as) a conventional block device to the storage client 504.

In a further embodiment, the cache 102 and/or the backing store 118 either include a distinct block I/O emulation layer 506 or may be conventional block storage devices. Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is addressable by the storage client 504. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, the direct cache module 116, the cache 102 and/or the backing store 118, in certain embodiments, may not directly or necessarily associate logical block addresses with particular physical blocks. The direct cache module 116, the cache 102, and/or the backing store 118 may emulate a conventional block storage interface to maintain compatibility with block storage clients 504 and with conventional block storage commands and protocols.

When the storage client 504 communicates through the block I/O emulation layer 506, the direct cache module 116 appears to the storage client 504 as a conventional block storage device. In one embodiment, the direct cache module 116 provides the block I/O emulation layer 506 which serves as a block device interface, or API. In this embodiment, the storage client 504 communicates with the direct cache module 116 through this block device interface. In one embodiment, the block I/O emulation layer 506 receives commands and logical block addresses from the storage client 504 in accordance with this block device interface. As a result, the block I/O emulation layer 506 provides the direct cache module 116 compatibility with block storage clients 504. In a further embodiment, the direct cache module 116 may communicate with the cache 102 and/or the backing store 118 using corresponding block device interfaces.

In one embodiment, a storage client 504 communicates with the direct cache module 116 through a direct interface layer 508. In this embodiment, the direct cache module 116 directly exchanges information specific to the cache 102 and/or the backing store 118 with the storage client 504. Similarly, the direct cache module 116, in one embodiment, may communicate with the cache 102 and/or the backing store 118 through direct interface layers 508.

A direct cache module 116 using the direct interface 508 may store data on the cache 102 and/or the backing store 118 as blocks, sectors, pages, logical blocks, logical pages, erase blocks, logical erase blocks, ECC chunks or in any other format or structure advantageous to the technical characteristics of the cache 102 and/or the backing store 118. For example, in one embodiment, the backing store 118 comprises a hard disk drive and the direct cache module 116 stores data on the backing store 118 as contiguous sectors of 512 bytes, or the like, using physical cylinder-head-sector addresses for each sector, logical block addresses for each sector, or the like. The direct cache module 116 may receive a logical address and a command from the storage client 504 and perform the corresponding operation in relation to the cache 102, and/or the backing store 118. The direct cache module 116, the cache 102, and/or the backing store 118 may support a block I/O emulation layer 506, a direct interface 508, or both a block I/O emulation layer 506 and a direct interface 508.

As described above, certain storage devices, while appearing to a storage client 504 to be a block storage device, do not directly associate particular logical block addresses with particular physical blocks, also referred to in the art as sectors. Such storage devices may use a logical-to-physical translation layer 510. In the depicted embodiment, the cache 102 includes a logical-to-physical translation layer 510. In a further embodiment, the backing store 118 may also include a logical-to-physical translation layer 510. In another embodiment, the direct cache module 116 maintains a single logical-to-physical translation layer 510 for the cache 102 and the backing store 118. In another embodiment, the direct cache module 116 maintains a distinct logical-to-physical translation layer 510 for each of the cache 102 and the backing store 118.

The logical-to-physical translation layer 510 provides a level of abstraction between the logical block addresses used by the storage client 504 and the physical block addresses at which the cache 102 and/or the backing store 118 store the data. In the depicted embodiment, the logical-to-physical translation layer 510 maps logical block addresses to physical block addresses of data stored on the media of the cache 102. This mapping allows data to be referenced in a logical address space using logical identifiers, such as a logical block address. A logical identifier does not indicate the physical location of data in the cache 102, but is an abstract reference to the data. The mapping module 424 and the remapping module 430 of FIG. 4, discussed above, are one example of a logical-to-physical translation layer 510. One further example of a logical-to-physical translation layer 510 includes the direct mapping module 716 of FIG. 7 discussed below.

In the depicted embodiment, the cache 102 and the backing store 118 separately manage physical block addresses in the distinct, separate physical address spaces of the cache 102 and the backing store 118. In one example, contiguous logical block addresses may in fact be stored in non-contiguous physical block addresses as the logical-to-physical translation layer 510 determines the location on the physical media 110 of the cache 102 at which to perform data operations.

Furthermore, in one embodiment, the logical address space of the cache 102 is substantially larger than the physical address space or storage capacity of the cache 102. This "thinly provisioned" or "sparse address space" embodiment, allows the number of logical addresses for data references to greatly exceed the number of possible physical addresses. A thinly provisioned and/or sparse address space also allows the cache 102 to cache data for a backing store 118 with a larger address space (i.e., a larger storage capacity) than the physical address space of the cache 102.

In one embodiment, the logical-to-physical translation layer 510 includes a map or index that maps logical block addresses to physical block addresses. The map or index may be in the form of a B-tree, a content addressable memory ("CAM"), a binary tree, and/or a hash table, and the like. In certain embodiments, the logical-to-physical translation layer 510 is a tree with nodes that represent logical block addresses and include references to corresponding physical block addresses.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 or device driver with a logical-to-physical translation layer 510 (a storage controller 104 or device driver that does not map a logical block address directly to a particular physical block), deletes data of a logical block address, the corresponding physical block address may remain allocated because the storage client 504 may not communicate the change in used blocks to the storage controller 104 or device driver. The storage client 504 may not be configured to communicate changes in used blocks (also referred to herein as "data block usage information"). Because the storage client 504, in one embodiment, uses the block I/O emulation 506 layer, the storage client 504 may erroneously believe that the direct cache module 116, the cache 102, and/or the backing store 118 is a conventional block storage device that would not utilize the data block usage information. Or, in certain embodiments, other software layers between the storage client 504 and the direct cache module 116, the cache 102, and/or the backing store 118 may fail to pass on data block usage information.

Consequently, the storage controller 104 or device driver may preserve the relationship between the logical block address and a physical address and the data on the cache 102 and/or the backing store 118 corresponding to the physical block. As the number of allocated blocks increases, the performance of the cache 102 and/or the backing store 118 may suffer depending on the configuration of the cache 102 and/or the backing store 118.

Specifically, in certain embodiments, the cache 102, and/or the backing store 118 are configured to store data sequentially, using an append-only writing process, and use a storage space recovery process that re-uses non-volatile storage media storing deallocated/unused logical blocks. Specifically, as described above, the cache 102, and/or the backing store 118 may sequentially write data on the solid-state storage media 110 in a log structured format and within one or more physical structures of the storage elements, the data is sequentially stored on the solid-state storage media 110. Those of skill in the art will recognize that other embodiments that include several caches 102 can use the same append-only writing process and storage space recovery process.

As a result of storing data sequentially and using an append-only writing process, the cache 102 and/or the backing store 118 achieve a high write throughput and a high number of I/O operations per second ("IOPS"). The cache 102 and/or the backing store 118 may include a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 510. In one embodiment, the direct cache module 116 marks logical blocks as deallocated or invalid based on a cache eviction policy, to recover storage capacity for caching additional data for the backing store 118. The direct cache module 116, in certain embodiments, selects data that is either cached read data or destaged, cleaned write data to clear, invalidate, or evict. The storage space recovery process is described in greater detail below with regard to the garbage collection module 714 of FIG. 7.

As described above, the storage space recovery process determines that a particular section of storage may be recovered. Once a section of storage has been marked for recovery, the cache 102 and/or the backing store 118 may relocate valid blocks (e.g. packets, pages, sectors, etc.) in the section. The storage space recovery process, when relocating valid blocks, copies the packets and writes them to another location so that the particular section of storage may be reused as available storage space, typically after an erase operation on the particular section. The cache 102 and/or the backing store 118 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices are configured to receive messages or commands notifying the storage device of these unused logical blocks so that the storage device may deallocate the corresponding physical blocks (e.g. the physical storage media 110 storing the unused packets, pages, sectors, etc.). As used herein, to deallocate a physical block includes marking the physical block as invalid, unused, or otherwise designating the physical block as available for storage space recovery, its contents on storage media no longer needing to be preserved by the storage device. Data block usage information may also refer to information maintained by a storage device regarding which physical blocks are allocated and/or deallocated/unallocated and changes in the allocation of physical blocks and/or logical-to-physical block mapping information. Data block usage information may also refer to information maintained by a storage device regarding which blocks are in use and which blocks are not in use by a storage client 504. Use of a block may include storing of data in the block on behalf of the storage client 504, reserving the block for use by the storage client 504, and the like.

While physical blocks may be deallocated, in certain embodiments, the cache 102 and/or the backing store 118 may not immediately erase the data on the storage media. An erase operation may be performed later in time. In certain embodiments, the data in a deallocated physical block may be marked as unavailable by the cache 102 and/or the backing store 118 such that subsequent requests for data in the physical block return a null result or an empty set of data. In certain embodiments, the direct cache module 116 evicts and/or invalidates data by deallocating physical blocks corresponding to the data in the cache 102.

One example of a command or message for such deallocation is the "TRIM" function is described in greater detail in U.S. patent application Ser. No. 12/711,113 entitled "APPARATUS, SYSTEM, AND METHOD FOR DATA BLOCK USAGE INFORMATION SYNCHRONIZATION FOR A NON-VOLATILE STORAGE VOLUME" and filed on Feb. 23, 2010 and in U.S. patent application Ser. No. 11/952,113 entitled "APPARATUS, SYSTEM, AND METHOD FOR MANAGING DATA IN A STORAGE DEVICE WITH AN EMPTY DATA TOKEN DIRECTIVE" and filed on Dec. 6, 2007, which are incorporated herein by reference. A storage device, upon receiving a TRIM command, may deallocate physical blocks for logical blocks whose data is no longer needed by the storage client 504. A storage device that deallocates physical blocks may achieve better performance and increased storage space, especially storage devices that write data using certain processes and/or use a similar data storage recovery process as that described above.

Consequently, the performance of the storage device is enhanced as physical blocks are deallocated when they are no longer needed such as through the TRIM command or other similar deallocation commands issued to the cache 102 and/or the backing store 118. In one embodiment, the direct cache module 116 clears, trims, and/or evicts cached data from the cache 102 based on a cache eviction policy, or the like. As used herein, clearing, trimming, or evicting data includes deallocating physical media associated with the data, marking the data as invalid or unused (using either a logical or physical address of the data), erasing physical media associated with the data, overwriting the data with different data, issuing a TRIM command or other deallocation command relative to the data, or otherwise recovering storage capacity of physical storage media corresponding to the data. Clearing cached data from the cache 102 based on a cache eviction policy frees storage capacity in the cache 102 to cache more data for the backing store 118.

The direct cache module 116, in various embodiments, may represent itself, the cache 102, and the backing store 118 to the storage client 504 in different configurations. In one embodiment, the direct cache module 116 may represent itself to the storage client 504 as a single storage device (e.g., as the backing store 118, as a storage device with a similar physical capacity as the backing store 118, or the like) and the cache 102 may be transparent or invisible to the storage client 504. In another embodiment, the direct cache module 116 may represent itself to the direct cache module 116 as a cache device (e.g., as the cache 102, as a cache device with certain cache functions or APIs available, or the like) and the backing store 118 may be separately visible and/or available to the storage client 504 (with part of the physical capacity of the backing store 118 reserved for the cache 201). In a further embodiment, the direct cache module 116 may represent itself to the storage client 504 as a hybrid cache/storage device including both the cache 102 and the backing store 118.

Depending on the configuration, the direct cache module 116 may pass certain commands down to the cache 102 and/or to the backing store 118 and may not pass down other commands. In a further embodiment, the direct cache module 116 may support certain custom or new block I/O commands. In one embodiment, the direct cache module 116 supports a deallocation or trim command that clears corresponding data from both the cache 102 and the backing store 118, i.e., the direct cache module 116 passes the command to both the cache 102 and the backing store 118. In a further embodiment, the direct cache module 116 supports a flush type trim or deallocation command that ensures that corresponding data is stored in the backing store 118 (i.e., that the corresponding data in the cache 102 is clean) and clears the corresponding data from the cache 102, without clearing the corresponding data from the backing store 118. In another embodiment, the direct cache module 116 supports an evict type trim or deallocation command that evicts corresponding data from the cache 102, marks corresponding data for eviction in the cache 102, or the like, without clearing the corresponding data from the backing store 118.

In a further embodiment, the direct cache module 116 may receive, detect, and/or intercept one or more predefined commands that a storage client 504 or another storage manager sent to the backing store 118, that a storage manager sends to a storage client 504, or the like. For example, in various embodiments, the direct cache module 116 or a portion of the direct cache module 116 may be part of a filter driver that receives or detects the predefined commands, the direct cache module 116 may register with an event server to receive a notification of the predefined commands, or the like. The direct cache module 116, in one embodiment, performs one or more actions on the cache 102 in response to detecting the one or more predefined commands for the backing store 118, such as writing or flushing data related to a command from the cache 102 to the backing store 118, evicting data related to a command from the cache 102, switching from a write back policy to a write through policy for data related to a command, or the like.

One example of predefined commands that the direct cache module 116 may intercept or respond to, in one embodiment, includes a "freeze/thaw" commands. "Freeze/thaw" commands are used in SANs, storage arrays, and the like, to suspend storage access, such as access to the backing store 118 or the like, to take an snapshot or backup of the storage without interrupting operation of the applications using the storage. "Freeze/thaw" commands alert a storage client 504 that a snapshot is about to take place, the storage client 504 flushes pending operations, for example in-flight transactions, or data cached in volatile memory, the snapshot takes place while the storage client 504 use of the storage is in a "frozen" or ready state, and once the snapshot is complete the storage client 504 continues normal use of the storage in response to a thaw command.

The direct cache module 116, in one embodiment, flushes or cleans dirty data from the cache 102 to the backing store 118 in response to detecting a "freeze/thaw" command. In a further embodiment, the direct cache module 116 suspends access to the backing store 118 during a snapshot or other backup of a detected "freeze/thaw" command and resumes access in response to a completion of the snapshot or other backup. In another embodiment, the direct cache module 116 may cache data for the backing store 118 during a snapshot or other backup without interrupting the snapshot or other backup procedure. In other words, rather than the backup/snapshot software signaling the application to quiesce I/O operations, the direct cache module 116 receives and responds to the freeze/thaw commands.

Figure 6:
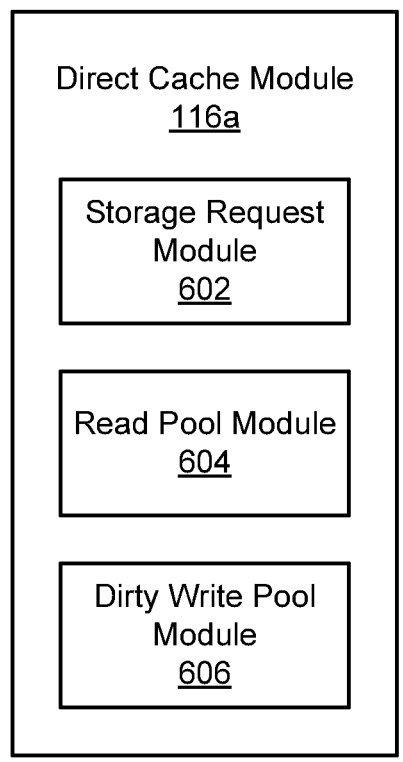
FIG. 6 is a schematic block diagram illustrating one embodiment of a direct cache module in accordance with the present invention.

FIG. 6 depicts one embodiment of the direct cache module 116a. In the depicted embodiment, the direct cache module 116a includes a storage request module 602, a read pool module 604, and a dirty write pool module 606. In a further embodiment, the direct cache module 116a may include one or more modules described below with regard to the direct cache module 116b of FIG. 7. In certain embodiments, the direct cache module 116a may be substantially similar to the direct cache module 116 described above with regard to FIG. 1A, FIG. 1B, and FIG. 5.

In one embodiment, the storage request module 602 monitors storage requests received by the cache 102, such as read requests, write requests, trim requests, and/or other types of storage requests. The storage requests received by the cache 102, in certain embodiments, may be requests from a client, such as the host device 114 or the like. The storage requests may be directed from a client to the direct cache module 116a, to the cache 102, to the backing store 118, or the like.

The storage request module 602, in one embodiment, receives the storage requests directly from a client, such as the host device 114, for the direct cache module 116a and the cache 102. In a further embodiment, the storage request module 602 may detect, intercept, or otherwise indirectly monitor the storage requests. Example configurations of the direct cache module 116, the storage controller 104, and the backing store controller 120 and various embodiments of sending and receiving storage requests and other commands are described above with regard to FIG. 5. For example, in one embodiment, the direct cache module 116a may include a filter driver executing on the host device 114 that receives, detects, or otherwise monitors storage requests, the direct cache module 116a may register with an event server to receive a notification of storage requests or other predefined commands, or the like.

In one embodiment, the cache 102 caches both read data and write data for the backing store 118 and the storage request module 602 monitors read requests and write requests. Embodiments of a write request module 712 and a read request module 720 that service write requests and read requests for the direct cache module 116 and/or the cache 102 are described in greater detail below with regard to FIG. 7.

The storage request module 602, in a further embodiment, monitors whether a storage request is a cache hit or a cache miss. A cache hit occurs when the cache 102 is currently storing data for one or more addresses corresponding to a storage request. A cache miss occurs when the cache 102 is not currently storing data for one or more addresses of a storage request. A read hit rate represents the amount of read requests that are cache hits relative to read requests that are cache misses, relative to total read requests, or the like. For example, in various embodiments, a read hit rate may include a percentage of read requests that are read hits, a ratio of read hits to read misses, or another representation of read hits. A read hit rate may represent read hits over a lifetime of the cache 102, may represent read hits over a predetermined period of time, or the like. In one embodiment, a read hit rate is for the entire cache 102, including all data pools of the cache 102. In a further embodiment, a read hit rate may be specific to one or more data pools of the cache 102. In general, maximizing a read hit rate of the cache 102 increases performance and efficiency of the cache 102 and decreases response times for the cache 102 to service read requests, and the like.

Whether a write request is a write hit or a write miss does not typically affect a response time to service the write request but typically has other effects on performance and efficiency of the cache 102. A write hit occurs when the cache 102 is currently storing data for one or more addresses corresponding to a write request. A write hit, in one embodiment, invalidates the currently stored data for the one or more addresses of the write request, because the new write request makes the currently stored data outdated or stale. A dirty write hit is a write hit in a dirty write pool of the cache 102. A dirty write hit invalidates dirty data from the dirty write pool of the cache 102. Dirty data is data in the cache 102 that the direct cache module 116 has not yet destaged to the backing store 118.

A dirty write hit rate represents the amount of write requests that are dirty write hits. A dirty write hit rate, in various embodiments, may be relative to write requests that are not dirty write hits, relative to write requests that are cache misses, relative to total write requests, or the like. A dirty write hit rate may represent dirty write hits over a lifetime of the cache 102, over a predetermined period of time, or the like. A dirty write hit rate is specific to the dirty write pool of the cache 102. In general, maximizing a dirty write hit rate of the cache 102 increases performance and efficiency of the cache 102 because data that the dirty write hit invalidates can be cleared from the cache 102 without destaging the data to the backing store 118. In certain embodiments, a clean write hit, a write hit in a clean write pool of the cache 102 instead of in the dirty write pool, indicates that the direct cache module 116 could have operated more efficiently by waiting to destage the data because the clean write hit may then have invalidated the data.

In one embodiment, the storage request module 602 determines one or more hit rates and/or miss rates for the cache 102, such as a read hit rate, a dirty write hit rate, or the like. In a further embodiment, the storage request module 602 monitors hits and/or misses of storage requests, such as read hits, dirty write hits, or the like, and the direct cache module 116a maximizes a read hit rate, maximizes a dirty write hit rate, and/or otherwise optimizes efficiency of the cache 102 based on the monitored hits and/or misses of storage requests. In another embodiment, the storage request module 602 determines in which data pool of the cache 102 a hit occurs.

The storage request module 602, in certain embodiments, counts or tallies storage requests to determine one or more frequency counts by logical address or other storage division. A frequency count, as used herein, comprises an amount of storage requests, accesses, references, or the like for a storage division of the cache 102 and or the backing store 118 over time. In one embodiment, the frequency count comprises a read request count and the storage request module 602 counts read requests for each storage division. In another embodiment, the frequency count comprises a write request count and the storage request module 602 counts write requests for each storage division. A storage division may include a logical or physical erase block, a logical or physical page, an ECC chunk, a packet, a range of one or more logical addresses, or the like.

In one embodiment, the membership metadata module 718 described below with regard to FIG. 7 stores one or more frequency counts as membership metadata in a mapping structure of the direct mapping module 716 described below. The storage request module 602, in certain embodiments, tracks frequency counts at the same granularity as the mapping structure. For example, if the mapping structure stores nodes with variable sized ranges of logical addresses, in one embodiment, the storage request module 602 cooperates with the membership metadata module 718 to determine and store frequency counts for variable sized ranges of logical addresses identified by storage requests.

The read request module 720 described below may use a frequency count for evicted data to determine whether to readmit the evicted data into the cache 102. For example, the read request module 720 may readmit evicted data into the cache 102 in response to a frequency count for the evicted data satisfying a readmission threshold or the like. Similarly, the read request module 720 may use a frequency count for data that the cache does not yet or does not currently store to determine whether to admit the un-stored data into the cache 102. For example, the read request module 720 may admit un-stored data into the cache 102 in response to a frequency count for the un-stored data satisfying a preadmission threshold or the like.

In one embodiment, the read pool module 604 manages a read pool of the cache 102. The read pool of the cache 102 includes data that the direct cache module 116a stores in the cache 102 in response to a read request. Storing data in the cache 102 in response to a read request is described in greater detail below with regard to the read request module 720 of FIG. 7. In certain embodiments, the read pool module 604 may divide the read pool into several sub-pools, such as one or more recent read pools, one or more frequent read pools, or the like. In a further embodiment, the read pool module 604 may divide the read pool into a plurality of gradient read pools based on a number of read requests for the data of the particular pool. For example, data with one read request may be in a first read pool, data with two read requests may be in a second read pool, up to N read pools for data with N read requests, or the like.

The read pool module 604, in one embodiment, adjusts a size of the read pool of the cache 102 to maximize a read hit rate and/or a dirty write hit rate of the storage requests that the storage request module 602 monitors. In general, the larger the read pool, the higher the read hit rate. However, in certain embodiments, due to the finite storage capacity of the cache 102, the read pool module 604 balances the size of the read pool to maximize both a read hit rate and a dirty write hit rate, based on use cases of the cache 102. The read pool module 604, in certain embodiments, adjusts the size of the read pool by adjusting an eviction rate of data in the read pool relative to eviction rates of data in other pools of the cache 102, or the like. A groomer module 704 that selectively evicts or retains data of the cache 102 is described below with regard to FIG. 7.

The read pool module 604, in a further embodiment, adjusts a size of the read pool of the cache 102 by determining a target read pool size for the read pool based on the storage requests that the storage request module 602 monitors. For example, the read pool module 604, in certain embodiments, may determine a target read pool size and a difference between the target read pool size and an actual read pool size may drive an eviction rate for one or more pools of the cache 102 so that the actual read pool size tends to follow or move toward the target read pool size. In embodiments where the read pool includes sub-pools, such as a recent read pool, a frequent read pool, or the like, the read pool module 604 may determine target sizes for each sub-pool, and the target read pool size may be the sum of the sub-pool target sizes, or the like.

In a further embodiment, the read pool module 604 adjusts the size of the read pool and/or adjusts the target size of the read pool based on a set of adjustment rules. The set of adjustment rules, in certain embodiments, define an adjustment to a target size of a pool in response to a predefined type of hit or miss, a predefined threshold number of hits or misses, or the like. The set of adjustment rules, in various embodiments, may be shared for several data pools of the cache 102, may be specific to a single data pool of the cache 102, or the like.

For example, in certain embodiments, the read pool module 604, the dirty write pool module 606, a clean write pool 702 described below with regard to FIG. 7, and/or other pool management modules may cooperate using a single set of adjustment rules for adjustments to the read pool, the dirty write pool, a clean write pool, a recent read pool, a frequent read pool, and/or other data pools. In a further embodiment, the read pool module 604, the dirty write pool module 606, the clean write pool 702 described below with regard to FIG. 7, and/or other pool management modules may each use separate sets of adjustment rules, such as a set of read pool adjustment rules, a set of dirty write pool adjustment rules, a set of clean write pool adjustment rules, a set of recent read pool adjustment rules, a set of frequent read pool adjustment rules, or the like.

In one embodiment, pool adjustment rules may be default rules for the direct cache module 116a defined by an engineer, a distributor, a manufacturer, or the like. In another embodiment, pool adjustment rules may be custom rules defined or selected by a user, through an interface of the host device 114, a network interface, or the like. In a further embodiment, the direct cache module 116a may dynamically learn or update one or more pool adjustment rules based on a history of hits and misses for the cache 102. In general, a read pool adjustment rule for the read pool module 604 defines an increase or decrease to the actual size and/or to the target size of the read pool in response to a predefined type or number of hits or misses, such as read hits, read misses, write hits, write misses, recent read hits, frequent read hits, dirty read hits, clean read hits, dirty write hits, clean write hits, or the like.

In certain embodiments, a pool adjustment rule may balance competing factors and/or unknown factors to make an optimal adjustment to a pool size. For example, in one embodiment, the read pool module 604 may adjust the size of the read pool by reducing the target read pool size in response to a read miss and/or a predefined threshold number of read misses. As described below with regard to the read request module 720 of FIG. 7, in one embodiment, the actual size of the read pool increases in response to a read miss because the direct cache module 116a caches data of the read miss in the cache 102 as a member of the read pool.

However, a read miss may have several different causes, which, in certain embodiments, may warrant different read pool adjustments. In one case, a read miss may indicate that the read pool size is too small and that increasing the read pool size may lead to fewer read misses. In another case, a read miss may indicate that the read request was for a one-time read, such as a video or audio stream, and that the read pool size should be reduced to prevent poisoning the cache 102 with one-time read data that is unlikely to be accessed again. If the cache 102 were to be filled or poisoned with one-time read data, other pools of the cache 102, such as a dirty write pool, a clean write pool, or the like, in certain embodiments, would shrink to provide storage capacity for the one-time read data and an increase in the size of the read pool, which would have a negative effect on the dirty write hit rate, with little or no benefit to the read hit rate.

In certain embodiments, the read pool module 604 balances these two competing factors by reducing the target read pool size in response to a read miss (or predefined threshold number of read misses) and increasing the target read pool size in response to a read hit (or predefined threshold number of read hits), such as a recent read hit, or the like. If the read miss was caused by the first case and the cache 102 is not being poisoned by one-time read data, the cache 102 will likely have more read hits and the read pool module 604 may increase the target read pool size in response to the read hits, maximizing the read hit rate for the first case. If the read miss was caused by the second case and the cache 102 is being poisoned by one-time read data, from a video or audio stream, or the like, the cache 102, in one embodiment, will likely have more read misses with further one-time read data, and the read pool module 604 may decrease the target read pool size in response to the read misses, to prevent further poisoning of the cache 102.

In another embodiment, the read pool module 604 may detect, determine, and/or estimate that a read miss is due to either the first case or the second case and make a different adjustment based on the case. For example, in certain embodiments, the read pool module 604 may increase the target read pool size in response to a read miss and/or read misses, based on a use pattern, a history of read hits and/or read misses, a user selection, an indicator received with a storage request, or the like, instead of reducing the target read pool size as described above.

In certain embodiments, as described below with regard to FIG. 7, the read pool module 604 manages the read pool as a recent read pool and a frequent read pool. The read pool module 604, in one embodiment, adjusts a size of the recent read pool, adjusts a size of the frequent read pool, or the like to maximize the read hit rate and/or the dirty write hit rate of storage requests for the cache 102. For example, in one embodiment, the read pool module 604 increases a target recent read pool size of the recent read pool in response to a read hit (or a predefined threshold number of read hits) in the recent read pool. In a further embodiment, the read pool module 604 transitions data from the recent read pool to the frequent read pool in response to a frequent read threshold number of read hits for the requested data in the recent read pool, such as a first read hit, a second read hit, or another frequent read threshold number of read hits.

In one embodiment, the dirty write pool module 606 manages a dirty write pool of the cache 102. The dirty write pool of the cache 102 includes dirty data that the direct cache module 116a stores in the cache 102 in response to a write request and that the direct cache module 116a has not yet destaged to the backing store 118. Storing data in the cache 102 in response to a write request is described in greater detail below with regard to the write request module 712 and the cache write module 714 of FIG. 7.

The dirty write pool module 606, in one embodiment, adjusts a size of the dirty write pool of the cache 102 to maximize a dirty write hit rate and/or a read hit rate of the storage requests that the storage request module 602 monitors. In general, the larger the dirty write pool, the higher the dirty write hit rate. However, in certain embodiments, due to the finite storage capacity of the cache 102, the dirty write pool module 606 balances the size of the dirty write pool to maximize both a dirty write hit rate and a read hit rate, based on use cases of the cache 102. The dirty write pool module 606, in certain embodiments, adjusts the size of the dirty write pool by adjusting a destage rate for destaging data from the dirty write pool to the backing store 118, or the like. A destage module 708 that destages data from the dirty write pool to the backing store 118 at a destage rate is described below with regard to FIG. 7.

In certain embodiments, the dirty write pool module 606 sets the destage rate such that the size of the dirty write pool remains within a maximum dirty write pool size. For example, the direct cache module 116a may guarantee to a user that the cache 102 will store no more than a maximum dirty write pool size amount of dirty data. The maximum dirty write pool size, in one embodiment, is set by a user using an interface of the host device 114, a network interface, or the like. In a further embodiment, an engineer, a distributor, a manufacturer, or the like may define the maximum dirty write pool size for the cache 102.

In one embodiment, upon destaging dirty data to the backing store 118, the dirty write pool module 606 transitions the data from the dirty write pool to a clean write pool. A clean write pool module 702 that manages a clean write pool is described below with regard to FIG. 7. The dirty write pool module 606 may coordinate or interface with the clean write pool module 702 to adjust a size of a write pool including the dirty write pool and the clean write pool, or the like. In another embodiment, the dirty write pool module 606 may transition dirty data to the read pool described above with regard to the read pool module 604 in response to destaging the dirty data. In a further embodiment, the dirty write pool module 606 invalidates, evicts, or otherwise clears dirty data from the cache 102 once the dirty data is destaged to the backing store 118.

The dirty write pool module 606, in one embodiment, adjusts a size of the dirty write pool of the cache 102 by determining a target dirty write pool size for the dirty write pool based on the storage requests that the storage request module 602 monitors. For example, the dirty write pool module 606, in certain embodiments, may determine a target dirty write pool size and a difference between the target dirty write pool size and an actual dirty write pool size may drive the destage rate for the dirty write pool so that the actual dirty write pool size tends to follow or move toward the target dirty write pool size, or the like.

In one embodiment, the dirty write pool module 606 adjusts the size of the dirty write pool and/or adjusts the target size of the dirty write pool based on a set of adjustment rules, substantially as described above with regard to the read pool module 604. In general, a dirty write pool adjustment rule for the dirty write pool module 606 defines an increase or decrease to the actual size and/or to the target size of the dirty write pool in response to a predefined type or number of hits or misses, such as write hits, write misses, read hits, read misses, dirty write hits, clean write hits, dirty read hits, clean read hits, recent read hits, frequent read hits, or the like.

In certain embodiments, as described above with regard to the read pool module 604, a pool adjustment rule may balance competing factors and/or unknown factors to make an optimal adjustment to a pool size. In one embodiment, the dirty write pool module 606 adjusts the size of the dirty write pool by reducing the target dirty write pool size in response to a write miss and/or a predefined threshold number of write misses. As described below with regard to the write request module 712 and the cache write module 714 of FIG. 7, in one embodiment, the actual size of the dirty write pool increases in response to a write miss because the direct cache module 116a caches data of the write miss in the cache 102 as a member of the dirty write pool, until the data is destaged. However, like a read miss, a write miss may have several different causes which may warrant different pool adjustments.

In one case, a write miss may indicate that a write pool size and/or the dirty write pool size is too small and that increasing the dirty write pool size may lead to fewer write misses, reducing the amount of data that the direct cache module 116a destages to the backing store 118. In another case, a write miss may indicate that the write request was a one-time write, such as writing a video or audio stream that is unlikely to be re-written or changed, and that the dirty write pool size should be reduced to prevent poisoning the cache 102 with one-time write data. If the cache 102 were to be filled or poisoned with one-time write data, other pools of the cache 102, such as the read pool described above, in certain embodiments, would shrink to provide storage capacity for the one-time write data and an increase in the size of the dirty write pool, which would have a negative effect on the read hit rate, with little or no benefit to the dirty write hit rate.

In certain embodiments, the dirty write pool module 606 balances these two competing factors by reducing the target dirty write pool size in response to a write miss (or a predefined threshold number of write misses) and increasing the target dirty write pool size in response to a dirty write hit (or a predefined threshold number of dirty write hits). If the write miss was caused by the first case and the cache 102 is not being poisoned by one-time write data, the cache 102 will likely have more dirty write hits and the dirty write pool module 606 may increase the target dirty write pool size in response to the dirty write hits, maximizing the dirty write hit rate for the first case. If the write miss was caused by the second case and the cache 102 is being poisoned by one-time write data, the cache 102, in certain embodiments, will likely have more write misses with further one-time write data, and the dirty write pool module 606 may decrease the target dirty write pool size in response to the write misses, to prevent further poisoning of the cache 102.

In other embodiments, the dirty write pool module 606 may detect, determine, and/or estimate that a write miss is due to either the first case or the second case and make a different adjustment based on the case. For example, in certain embodiments, the dirty write pool module 606 may increase the target dirty write pool size in response to a write miss or predefined threshold number of write misses, based on a use pattern, a history of write hits and/or write misses, a user selection, an indicator received with a storage request, or the like, instead of reducing the target dirty write pool size as described above. Other embodiments of dirty write pool adjustment rules may include increasing the target dirty write pool size in response to one or more dirty write hits, increasing the target dirty write pool size in response to one or more clean write hits, or the like.

One of skill in the art, in light of this disclosure, will recognize other pool adjustment rules that the read pool module 604, the dirty write pool module 606, and/or other pool management modules such as the clean write pool module 702, the recent pool module 724, and/or the frequent pool module 726 described below, may use to manage sizes of associated data pools. For example, a pool management module 604, 606, 702, 724, 726 may manage a target pool size of an associated data pool to more closely match (e.g. to remain within a predefined range of) an actual size of the data pool, even in cases where a data pool may be being poisoned as described above. For example, a pool management module 604, 606, 702, 724, 726 may increase a target pool size in response to a cache hit in an associated data pool. An increase in response to a cache hit, in one embodiment, may be proportional to a difference between an actual size of the associated data pool and the target pool size of the associated data pool, so that a cache hit for the associated data pool results in little or no increase in the target size if the difference is close to zero.

In another embodiment, a pool management module 604, 606, 702, 724, 726 may increase a target pool size towards an actual pool size in response to a cache hit in an associated data pool if a frequency count for the cache hit is below a frequency threshold and does not increase the target pool size if the frequency count is above the frequency threshold, because a high frequency count may indicate that pool growth is not beneficial since the associated data has been in the cache 102 for some time. Similarly, a pool management module 604, 606, 702, 724, 726 may not decrease a target pool size in response to a cache miss (to prevent poisoning of the cache 102 as described above) if a frequency count for the cache miss is above a frequency threshold, as high frequency data may be unlikely to be poisoning the cache 102. In another embodiment, a pool management module 604, 606, 702, 724, 726 may decrease a target pool size in response to data being evicted, aging, or expiring out of the associated data pool so that the target pool size tends to follow the actual pool size.

In certain embodiments, a pool management module 604, 606, 702, 724, 726 may stabilize changes in a target pool size and/or in an actual pool size for an associated data pool over time. A pool management module 604, 606, 702, 724, 726 may use a feedback loop with a previous target pool size, a previous actual pool size, or the like as a feedback input to prevent instability in the target pool size and/or in the actual pool size. In other embodiments, a pool management module 604, 606, 702, 724, 726, may dampen changes in a target or actual pool size, may filter a target or actual pool size, may limit a rate of change in a target or actual pool size, may limit an acceleration in a rate of change in a target or actual pool size, or the like. Stabilizing target or actual pool sizes, in various embodiments, may prevent actual sizes of data pools from becoming unbalanced or unstable, prevent a single data pool from dominating the cache 102, prevent a data pool from decreasing in size to at or near zero, or the like, especially for nonstandard or unusual use cases of the cache 102. In other embodiments, for certain use cases, it may be beneficial for a single data pool to dominate the cache 102, to decrease in size to at or near zero, or the like.

Figure 7:
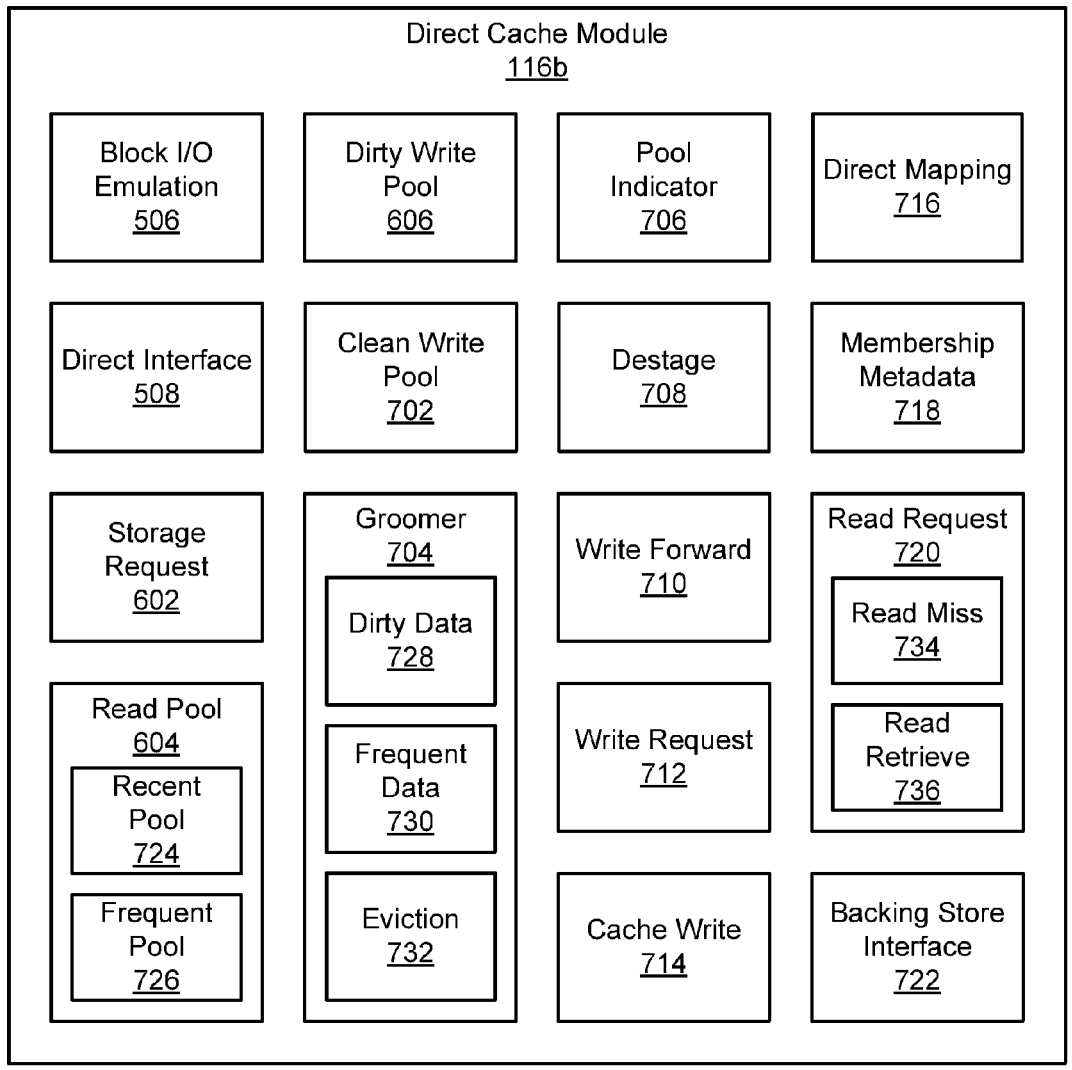
FIG. 7 is a schematic block diagram illustrating another embodiment of a direct cache module in accordance with the present invention.

FIG. 7 depicts another embodiment of the direct cache module 116b. In the depicted embodiment, the direct cache module 116b includes the block I/O emulation layer 506, the direct interface layer 508, the storage request module 602, the read pool module 604, and the dirty write pool module 606, substantially as described above with regard to FIGS. 5 and 6. The direct cache module 116b, in the depicted embodiment, further includes a clean write pool module 702, a groomer module 704, a pool indicator module 706, a destage module 708, a write forward module 710, a write request module 712, a cache write module 714, a direct mapping module 716, a membership metadata module 718, a read request module 720, and a backing store interface module 722. The direct cache module 116b, in certain embodiments, may be substantially similar to the direct cache module 116 of FIGS. 1A and 1B, the direct cache module 116 of FIG. 5, and the direct cache module 116a of FIG. 6.

In the depicted embodiment, the read pool module 604 includes a recent pool module 724 and a frequent pool module 726. The read pool module 604, in one embodiment, uses the recent pool module 724 to manage a recent read pool of the read pool and uses the frequent pool module 726 to manage a frequent read pool of the read pool. In certain embodiments, the read pool module 604 transitions data from the recent read pool to the frequent read pool once the data has been requested at least a predefined number of times, to satisfy a frequent read threshold, or the like. For example, in one embodiment, the read pool module 604 adds data to the recent read pool as the data is cached in response to a read miss, and moves the data from the recent read pool to the frequent read pool in response to a subsequent read request for the data, a frequent read threshold number of read requests for the data, or the like.

In one embodiment, the recent pool module 724 adjusts a size of the recent read pool to maximize a read hit rate and/or a dirty write hit rate of storage requests for the cache 102. In a further embodiment, the frequent pool module 726 adjusts a size of the frequent read pool to maximize a read hit rate and/or a dirty hit rate of storage requests for the cache 102. The recent pool module 724 and/or the frequent pool module 726, in certain embodiments, manage and adjust sizes of the recent read pool and/or the frequent read pool substantially as described above with regard to the read pool module 604 of FIG. 6. For example, in one embodiment, the recent pool module 724 determines a target recent read pool size for the recent read pool based on storage requests that the storage request module 602 monitors, and the like. In another embodiment, the frequent pool module 726 determines a target frequent read pool size for the frequent read pool based on storage requests that the storage request module 602 monitors, and the like.

In certain embodiments, the recent pool module 724 and/or the frequent pool module 726 adjust sizes of the recent read pool and/or the frequent read pool based on a read pool adjustment rule, as described above with regard to the read pool module 604 of FIG. 6. In one embodiment, the recent pool module 724 increases a target recent read pool size of the recent read pool in response to a read hit in the recent read pool, a predefined threshold number of read hits in the recent read pool, or the like. A read hit in the recent read pool, in some embodiments, may transition the requested data from the recent read pool to the frequent read pool, which may increase an actual size of the frequent read pool and decrease an actual size of the recent read pool, or the like. While the read pool module 604, in the depicted embodiment, manages two data pools grouped by read request count or other frequency count, in other embodiments, the read pool module 604 may manage more than two (e.g. N) data pools, each grouped by frequency count. Each pool may comprise data with frequency counts within a predefined range. The predefined ranges may be distributed evenly (e.g. 1-5, 6-10, 11-15), over a predefined scale such as a logarithmic scale (e.g. 1, 2-3, 4-7, 8-15), or the like.

In one embodiment, the clean write pool module 702 manages a clean write pool of the cache 102. The clean write pool includes clean write data that the direct cache module 116b has destaged to the backing store 118 or cleaned, using the destage module 708 or the like. Data transitions or moves from the dirty write pool to the clean write pool, in certain embodiments, upon being destaged to the backing store 118. The clean write pool module 702, in one embodiment, adjusts a size of the clean write pool to maximize a read hit rate and/or a dirty write hit rate of storage requests of the cache 102.

In one embodiment, the clean write pool module 702 adjusts the size of the clean write pool of the cache by adjusting a destage rate for the destage module 708, or the like, to maximize a dirty write hit rate and/or a read hit rate for the cache 102. The destage rate is the rate at which the destage module 708 destages data from the dirty write pool to the backing store 118 and moves the data from the dirty write pool to the clean write pool. In a further embodiment, the clean write pool module 702 adjusts an eviction rate at which the groomer module 704, or the like, evicts data from the clean write pool to maximize a read hit rate and/or a dirty write hit rate of the cache 102. The clean write pool module 702, in a further embodiment, determines a target clean write pool size for the clean write pool and a difference between the target clean write pool size and an actual clean write pool size drives an eviction rate and/or a destage rate, or the like.

In one embodiment, the groomer module 704 recovers storage capacity for the cache 102. The groomer module 704, in certain embodiments, recovers storage capacity for the cache 102 by erasing, trimming, or otherwise clearing invalid data from the cache 102, evicting data of certain data pools from the cache, and writing certain data of certain data pools forward to retain the data in the cache 102. In one embodiment, the groomer module 704 selects data to evict and/or data to retain based on pool size adjustments, target pool sizes, or the like from the read pool module 604, the dirty write pool module 606, and/or the clean write pool module 702.

In the depicted embodiment, the groomer module 704 includes a dirty data module 728, a frequent data module 730, and an eviction module 732. In one embodiment, the groomer module 704 grooms data of the cache 102 one or more storage regions at a time. A region of the cache 102 is a physical or logical block or segment of the storage media 110 of the cache. For example, in various embodiments, a region of the cache 102 may include a block, a sector, a page, a logical block, a logical page, a physical erase block, a logical erase block, a packet, an ECC chunk, or another logical or physical division of the cache 102. The groomer module 704, in one embodiment, selects a region for grooming based on a grooming cost for the region, selecting a low cost region or the like.

A grooming cost for a region, in one embodiment, includes an estimate or other representation of a cost of grooming and/or evicting the region of the cache 102. A grooming cost for a selected region may be relative to other regions such that the grooming cost may be compared between different regions to select a low cost region for grooming. A grooming cost, in certain embodiments, represents several different costs associated with grooming data of the cache 102. In one embodiment, a grooming cost for a selected region represents a cache efficiency cost of evicting data from the selected region, such as an opportunity cost of evicting the data, a likelihood of a cache miss in response to evicting the data, or the like. In another embodiment, a grooming cost for a selected region represents a storage efficiency cost of copying data forward or otherwise retaining data from the selected region. One of skill in the art, in light of this disclosure, will recognize other costs associated with grooming data that the groomer module 704 may factor in to the grooming cost of a selected region.

A cache efficiency cost factor of a grooming cost, in one embodiment, may be based on the types of data that the region stores, such as data of the recent read pool, data of the frequent read pool, data of the dirty write pool, data of the clean write pool, and/or other data of another data pool. For example, the cache efficiency cost of evicting data of the frequent pool may be higher than the cache efficiency cost of evicting data of the recent pool, due to a greater likelihood of a cache miss if the data of the frequent pool is evicted. Similarly, in certain embodiments, the cache efficiency cost of evicting data of the dirty write pool may be much larger than the cache efficiency cost of evicting data of the clean write pool, of a read pool, or the like, because the backing store 118 does not yet store dirty write data, and the cache efficiency cost of evicting dirty write data (i.e. losing the data) may be very large or infinite.

A storage efficiency cost factor of a grooming cost, in one embodiment, may be based on one or more effects that grooming a selected region may have on the operation of the cache 102 as a storage device. For example, storage efficiency costs may include the cost and/or the write amplification incurred by copying data from the selected region forward, such as data of the dirty write pool, frequently accessed data of the frequent read pool, or the like, the performance cost on the cache 102 of grooming the selected region, an impact (positive or negative) on the storage media 110 of the cache 102 by grooming the selected region, and/or other storage efficiency costs.

In one embodiment, the storage efficiency cost factors may include wear leveling of the physical storage media 110. In another embodiment, the storage efficiency cost factors include a frequency of access of a selected region, i.e., how "hot" or "cold" the selected region is. In one embodiment, the storage efficiency cost factors include a position of a selected region of data in the physical storage media 110 relative to other "hot" data. In another embodiment, the storage efficiency cost factors may include a determined reliability of a selected region, such as an Uncorrectable Bit Error Rate ("UBER"), a Correctable Bit Error Rates ("BER"), a Program/Erase ("PE") cycle count, a read frequency, and/or other non-volatile solid state storage specific attributes of the selected region. High BER, UBER, or PEs may be used as factors to lower the grooming cost and to increase the likelihood that the direct cache module 116b will groom a selected region having those characteristics.

In one embodiment, the grooming cost of a selected region may be based at least partially on one or more counts or tallies of types of data from various data pools in the selected region. A count or tally of data of a specific data pool may comprise a number or amount of blocks, packets, pages, or the like in the region of the specific data pool, data units (e.g., bytes, kilobytes, megabytes, etc.) representing the amount of data in the region of the specific data pool, or the like. The grooming cost, in various embodiments, may be based at least partially on a count of data of the read pool, a count of data of the write pool, a count of data of the recent read pool, a count of data of the frequent read pool, a count of data of the dirty write pool, a count of data of the clean write pool, and/or counts of data of other types of data pools.

In one embodiment, the grooming cost for a selected region may account for data from several different data pools stored in the selected region by scaling or weighing counts for the data from different data pools and summing the results. For example, in certain embodiments, the grooming cost may include an amount of data of the dirty write pool multiplied by one or more scalars, an amount of data of the clean write pool multiplied by one or more scalars, an amount of data of the recent read pool multiplied by one or more scalars, an amount of data of the frequent read pool multiplied by one or more scalars, and/or amounts of data of other data pools multiplied by one or more scalars. The scalars used in the grooming cost, in one embodiment, are selected to represent a cache efficiency cost, a storage efficiency cost, and/or another sub-cost of grooming data from a selected region. In one embodiment, at least one scalar for each data pool is based on a difference between a target size of the data pool and an actual size of the data pool so that the groomer module 704 selects a region for grooming and/or eviction based on the differences between target sizes and actual sizes of the data pools.

In one embodiment, the groomer module 704 relocates or otherwise retains valid data of certain data pools in a selected region to preserve the valid data, to service storage requests, or the like. The groomer module 704, in certain embodiments, uses the dirty data module 728 to relocate or copy/write forward dirty data that has not been destaged from the dirty write pool upon grooming the dirty data of a selected region to preserve the dirty data. In another embodiment, the groomer module 704 may selectively relocate or copy forward clean data of the clean write pool that has already been destaged, such as clean data identified as frequently accessed data, or the like.

In another embodiment, instead of relocating or copying forward dirty write pool data of a selected region, the destage module 708 described below destages the dirty data in response to selecting a corresponding region of the cache 102 for grooming, or the like. In one embodiment, the dirty data module 728 decides whether to relocate or destage dirty write pool data of a selected region based on a difference between a target dirty write pool size and an actual dirty write pool size. For example, in one embodiment, the dirty data module 728 may retain/relocate dirty data of a selected region if the target dirty write pool size is greater than the actual dirty write pool size and destage the dirty data of the selected region if the target dirty write pool size is less than the actual dirty write pool size. In other embodiments, the destage module 708 may select data from the dirty write pool for destaging independently of the groomer module 704.

In one embodiment, the groomer module 704 uses the frequent data module 730 to relocate or copy/write forward data of the frequent read pool and/or other data from a selected region identified as frequently accessed data, to retain frequently accessed data in the cache 102. The frequent data module 730, in various embodiments, may retain cached read data of the frequent read pool, cached clean write data identified as frequently accessed, or both cached read data and clean write data identified as frequently accessed. The frequent data module 730, in a further embodiment, identifies frequently accessed data based on a frequency count, such as a map, bit field, bit array, frequent data flags, and/or other frequent data indicators.

In one embodiment, the frequent data module 730 may handle frequent read pool data of a selected region differently based on a grooming mode of the groomer module 704. In certain embodiments, the groomer module 704 may operate in a plurality of modes, such as a low pressure groom mode, a high pressure groom mode, or the like. For example, the groomer module 704 may transition from a low pressure groom mode to a high pressure groom mode in response to a lack of available storage capacity in the cache 102, a percentage of data marked as invalid reaching a predefined threshold level, performance of the cache 102 crossing a threshold value, in response to a storage capacity recovery event, or the like. In one embodiment, the groomer module 704 may select a grooming mode based on one or more differences between target pool sizes and actual pool sizes, or the like. For example, the groomer module 704, in certain embodiments, enters a low pressure groom mode in response to a target frequent read pool size that is greater than an actual frequent read pool size and enters a high pressure groom mode in response to a target frequent read pool size that is less than an actual frequent read pool size, or the like.

The frequent data module 730, in one embodiment, retains cached data of the frequent read pool and/or other data identified as frequently accessed data when the groomer module 704 is in a low pressure groom mode and the frequent data module 730 allows the eviction module 732 to evict cached data of the frequent read pool and/or other data identified as frequently accessed data when the groomer module 704 is in a high pressure groom mode. In embodiments where the read pool module 604 manages multiple data pools, each grouped by frequency count, the frequent data module 730 may progressively select data to retain and/or the eviction module 732 may progressively select data to evict pool by pool, progressing through the multiple data pools based on grooming pressure. For example, the eviction module 732 may evict data from data pools with successively higher frequency counts in response to increasing grooming pressure, while the frequent data module 730 retains less data, corresponding to successively higher frequency counts or the like. By processing data from one or more frequent read pools differently in a high pressure groom mode than in a low pressure groom mode, in certain embodiments, the groomer module 704 optimizes cache efficiency by retaining frequent read pool data when there is low grooming pressure, while optimizing storage capacity recovery when there is high grooming pressure.

The eviction module 732, in one embodiment, evicts, trims, erases, or otherwise clears data from a selected region to recover the storage capacity of the selected region. Erasing data from a selected region without relocating the data evicts the data from the cache 102. In one embodiment, the groomer module 704 and/or the eviction module 732 clears or erases all data in a selected region of the physical storage media 110 in response to the dirty data module 728 and/or the frequent data module 730 retaining or copying forward dirty write data and/or frequent data from the selected region, evicting data that is not retained or copied forward from the cache 102. In a further embodiment, the dirty data module 728 and/or the frequent data module 730 may mark data to be retained as valid and/or the eviction module 732 may mark data to be evicted as invalid, and a separate garbage collection process of the groomer 702 may retain the valid data and erase or otherwise clear the invalid data.

The eviction module 732, in certain embodiments, selects data for eviction from the cache 102 based at least partially on one or more differences between actual pool sizes and target pool sizes. For example, by using a grooming cost to select a region for grooming as described above, in certain embodiments, the eviction module 732 selects data for eviction based on a difference between an actual read pool size and a target read pool size (such as actual and target recent read pool sizes and/or actual and target frequent read pool sizes, or the like), based on a difference between an actual clean write pool size and a target clean write pool size, and/or a difference between an actual pool size and a target pool size for another type of data pool. By scaling data pool counts for a selected region by a difference between an actual pool size and a target pool size to form a grooming cost and grooming storage regions based on grooming cost, in one embodiment, the eviction module 732 selects data for eviction such that the actual pool sizes tend to follow the target pool sizes.

In one embodiment, the groomer module 704 includes or is part of an autonomous garbage collector system that operates within the cache 102. This allows the cache 102 to manage data so that data is systematically spread throughout the solid-state storage media 110, or other physical storage media, to improve performance, data reliability and to avoid overuse and underuse of any one location or area of the solid-state storage media 110 and to lengthen the useful life of the solid-state storage media 110.

The groomer module 704, upon recovering a selected region of the physical storage media 110, allows the cache 102 to re-use the region of the physical storage media 110 to store different data. In one embodiment, the groomer module 704 adds the recovered region of physical storage media 110 to an available storage pool for the cache 102, or the like. The groomer module 704 and/or the eviction module 732, in one embodiment, erase existing data in a selected region. In a further embodiment, the groomer module 704 and/or the eviction module 732 allow the cache 102 to overwrite existing data in a selected region. Whether or not the groomer module 704, in various embodiments, erases existing data in a selected region may depend on the nature of the physical storage media 110. For example, Flash media requires that cells be erased prior to reuse where magnetic media such as hard drives does not have that requirement. In an embodiment where the groomer module 704 does not erase data in a selected region, but allows the cache 102 to overwrite data in the selected region, the groomer module 704, in certain embodiments, may mark the data in the selected region as unavailable to service read requests so that subsequent requests for data in the selected region return a null result or an empty set of data until the cache 102 overwrites the data.

In one embodiment, the groomer module 704 recovers storage capacity of the cache 102 one or more storage regions at a time, or the like. A storage region, in one embodiment, is a logical or physical erase block or other predefined division. For flash memory, an erase operation on an erase block writes ones to every bit in the erase block. This is a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the eviction module 732 may erase the data of a storage division as it evicts data, instead of a separate garbage collection process of the groomer module 704.

The groomer module 704, in one embodiment, recovers storage capacity of the cache 102 in response to a storage capacity recovery event that triggers the groomer module 704 to recover storage capacity of the cache 102. In one embodiment, a storage capacity recovery event may include a grooming pressure for the cache 102 exceeding a predefined grooming pressure threshold. In another embodiment, a storage capacity recovery event may include an available storage capacity of the cache 102 falling below a predefined available capacity threshold. A storage capacity recovery event, in a further embodiment, may include a percentage of data marked as invalid in the cache 102 reaching a predefined invalid data threshold level. In various other embodiments, a storage capacity recovery event may include a consolidation of valid data, an error detection rate reaching a threshold value, performance crossing a threshold value, a scheduled garbage collection or grooming cycle, or the like.

In one embodiment, allowing the eviction module 732 to mark data as invalid rather than actually erasing the data and allowing the groomer module 704 to recover the physical media associated with invalid data, increases efficiency because, as mentioned above, for flash memory and other similar storage an erase operation takes a significant amount of time. Allowing the groomer module 704 to operate autonomously and opportunistically within the cache 102 provides a way to separate erase operations from reads, writes, and other faster operations so that the cache 102 operates very efficiently.

In one embodiment, the pool indicator module 706 maintains one or more pool membership indicators, sets of pool membership indicators, or the like for data of the cache 102 indicating in which pool of the cache 102 the data is a member. For example, the pool indicator module 706, in various embodiments, may maintain one or more read/write indicators, dirty/clean indicators, recent/frequent indicators, metadata indicators, valid/invalid indicators, or the like. The pool indicator module 706, in certain embodiments, maintains indicators for blocks of data in a region, such as packets, ECC chunks, pages, sectors, ranges of data, or the like within a region. For example, the pool indicator module 706 may maintain one or more maps, bit arrays, bit fields, flags, or the like denoting pool membership.

In one embodiment, the pool indicator module 706 maintains a read/write bit array indicating which blocks of a region include user write data, a dirty/clean bit array indicating which blocks of a region include dirty write data, and/or a recent/frequent bit array indicating which blocks of a region include frequent data. In certain embodiments, as described above with regard to the frequent data module 730, members from several data pools may be identified as frequently accessed data. In such an embodiment, data in the frequent read pool may be identified as data that is both read data and frequent data, using both a read/write bit array and a recent/frequent bit array or other indicators.

In other embodiments, instead of separate bit arrays, or the like, the pool indicator module 706 uses a single indicator with a different state for each data pool of the cache. For example, the pool indicator module 706, in one embodiment, may maintain a single map, bit array, bit field, or the like that denotes pool membership for blocks of a region, with each entry having a number of states equal to or greater than the number of data pools. In a further embodiment, such a map, bit array, bit field, or the like may include entries with at least two bits each, an entry representing membership in the recent read pool, the frequent read pool, the dirty write pool, or the clean write pool based on the state of the at least two bits.

In one embodiment, the pool indicator module 706 is in communication with the storage controller 104 to maintain the pool membership indicators or the like for the cache 102, such as maps, bit arrays, bit fields, flags, or the like. For example, the pool indicator module 706 may receive pool membership indicators from and/or send pool membership indicators to the storage controller 104. In one embodiment, the pool indicator module 706 and/or the storage controller 104 maintain pool membership indicators in a mapping structure of the direct mapping module 716, in a reverse map, in volatile memory of the cache 102 or the host device 114, in a region of data such as an erase block or a packet, and/or in other data storage. In a further embodiment, the pool indicator module 706 and/or the storage controller 104 may store pool membership indicators on volatile memory and may also store at least enough information to reconstruct the pool membership indicators on the storage media 110 of the cache 102.

In one embodiment, the pool indicator module 706 maintains one or more counts or tallies indicating an amount of blocks that a data pool includes. The pool indicator module 706, in various embodiments, may maintain counts or tallies for each region, such as a logical or physical erase block or the like, for the entire cache 102, or the like. For example, in one embodiment, the pool indicator module 706 may track an actual size of a read pool, an actual size of a recent read pool, an actual size of a frequent read pool, an actual size of a dirty write pool, and/or an actual size of a clean write pool as a count of the amount of data in the data pool. The pool indicator module 706, in a further embodiment, represents the count of the amount of data in a data pool as a number of blocks, such as a packet, an ECC chunk, a page, a sector, a range of data, or the like in the data pool.

In one embodiment, the pool indicator module 706 maintains pool membership indicators for data that the cache 102 currently stores and does not maintain pool membership indicators for evicted data. The combined actual sizes of data pools of the cache 102, in a further embodiment, are less than or equal to a storage capacity of the cache 102. In another embodiment, described in greater detail below with regard to the membership metadata module 718, the pool indicator module 706 and/or the membership metadata module 718 may maintain certain metadata for evicted data. For example, in one embodiment, the membership metadata module 718 may maintain an indicator indicating that the cache 102 previously stored a range of data, that a range of data was previously a member of a certain data pool, or the like and the read pool module 604 may add the data directly to a frequent read pool in response to a read request for the data, bypassing a recent read pool, or the like.

In one embodiment, the pool indicator module 706 maintains valid/invalid indicators, such as a validity map or an invalidity map, identifying which data in the cache 102 is valid and which data in the cache 102 is invalid. As used herein, a map may refer to any associative data structure associating a collection of unique keys with respective values. Looking up a unique key in a map returns the associated value. The validity map, in one embodiment, associates storage units, such as blocks, packets, sectors, pages, ECC chunks, or the like, of the cache 102 with a validity indicator that specifies that the data associated with the unit is either valid or invalid. The validity indicator, in certain embodiments, includes a bit in the validity map, with one state representing valid data and the other state representing invalid data.

A validity map, in various embodiments, may include a bit map, a table, a list, and/or another data structure known in the art. For example, a validity map may include a data structure suited for managing a very large and potentially sparsely populated domain such as an address space, comprising representations of valid or invalid storage units (and/or storage unit sets or ranges). For example, a validity map may comprise a sparse array with an entry for each storage unit that includes valid data. An invalidity map may be derived from a validity map (i.e., if a location is not in the validity map, then the location is invalid) or vice versa.

In one embodiment, the pool indicator module 706 updates valid/invalid indicators as new data is written to the cache 102, as data is invalidated, and the like. The pool indicator module 706, in certain embodiments, switches a valid/invalid indicator for data from valid to invalid in response to a subsequent write request corresponding to an address of the data, described above as a write hit. A write hit invalidates the previous data and replaces it with a new or updated version. In another embodiment, the pool indicator module 706 sets a valid/invalid indicator for data to invalid in response to a TRIM request for the data. In a further embodiment, the pool indicator module 706 switches a valid/invalid indicator for data from valid to invalid in response to the eviction module 732 selecting the data for eviction from the cache 102. The groomer module 704, in certain embodiments, upon selecting a region for grooming or garbage collection, trims, erases, clears, or otherwise removes invalid data of the region from the cache 102 based on valid/invalid indicators for data of the region and recovers the storage capacity of the region, as described above.

The pool indicator module 706, in certain embodiments, maintains one or more read/write indicators, dirty/clean indicators, recent/frequent indicators, valid/invalid indicators, or the like for data of each region of the cache 102, such as for data of each logical erase block, physical erase block, logical page, physical page, ECC chunk, packet, sector, or the like, indicating one or more states for each data block of a region. For example, in one embodiment, the pool indicator module 706 maintains a user write map, a dirty data map, a frequent data map, and/or a validity map per erase block of the cache 102, with an indicator in each map for each group of data in the erase block, such as a packet, ECC chunk, page, sector, range of data, or the like. The pool indicator module 706, in a further embodiment, maintains one or more read/write indicators, dirty/clean indicators, recent/frequent indicators, valid/invalid indicators, or the like in volatile memory, such as volatile memory of the host device 114, volatile memory of the cache 102, or the like. In certain embodiments, the pool indicator module 706 may periodically store one or more read/write indicators, dirty/clean indicators, recent/frequent indicators, valid/invalid indicators, or the like to the storage media 110 of the cache 102 to persist the indicated data states in non-volatile storage.

In one embodiment, the pool indicator module 706 sets an indicator that the destage module 708 has destaged data to the backing store 118 to track which write data is in the clean write and which data is in the dirty write pool. The pool indicator module 706, in one embodiment, sets the indicator that the backing store 118 stores the data once the destage module 708 has successfully written the data to the backing store 118. Setting the indicator (dirty/clean indicator) that the backing store 118 stores the data, in one embodiment, prevents the destage module 708 from destaging data a second time once the destage module 708 has already destaged the data. In a further embodiment, setting the indicator that the backing store 118 stores the data may affect a grooming cost for a region associated with the data, may alert a garbage collection or grooming process, such as the groomer module 704, that the data may be cleared from the cache 102, or the like. Similarly, in a further embodiment, the pool indicator module 706 sets an indicator that data from a recent read pool of the cache 102 has transitioned to a frequent read pool of the cache 102 in response to a frequent read threshold number of read hits for the data.

The destage module 708, in one embodiment, destages cached data from the dirty write pool of the cache 102 to the backing store 118. The destage module 708 destages data to the backing store 118 by copying, writing, storing, or otherwise persisting the data in the backing store 118. The destage module 708 destages dirty write data that the backing store 118 does not yet store. Data that is stored in the cache 102 that is not yet stored in the backing store 118 is referred to as "dirty" data. Once the backing store 118 stores data, the data is referred to as "clean." The destage module 708 destages or cleans data in the cache 102 by writing the data to the backing store 118. In one embodiment, the dirty write pool module 606 transitions destaged data from the dirty write pool to the clean write pool of the cache 102 in response to the destage module 708 destaging the data.

The dirty write pool module 606 and/or the clean write pool module 702, in certain embodiments, cooperate with the destage module 708 to adjust a size of the dirty write pool of the cache 102 and/or to adjust a size of the clean write pool of the cache 102. The destage module 708, in one embodiment, adjusts a destage rate at which the destage module 708 destages data to the backing store 118 based on a difference between an actual dirty write pool size and a target dirty write pool size that the dirty write pool module 606 sets. In a further embodiment, the destage module 708 may adjust the destage rate based on a difference between an actual clean write pool size and a target clean write pool size that the clean write pool module 702 sets. In another embodiment, the destage module 708 may adjust the destage rate based on both a difference between an actual dirty write pool size and a target dirty write pool size and a difference between an actual clean write pool size and a target clean write pool size, or the like. In certain embodiments, the dirty write pool module 606 and/or the clean write pool module 702 may set the destage rate for the destage module 708. In one embodiment, the destage module 708 and/or the dirty write pool module 606 set the destage rate to a level at which the size of the dirty write pool remains within a maximum dirty write pool size. Example embodiments of maximum dirty write pool sizes are described above with regard to the dirty write pool module 606 of FIG. 6.

As discussed in greater detail above with regard to the pool indicator module 706, in certain embodiments, the destage module 708 accesses one or more pool membership indicators, such as a clean/dirty indicator or the like, to determine which data in the cache 102 is dirty and is a candidate for destaging. In one embodiment, the destage module 708 and/or the pool indicator module 706 update one or more pool membership indicators in response to successfully destaging data to the backing store 118 so that the one or more pool membership indicators indicate that the destaged data is clean and is now a member of the clean write pool instead of the dirty write pool, or the like.

The destage module 708, in one embodiment, may determine an address for selected destage data in the backing store 118 based on a write request corresponding to the data. In a further embodiment, the destage module 708 determines an address for destage data in the backing store 118 based on a logical address of the data in the cache 102, based on a cache index, a mapping structure, or the like. In another embodiment, the destage module 708 uses a reverse map or the like to determine an address for destage data in the backing store 118 based on a physical address of the data in the cache 102.

The destage module 708, in one embodiment, writes data to the backing store 118 based on a write policy. In one embodiment, the destage module 708 uses a write-back write policy, and does not immediately write data of a write request to the backing store 118 upon detecting the write request. Instead, the destage module 708, in one embodiment, performs an opportunistic or "lazy" write, destaging data to the backing store 118 when the cache 102 and/or the direct cache module 116b has a light load, when available storage capacity in the cache 102 falls below a threshold, to satisfy a destaging pressure or target destage rate, or the like. In certain write-back embodiments, the destage module 708 may read data from the cache 102 and write the data to the backing store 118.

In another embodiment, instead of cleaning data according to a write-back write policy, the destage module 708 uses a write-through policy, performing a synchronous write to the backing store 118 for each write request that the write request module 712 (described below) receives. The destage module 708, in one embodiment, transitions from a write-back to a write-through write policy in response to a predefined error condition, such as an error or failure of the cache 102, or the like.

In one embodiment, the destage module 708 does not invalidate or evict destaged data from the cache 102, but destaged data remains in the cache 102 to service read requests until the destaged data is evicted from the cache by the eviction module 732. In a further embodiment, where the cache 102 does not include a clean write data pool or the like, the destage module 708 may invalidate, clear, or evict destaged data from the cache 102 once the backing store 118 stores the data. In certain embodiments, evicting data upon destaging may lead to an increase in cache misses, but may also increase a speed or efficiency of garbage collection/grooming of the cache 102 by the groomer module 704.

In one embodiment, the write forward module 710 writes data forward on a log of the cache 102 in response to a storage request for the data. As described above with regard to the frequent data module 730, in certain embodiments, upon grooming a region of the cache 102, the frequent data module 730 copies frequently accessed data forward on a log of the cache 102, such as data from the frequent read pool or the like. Typically, copying the data forward during a grooming process includes at least two transactions with the storage media 110 of the cache 102, one to read the data from the groomed region and one to write or program the data to the new region. In one embodiment, the write forward module 710 preemptively writes data forward while the data is already in volatile memory of the cache 102 and/or of the host device 114 due to a storage request, such as a read request, for the data, to reduce the number of transactions and bandwidth used to write frequently accessed data forward to retain the data in the cache 102.

For example, in one embodiment, the read request module 720 described below reads requested data from the cache 102 to service a read request and the write forward module 710 writes the requested data forward on a log of the cache 102 in response to the read request. In a further embodiment, the write forward module 710 writes requested data forward in response to a read request that satisfies a frequent read threshold number of read hits and transitions the data from the recent read pool to the frequent read pool of the cache 102, as described above. In one embodiment, where data transitions from the recent read pool to the frequent read pool in response to a second read request or read hit for the data, the write forward module 710 writes the data forward in response to the second read request for the data.

In one embodiment, the write forward module 710 queues or buffers frequently accessed data and writes the frequently accessed data forward a full region at a time, such as a full erase block or the like. In a further embodiment, the write forward module 710 writes frequently accessed data to a separate append point and/or to a separate log of the cache 102. For example, in one embodiment, the separate append point and/or separate log may include data of the frequent read pool so that the frequent pool module 726 can track the data of the frequent read pool without a pool membership indicator or the like.

In a further embodiment, the groomer module 704 may groom the separate log less frequently and/or the eviction module 732 may evict data from the separate log less frequently than a main ingestion log from which the write forward module 710 copied the frequently accessed data to preserve the frequently accessed data in the cache 102 for a longer period of time or the like. In another embodiment, once the destage module 708 has destaged the dirty data of the dirty write data pool from a region, the groomer module 704 and/or the eviction module 732 erases, evicts, trims, or otherwise clears the entire region upon selecting the region for grooming, because the write forward module 710 has already written forward any frequently accessed data from the region.

In certain embodiments, the write forward module 710 may write data to different append points, different logs, or the like based on read request count or other frequency count for data of the corresponding storage request. For example, the cache 102 may comprise separate append points and/or separate logs for each data pool that the read pool module 604 manages, for data grouped by frequency counts, or the like. Each append point and/or log may comprise data with frequency counts within a predefined range. Ranges of frequency counts for different append points and/or logs may be distributed evenly (e.g. 1-5, 6-10, 11-15), over a predefined scale such as a logarithmic scale (e.g. 1, 2-3, 4-7, 8-15), or the like. The groomer module 704 may groom logs with higher frequency counts with progressively less frequency, the eviction module 732 may evict data from logs with higher frequency counts with progressively less frequency, or the like. Grouping data in separate logs based on frequency of access, in certain embodiments, makes grooming, garbage collection, eviction, and/or other management functions of the cache 102 more efficient.

In one embodiment, the write request module 712 detects one or more write requests to store data on the backing store 118. The write request module 712 may detect a write request by receiving the write request directly, detecting a write request sent to a different module or entity (such as detecting a write request sent directly to the backing store 118), or the like. In one embodiment, the host device 114 sends the write request. The direct cache module 116b, in one embodiment, represents itself to the host device 114 as a storage device, and the host device 114 sends write requests directly to the write request module 712. In a further embodiment, the write request module 712 cooperates with the storage request module 602 to detect write requests.

A write request, in one embodiment, includes data that is not stored on the backing store 118. Data that is not stored on the backing store 118, in various embodiments, includes new data not yet stored on the backing store 118, modifications to data that is stored on the backing store 118, and the like. The write request, in various embodiments, may directly include the data, may include a reference, a pointer, or an address for the data, or the like. For example, in one embodiment, the write request includes a range of addresses indicating data to be stored on the backing store 118 by way of a Direct Memory Access ("DMA") or Remote DMA ("RDMA") operation. In a further embodiment, a single write request may include several different contiguous and/or noncontiguous ranges of addresses or blocks. In a further embodiment, the write request includes one or more destination addresses for the data, such as logical and/or physical addresses for the data on the cache 102 and/or on the backing store 118. The write request module 712 and/or another cooperating module, in various embodiments, may retrieve the data of a write request directly from the write request itself, from a storage location referenced by a write request (i.e., from a location in system memory or other data storage referenced in a DMA or RDMA request), or the like.

The cache write module 714, in one embodiment, writes data of a write request to the cache 102 to cache the data in the cache 102. The cache write module 714, in another embodiment, caches the data of the write request to the cache 102 at one or more logical addresses of the cache 102 corresponding to one or more backing store addresses of the write request. In one embodiment, the cache write module 714 caches the data to the cache 102 by appending the data to a sequential, log-based writing structure preserved in the physical storage media 110 of the cache 102 at an append point. The cache write module 714, in one embodiment, returns one or more physical addresses corresponding to a location of the append point at which the data was appended to a direct mapping module such as the direct mapping module 716 described below, which maps the one or more logical addresses of the cache 102 to the one or more physical addresses corresponding to the append point. In one embodiment, if a write request is a write hit and data corresponding to one or more backing store addresses of the write request is already cached in a data pool of the cache 102, the cache write module 714 invalidates the existing data in the cache 102.

In certain embodiments, the cache write module 714 determines whether to store data of a write request in the cache 102 based on membership metadata maintained by the membership metadata 718 described below. If the cache write module 714 determines not to store data of a write request in the cache 102, the cache write module 714 may write the data to the backing store 118, operating in a write around or write through mode. For example, the cache write module 714 may store data of a write request in the cache 102 in response to a frequency count, such as a read request count or write request count, for an address or address range of the write request satisfying a membership threshold and may store data of the write request in the backing store 118 without caching the data in response to the frequency count failing to satisfy the membership threshold.

The direct mapping module 716, in one embodiment, directly maps logical or physical addresses of the backing store 118 ("backing store addresses") to logical addresses of the cache 102 and directly maps logical addresses of the cache 102 to the backing store addresses of the backing store 118. As used herein, direct mapping of addresses means that for a given address in a first address space there is exactly one corresponding address in a second address space with no translation or manipulation of the address to get from an address in the first address space to the corresponding address in the second address space. The direct mapping module 716, in a further embodiment, maps backing store addresses to logical addresses of the cache 102 such that each backing store 118 address has a one to one relationship with a logical address of the cache 102. In one embodiment, the logical addresses of the cache 102 are independent of the physical addresses of the physical storage media 110 for the cache 102 and the physical addresses of the physical storage media 110 of the cache 102 are fully associative with backing store addresses of the backing store 118.

In one embodiment, the direct mapping module 716 maps the backing store addresses directly to logical addresses of the cache 102 so that the backing store addresses of the backing store 118 and the logical addresses of the cache 102 are equal or equivalent. In one example of this embodiment, the backing store addresses and the logical addresses of the cache 102 share a lower range of the logical address space of the cache 102, such as addresses between about $0-2^{32}$, or the like.

In one embodiment, the direct mapping module 716 directly maps logical addresses of the cache 102 to physical addresses and/or locations on the physical storage media 110 of the cache 102. In a further embodiment, the direct mapping module 716 uses a single mapping structure to map backing store addresses to logical addresses of the cache 102 and to map logical addresses of the cache 102 to locations on the physical storage media 110 of the cache 102. The mapping structure, in various embodiments, may include a B-tree, B*-tree, B+-tree, a CAM, a binary tree, a hash table, an index, an array, a linked-list, a look-up table, or another mapping data structure.

Use of a B-tree as the mapping structure in certain embodiments, is particularly advantageous where the logical address space presented to the client is a very large address space (such as $2^{64}$ addressable blocks or the like—which may or may not be sparsely populated). Because B-trees maintain an ordered structure, searching such a large space remains very fast. For example, in one embodiment, the mapping structure includes a B-tree with multiple nodes and each node may store several entries. In the example embodiment, each entry may map a variable sized range of logical addresses of the cache 102 to a location (such as a starting location) on the physical storage media 110 of the cache 102. Furthermore, the number of nodes in the B-tree may vary as the B-tree grows wider and/or deeper.

In one embodiment, the mapping structure of the direct mapping module 716 only includes a node or entry for logical addresses of the cache 102 that are associated with currently cached data in the cache 102. In this embodiment, membership in the mapping structure represents membership in the cache 102. The direct mapping module 716, in one embodiment, adds entries, nodes, and the like to the mapping structure as data is stored in the cache and removes entries, nodes, and the like from the mapping structure in response to data being evicted, cleared, trimmed, or otherwise removed from the cache 102.

Similarly, membership in the mapping structure may represent valid allocated blocks on the solid-state storage media 110. The solid-state storage controller 104 (and/or the direct mapping module 716), in one embodiment, adds entries, nodes, and the like to the mapping structure as data is stored on the solid-state storage media 110 and removes entries, nodes, and the like from the mapping structure in response to data being invalidated cleared, trimmed, or otherwise removed from the solid-state storage media 110. In the case where the mapping structure is shared for both cache management and data storage management on the solid-state storage media 110, the pool indicator module 706 described above, in certain embodiments, may also track pool membership, whether the data is dirty or clean to determine whether the data is persisted on the backing store 118, or the like.

In a further embodiment, as described below with regard to the membership metadata module 718, the mapping structure of the direct mapping module 716 may include one or more nodes or entries for logical addresses of the cache 102 that are not associated with currently stored data in the cache 102, but that are associated with evicted data that the cache 102 no longer stores, associated with read data that the cache 102 does not yet store, mapped to addresses of the backing store 118 that currently store data, or the like. The nodes or entries for logical addresses of the cache 102 that are not associated with currently stored data in the cache 102, in one embodiment, are not mapped to locations on the physical storage media 110 of the cache 102, but include an indicator that the cache 102 does not store data corresponding to the logical addresses and that the data has been evicted or that the cache 102 does not yet store the data. The nodes or entries, in a further embodiment, may include information that the data resides in the backing store 118. For example, in certain embodiments, the mapping structure of the direct mapping module 716 may include nodes or entries for read misses, data of which the backing store 118 stores but the cache 102 does not currently store. The direct mapping module 716, in one embodiment, may maintain metadata such as a read request count or another frequency count in entries for data that the cache 102 does not yet store, and the read request module 720, described below, may store the data in the cache 102, adding the data to a read pool, in response to the read request count satisfying a read request threshold number of read requests, or the like. Various embodiments where the direct mapping module 716 stores metadata in a mapping structure are described below with regard to FIGS. 11A-D.

Nodes, entries, records, or the like of the mapping structure, in one embodiment, may include information (such as physical addresses, offsets, indicators, etc.) directly, as part of the mapping structure, or may include pointers, references, or the like for locating information in memory, in a table, or in another data structure. The direct mapping module 716, in one embodiment, optimizes the mapping structure by monitoring the shape of the mapping structure, monitoring the size of the mapping structure, balancing the mapping structure, enforcing one or more predefined rules with regard to the mapping structure, ensuring that leaf nodes of the mapping structure are at the same depth, combining nodes, splitting nodes, and/or otherwise optimizing the mapping structure.

The direct mapping module 716, in one embodiment, stores the mapping structure on the solid-state storage media 110 of the cache 102. By storing the mapping structure on the cache 102, in a further embodiment, the mapping of addresses of the backing store 118 to the logical addresses of the cache 102 and/or the mapping of the logical addresses of the cache 102 to locations on the physical storage media 110 of the cache 102 are persistent, even if the cache 102 is subsequently paired with a different host device 114.

In one embodiment, the backing store 118 is also subsequently paired with the different host device 114. In a further embodiment, the cache 102 rebuilds or restores at least a portion of data from the backing store 118 on a new storage device associated with the different host device 114, based on the mapping structure and data stored on the cache 102.

In one embodiment, the direct mapping module 716 determines one or more factors of the grooming cost of a selected region for the groomer module 704 based on a history of access to the mapping structure. The direct mapping module 716, in a further embodiment, identifies areas of high frequency, "hot," use and/or low frequency, "cold," use by monitoring accesses of branches or nodes in the mapping structure. The direct mapping module 716, in a further embodiment, determines a count or frequency of access to a branch, directed edge, or node in the mapping structure. In one embodiment, a count associated with each node of a b-tree like mapping structure may be incremented for each I/O read operation and/or each I/O write operation that visits the node in a traversal of the mapping structure. Of course, in certain embodiments, separate read counts and write counts may be maintained for each node. Certain counts may be aggregated to different levels in the mapping structure in other embodiments.

The direct mapping module 716, in one embodiment, shares information with other modules such as the read pool module 604, the dirty write pool module 606, the clean write pool module 702, the groomer module 704, the destage module 708, and/or the membership metadata module 718, to increase the efficiency of the cache 102, to reduce cache misses, to make intelligent eviction decisions, and the like. In one embodiment, the direct mapping module 716 tracks or monitors a frequency that I/O requests access logical addresses in the mapping structure. The direct mapping module 716, in a further embodiment, stores the access frequency information in the mapping structure, communicates the access frequency information to the groomer module 704, or the like. The direct mapping module 716, in another embodiment, may track, collect, or monitor other usage/access statistics relating to the logical to physical mapping of addresses for the cache 102 and/or relating to the mapping between the logical address space of the cache 102 and the address space of the backing store 118, and may share that data with the groomer module 704.

One example of a benefit of sharing information between the direct mapping module 716 and other modules, in certain embodiments, is that write amplification can be reduced. As described above, in one embodiment, the groomer module 704 copies certain valid data in a selected region forward to the current append point of the log-based append-only writing structure of the cache 102 before recovering the physical storage capacity of the selected region. By cooperating with the destage module 708 and/or the direct mapping module 716, in one embodiment, the groomer module 704 may clear certain valid data from a region without copying the data forward (for example because a grooming cost algorithm for the groomer module 704 indicates that the valid data is unlikely to be re-requested soon, giving the region a low grooming cost), reducing write amplification, increasing available physical storage capacity and efficiency. The groomer module 704 can even clear valid user write data from an erase block, so long as the destage module 708 has destaged the data to the backing store 118.

For example, in one embodiment, the groomer module 704 preserves valid data with an access frequency in the mapping structure that is above a predefined threshold, and clears valid data from an erase block if the valid data has an access frequency below the predefined threshold, as described above with regard to the frequent data module 730. An access frequency in the mapping structure, in another embodiment, may transition data from a recent read pool to a frequent read pool, or the like. In a further embodiment, the eviction module 732 may mark certain data as conditionally evictable, conditionally invalid, or the like, and the groomer module 704 may evict the conditionally invalid data based on an access frequency or other data that the direct mapping module 716 provides. In another example, the destage module 708, the direct mapping module 716, and the groomer module 704 may cooperate such that valid data that is in the cache 102 and is dirty gets stored on the backing store 118 by the destage module 708 rather than copied to the front of the log, or the like.

Those of skill in the art will appreciate a variety of other examples and scenarios in which the modules responsible for managing the non-volatile storage media 110 that uses a log-based append-only writing structure can leverage the information available in the direct cache module 116b. Furthermore, those of skill in the art will appreciate a variety of other examples and scenarios in which the modules responsible for managing the cache 102 (read pool module 604, dirty write pool module 606, clean write pool module 702, groomer module 704, destage module 708, and/or direct mapping module 716) can leverage the information available in solid-state controller 104 regarding the condition of the non-volatile storage media 110.

In one embodiment, the membership metadata module 718 maintains metadata for data that the cache 102 does not currently store, such as data that the eviction module 732 has evicted from the cache 102 (e.g. read data evicted from the read pool, clean write data evicted from the clean write pool), data that has not yet been admitted to the cache 102, or the like. In another embodiment, the membership metadata module 718 may maintain metadata for data that the cache 102 does currently store. The membership metadata module 718, in a further embodiment, maintains metadata as one or more entries for the un-stored and/or evicted data in a mapping structure of the direct mapping module 716, or the like. For example, in one embodiment, the membership metadata module 718 updates the mapping structure and/or metadata associated with the mapping structure to indicate that the physical storage media 110 of the cache 102 does not store the evicted data, such as pointing a logical address or range of logical addresses associated with the evicted data to an invalid or null location. In another embodiment, the membership metadata module 718 maintains metadata that includes one or more pool membership indicators from the pool indicator module 706 indicating from which data pool evicted data was evicted, such as read/write indicators, dirty/clean indicators, recent/frequent indicators, valid/invalid indicators, or the like. The membership module 718, in a further embodiment, maintains a frequency count, such as a read request count or a write request count, for un-stored and/or evicted data.

In one embodiment, the read pool module 604 inserts previously evicted data directly to the frequent read pool of the cache 102 based on the metadata from the membership metadata module 718 for the evicted data, instead of adding the evicted data to the recent read pool of the cache 102, or the like. In another embodiment, the read pool module 604 inserts un-stored data directly to the frequent read pool of the cache 102 based on the metadata from the membership metadata module 718 for the un-stored data. For example, if a frequency count such as a read request count for un-stored data satisfies a membership threshold, the read pool module 604 may add the un-stored data directly to the frequent read pool of the cache 102. In such an embodiment, the recent pool that the recent pool module 724 manages may comprise a virtual data pool with data that the cache 102 does not currently store, represented by membership metadata maintained by the membership metadata module 718 or the like.

The membership metadata module 718, in a further embodiment, expires or ages out metadata after a predefined amount of time without a subsequent read and/or write request for the data, or the like. By leaving nodes or entries for evicted data in the mapping structure of the direct mapping module 716, in one embodiment, the eviction module 732 and/or the direct mapping module 716 may reduce the number of accesses to the storage media 110 of the cache 102 used for evicting the data, by leaving the nodes or entries dangling instead of reading the storage media 110 to locate the nodes or entries using a reverse map, or the like. Embodiments of mapping structures that includes membership metadata are described below with regard to FIGS. 11A-D.

In one embodiment, the read request module 720 services read requests for data stored in the cache 102 and/or the backing store 118. The read request module 720, in one embodiment, detects a read request to retrieve requested data from the backing store 118. In a further embodiment, the read request module 720 receives read requests from the host device 114. A read request is a read command with an indicator, such as a logical address or range of logical addresses, of the data being requested. In one embodiment, the read request module 720 supports read requests with several contiguous and/or noncontiguous ranges of logical addresses, as discussed above with regard to the write request module 712. The read request module 720, in a further embodiment, cooperates with the storage request module 602 to detect read requests.

In the depicted embodiment, the read request module 720 includes a read miss module 734 and a read retrieve module 736. The read miss module 734, in one embodiment, determines whether or not requested data is stored in the cache 102. The read miss module 734 may query the cache 102 directly, query the direct mapping module 716, query the mapping structure of the direct mapping module 716, or the like to determine whether or not requested data is stored in the cache 102.

The read retrieve module 736, in one embodiment, returns requested data to the requesting entity, such as the host device 114. If the read miss module 734 determines that the cache 102 stores the requested data, in one embodiment, the read retrieve module 736 reads the requested data from the cache 102 and returns the data to the requesting entity. The direct mapping module 716, in one embodiment, provides the read retrieve module 736 with one or more physical addresses of the requested data in the cache 102 by mapping one or more logical addresses of the requested data to the one or more physical addresses of the requested data.

If the read miss module 734 determines that the cache 102 does not store the requested data, in one embodiment, the read retrieve module 736 reads the requested data from the backing store 118, writes the requested data to the cache 102, and returns the requested data to the requesting entity. In one embodiment, the read retrieve module 736 writes the requested data to the cache 102 by appending the requested data to an append point of a log-based writing structure of the cache 102. In a further embodiment, the read retrieve module 736 provides one or more physical addresses corresponding to the append point to the direct mapping module 716 with the one or more logical addresses of the requested data and the direct mapping module 716 adds and/or updates the mapping structure with the mapping of logical and physical addresses for the requested data. The read retrieve module 736, in one embodiment, writes the requested data to the cache 102 using and/or in conjunction with the cache write module 714.

In certain embodiments, the read retrieve module 736 determines whether to store requested data from a read request in the cache 102 based on membership metadata maintained by the membership metadata 718 described above. If the read retrieve module 736 determines not to store requested data of a read request in the cache 102, the membership metadata 718 may update the membership metadata, such as a read request count or other frequency count. In one embodiment, the read retrieve module 736 may store requested data of a read request in the cache 102 in response to a frequency count, such as a read request count or write request count, for an address or address range of the read request satisfying a membership threshold or the like. For example, the read retrieve module 736 may store requested data of a read request in the cache 102 in response to a predefined number of read requests for the requested data or satisfying another predefined membership threshold, such as a preadmission threshold for un-stored data or a readmission threshold for evicted data.

In one embodiment, the read miss module 734 detects a partial miss, where the cache 102 stores one portion of the requested data but does not store another. A partial miss, in various embodiments, may be the result of eviction of the previously stored data, a block I/O request for noncontiguous data, or the like. The read miss module 734, in one embodiment, reads the missing data or "hole" data from the backing store 118 and returns both the portion of the requested data from the cache 102 and the portion of the requested data from the backing store 118 to the requesting entity. In one embodiment, the read miss module 734 stores the missing data retrieved from the backing store 118 in the cache 102.

In one embodiment, the backing store interface module 722 provides an interface between the direct cache module 116b, the cache 102, and/or the backing store 118. As described above with regard to FIG. 5, in various embodiments, the direct cache module 116b may interact with the cache 102 and/or the backing store 118 through a block device interface, a direct interface, a device driver on the host device 114, a storage controller, or the like. In one embodiment, the backing store interface module 722 provides the direct cache module 116b with access to one or more of these interfaces. For example, the backing store interface module 722 may receive read commands, write commands, and clear (or TRIM) commands from one or more of the cache write module 714, the direct mapping module 716, the read request module 720, the destage module 708, the groomer module 704, and the like and relay the commands to the cache 102 and/or the backing store 118. In a further embodiment, the backing store interface module 722 may translate or format a command into a format compatible with an interface for the cache 102 and/or the backing store 118.

In one embodiment, the backing store interface module 722 has exclusive ownership over the backing store 118 and the direct cache module 116b is an exclusive gateway to accessing the backing store 118. Providing the backing store interface module 722 with exclusive ownership over the backing store 118 and preventing access to the backing store 118 by other routes obviates stale data issues and cache coherency requirements, because all changes to data in the backing store 118 are processed by the direct cache module 116b.

In a further embodiment, the backing store interface module 722 does not have exclusive ownership of the backing store 118, and the backing store interface module 722 manages cache coherency for the cache 102. For example, in various embodiments, the backing store interface module 722 may access a common directory with other users of the backing store 118 to maintain coherency, may monitor write operations from other users of the backing store 118, may participate in a predefined coherency protocol with other users of the backing store 118, or the like.

Figure 8:
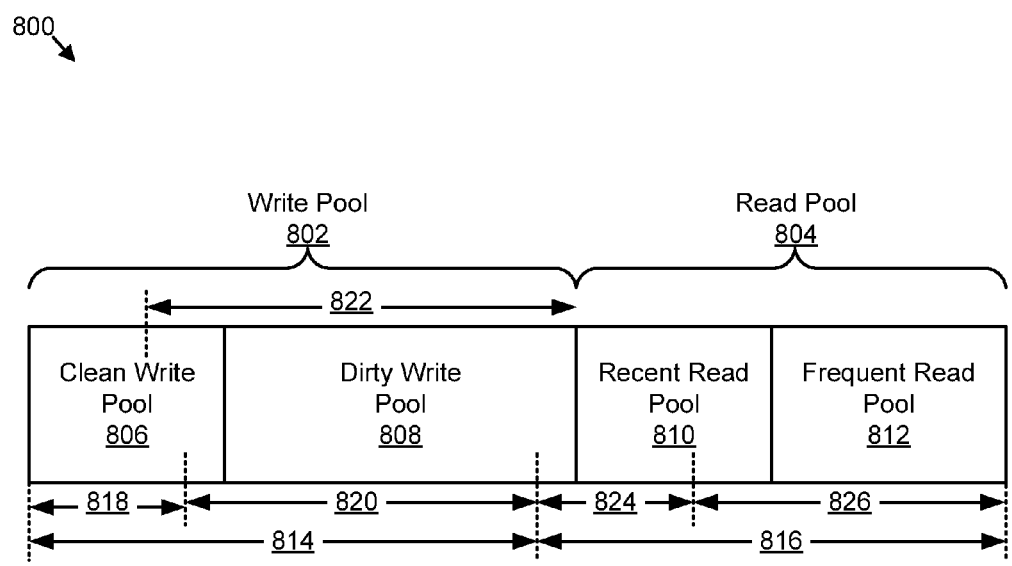
FIG. 8 is a schematic block diagram illustrating one embodiment of cache pools in accordance with the present invention.

FIG. 8 depicts one embodiment of cache pools 800, including a write pool 802 and a read pool 804. The write pool 802, in the depicted embodiment, includes a clean write pool 806 and a dirty write pool 808. The read pool 804, as depicted, includes a recent read pool 810 and a frequent read pool 812. The direct cache module 116, in one embodiment, manages and adjusts sizes of the write pool 802, including the clean write pool 806 and the dirty write pool 808, and the read pool 804, including the recent read pool 810 and the frequent read pool 812, to maximize a dirty write hit rate 808 and/or a read hit rate of the cache 102.

In the depicted embodiment, the dirty write pool module 606 and the clean write pool module 702 determine a target write pool size 814 for the write pool 802 as a sum of a target clean write pool size 818 and a target dirty write pool size 820. The read pool module 604, in the depicted embodiment, determines a target read pool size 816 for the read pool 804 as a sum of a target recent read pool size 824 determined by the recent pool module 724 and a target frequent read pool size 826 determined by the frequent pool module 726.

In the depicted embodiment, the dirty write pool module 606 manages the dirty write pool 808 to remain within a maximum dirty write pool size 822. In one embodiment, even if the target dirty write pool size 820 is greater than the maximum dirty write pool size 822, the dirty write pool module 606 maintains the actual size of the dirty write pool 808 within the maximum dirty write pool size 822. In a further embodiment, the dirty write pool module 808 ensures that the target dirty write pool size 820 does not exceed the maximum dirty write pool size 822. As described above, in certain embodiments, the dirty write pool module 606 adjusts a size of the dirty write pool 808 by setting a destage rate at which the destage module 708 destages dirty data from the dirty write pool 808 to the backing store 118, transitioning the destaged data to the clean write pool 806.

The combined size of the target write pool size 814 and the target read pool size 816 (and similarly the combined size of the target clean write pool size 818, the target dirty write pool size 820, the target recent read pool size 824, and the target frequent read pool size 826), in the depicted embodiment, is less than or equal to a usable storage capacity of the cache 102. In one embodiment, the read pool module 604, the dirty write pool module 606, and/or the clean write pool module 702 constrain the target sizes 814, 816, 818, 820, 824, 826 such that their combined size remains less than or equal to a usable storage capacity of the cache 102. In a further embodiment, while the combined actual sizes of the clean write pool 806, the dirty write pool 808, the recent read pool 810, and the frequent read pool 812 remain less than or equal to a usable storage capacity of the cache 102, the combined size of the target sizes 814, 816, 818, 820, 824, 826 may exceed the usable storage capacity of the cache 102 as the read pool module 604, the dirty write pool module 606, and/or the clean write pool module 702 adjust the target sizes 814, 816, 818, 820, 824, 826.

In the depicted embodiment, the actual size of the clean write pool 806 is greater than the target clean write pool size 818 and the actual size of the recent read pool 810 is greater than the target recent read pool size 824. The eviction module 732, in certain embodiments, selectively evicts data from the clean write pool 806 and the recent read pool 810 so that the actual sizes of the clean write pool 806 and the recent read pool 810 decrease, moving toward the target clean write pool size 818 and the target recent read pool size 824. In the depicted embodiment, the target dirty write pool size 820 is substantially similar to the actual size of the dirty write pool 808. In one embodiment, the dirty write pool module 606 sets the destage rate for the destage module 708 at a level to balance or compensate for additions to the dirty write pool 808 due to write requests, to maintain the actual size of the dirty write pool 808 at the target dirty write pool size 820. In a further embodiment, as the clean write pool module 702 and the recent read pool module 724 decrease the actual sizes of the clean write pool 806 and the recent read pool 810 and as the dirty write pool module 606 maintains the size of the dirty write pool 808, the actual size of the frequent read pool 812 will increase toward the target frequent read pool size 826 as data transitions from the recent read pool 810 to the frequent read pool 812.

Figure 9:
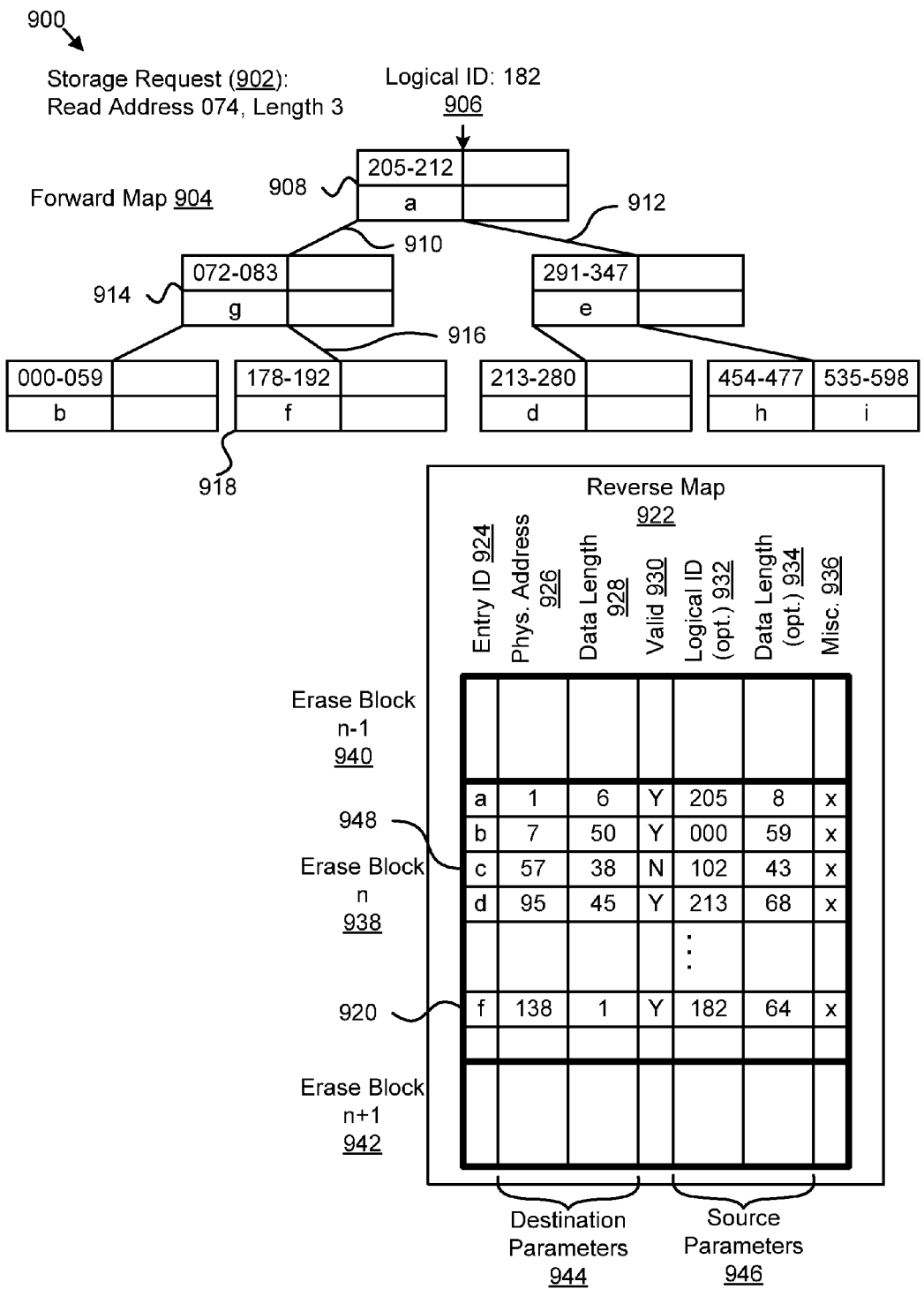
FIG. 9 is a schematic block diagram illustrating one embodiment of a forward map and a reverse map in accordance with the present invention.

FIG. 9 is a schematic block diagram of an example of a forward map 904 and a reverse map 922. Typically, the direct cache module 116 detects and/or receives a storage request, such as storage request to read an address. For example, the direct cache module 116 may receive a logical block storage request 902 to start reading read address "182" and read 3 blocks. Typically the forward map 904 stores logical block addresses as virtual/logical addresses along with other virtual/logical addresses so the direct mapping module 716 uses forward map 904 to identify a physical address from the virtual/logical address "182" of the storage request 902. In the example, for simplicity, only logical addresses that are numeric are shown, but one of skill in the art will recognize that any logical address may be used and represented in the forward map 904. A forward map 904, in other embodiments, may include alpha-numerical characters, hexadecimal characters, and the like. The forward map 904 is one embodiment of a mapping structure described above with regard to the direct mapping module 716.

In the example, the forward map 904 is a simple B-tree. In other embodiments, the forward map 904 may be a CAM, a binary tree, a hash table, or other data structure known to those of skill in the art. In the depicted embodiment, a B-Tree includes nodes (e.g. the root node 908) that may include entries of two logical addresses. Each entry, in one embodiment, may include a range of logical addresses. For example, a logical address may be in the form of a logical identifier with a range (e.g. offset and length) or may represent a range using a first and a last address or location. In a further embodiment, each entry may include an indicator of whether the included range of data is dirty or clean (not shown).

Where a single logical address or range of logical addresses is included at a particular node, such as the root node 908, if a logical address 906 being searched is lower than the logical address or addresses of the node, the search will continue down a directed edge 910 to the left of the node 908. If the searched logical address 906 matches the current node 908 (i.e., is located within the range identified in the node), the search stops and the pointer, link, physical address, etc. at the current node 908 is identified. If the searched logical address 906 is greater than the range of the current node 908, the search continues down directed edge 912 to the right of the current node 908. Where a node includes two logical addresses or ranges of logical addresses and a searched logical address 906 falls between the listed logical addresses of the node, the search continues down a center directed edge (not shown) to nodes with logical addresses that fall between the two logical addresses or ranges of logical addresses of the current node 908. A search continues down the B-tree until either locating a desired logical address or determining that the searched logical address 906 does not exist in the B-tree. As described above, in one embodiment, membership in the B-tree denotes membership in the cache 102, and determining that the searched logical address 906 is not in the B-tree is a cache miss.

In the example depicted in FIG. 9, the direct mapping module 716 searches for logical address "182" 906 starting at the root node 908. Since the searched logical address 906 is lower than the logical address of 205-212 in the root node 908, the direct mapping module 716 searches down the directed edge 910 to the left to the next node 914. The searched logical address "182" 906 is greater than the logical address (072-083) stored in the next node 914 so the direct mapping module 716 searches down a directed edge 916 to the right of the node 914 to the next node 918. In this example, the next node 918 includes a logical address of 178-192 so that the searched logical address "182" 906 matches the logical address 178-192 of this node 918 because the searched logical address "182" 906 falls within the range 178-192 of the node 918.

Once the direct mapping module 716 determines a match in the forward map 904, the direct mapping module 716 returns a physical address, either found within the node 918 or linked to the node 918. In the depicted example, the node 918 identified by the direct mapping module 716 as containing the searched logical address 906 includes a link "f" that maps to an entry 920 in the reverse map 922.

In the depicted embodiment, for each entry 920 in the reverse map 922 (depicted as a row in a table), the reverse map 922 includes an entry ID 924, a physical address 926, a data length 928 associated with the data stored at the physical address 926 on the solid-state storage media 110 (in this case the data is compressed), a valid tag 930, a logical address 932 (optional), a data length 934 (optional) associated with the logical address 932, and other miscellaneous data 936. In a further embodiment, the reverse map 922 may include an indicator of whether the physical address 926 stores dirty or clean data, or the like. The reverse map 922 is organized into erase blocks (erase regions). In this example, the entry 920 that corresponds to the selected node 918 is located in erase block n 938. Erase block n 938 is preceded by erase block n−1 940 and followed by erase block n+1 942 (the contents of erase blocks n−1 and n+1 are not shown). An erase block may be some erase region that includes a predetermined number of pages. An erase region is an area in the solid-state storage media 110 erased together in a storage recovery operation.

While the entry ID 924 is shown as being part of the reverse map 922, the entry ID 924 may be an address, a virtual link, or other means to tie an entry in the reverse map 922 to a node in the forward map 904. The physical address 926 is an address in the solid-state storage media 110 where data that corresponds to the searched logical address 906 resides. The data length 928 associated with the physical address 926 identifies a length of the data packet stored at the physical address 926. (Together the physical address 926 and data length 928 may be called destination parameters 944 and the logical address 932 and associated data length 934 may be called source parameters 946 for convenience.) In the example, the data length 928 of the destination parameters 944 is different from the data length 934 of the source parameters 946 in one embodiment compression the data packet stored on the solid-state storage media 110 was compressed prior to storage. For the data associated with the entry 920, the data was highly compressible and was compressed from 64 blocks to 1 block.

The valid tag 930 indicates if the data mapped to the entry 920 is valid or not. In this case, the data associated with the entry 920 is valid and is depicted in FIG. 9 as a "Y" in the row of the entry 920. Typically the reverse map 922 tracks both valid and invalid data and the forward map 904 tracks valid data. In the example, entry "c" 948 indicates that data associated with the entry 948 is invalid. Note that the forward map 904 does not include logical addresses associated with entry "c" 948. The reverse map 922 typically maintains entries for invalid data so that valid and invalid data can be quickly distinguished during a storage recovery operation. In certain embodiments, the forward map 904 and/or the reverse map 922 may track dirty and clean data in a similar manner to distinguish dirty data from clean data.

The depicted reverse map 922 includes source parameters 946 for convenience, but the reverse map 922 may or may not include the source parameters 946. For example, if the source parameters 946 are stored with the data, possibly in a header of the stored data, the reverse map 922 could identify a logical address indirectly by including a physical address 926 associated with the data and the source parameters 946 could be identified from the stored data. One of skill in the art will recognize when storing source parameters 946 in a reverse map 922 would be beneficial.

The reverse map 922 may also include other miscellaneous data 936, such as a file name, object name, source data, etc. One of skill in the art will recognize other information useful in a reverse map 922. While physical addresses 926 are depicted in the reverse map 922, in other embodiments, physical addresses 926, or other destination parameters 944, may be included in other locations, such as in the forward map 904, an intermediate table or data structure, etc.

Typically, the reverse map 922 is arranged by erase block or erase region so that traversing a section of the map associated with an erase block (e.g. erase block n 938) allows the groomer module 704 to identify valid data in the erase block 938 and to quantify an amount of valid data, or conversely invalid data, in the erase block 938. Similarly, the destage module 708, in certain embodiments, may traverse the reverse map 922 and/or the forward map 904 to locate dirty data for destaging, to quantify an amount of dirty data and/or clean data, or the like. Arranging an index into a forward map 904 that can be quickly searched to identify a physical address 926 from a logical address 906 and a reverse map 922 that can be quickly searched to identify valid data and quantity of valid data (and/or dirty data) in an erase block 938 is beneficial because the index may be optimized for searches, storage recovery, and/or destaging operations. One of skill in the art will recognize other benefits of an index with a forward map 904 and a reverse map 922.

Figure 10:
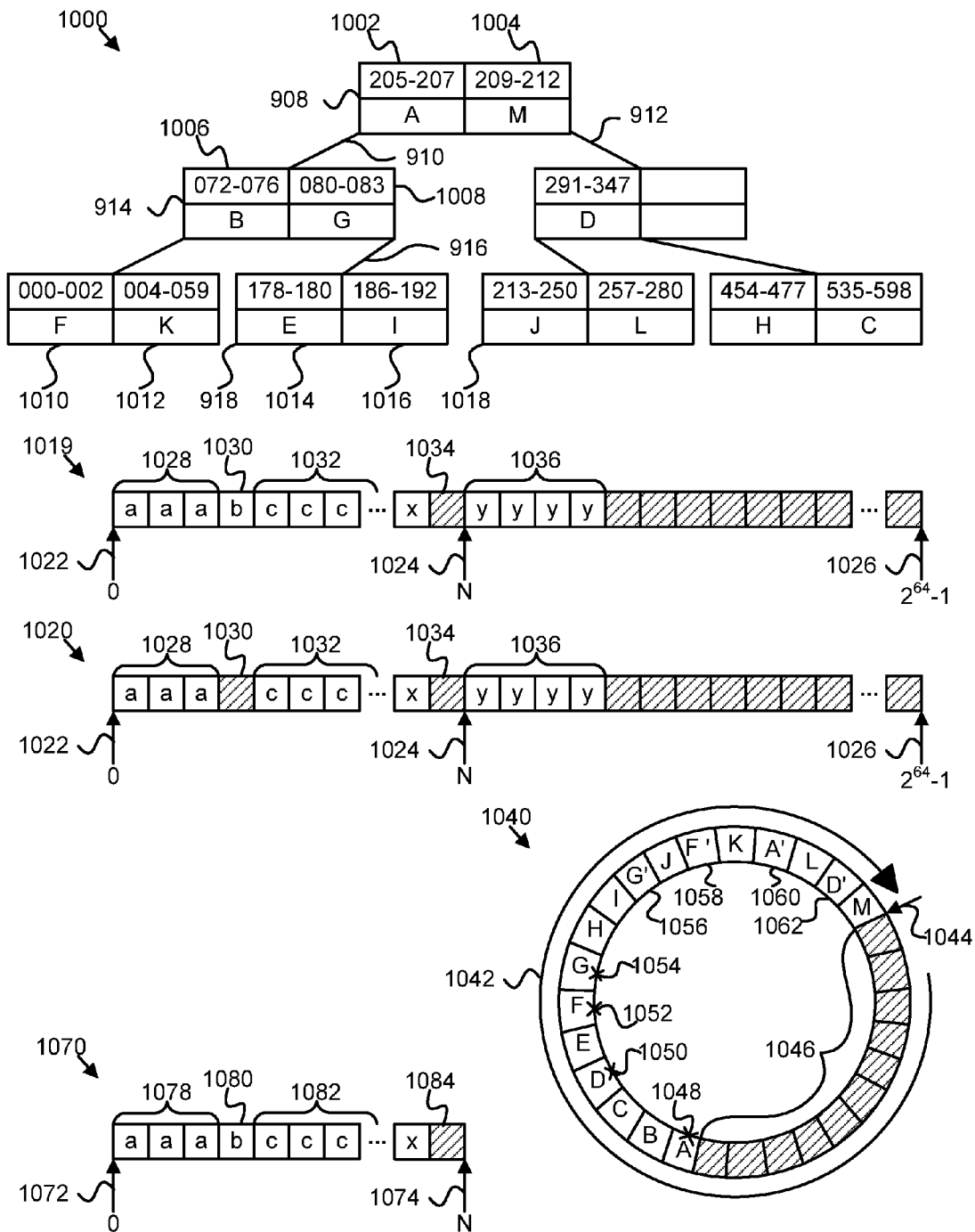
FIG. 10 is a schematic block diagram illustrating one embodiment of a mapping structure, a logical address space of a cache, a sequential, log-based, append-only writing structure, and an address space of a storage device in accordance with the present invention.

FIG. 10 depicts one embodiment of a mapping structure 1000, a logical address space 1020 of the cache 102, a combined logical address space 1019 that is accessible to a storage client, a sequential, log-based, append-only writing structure 1040, and a storage device address space 1070 of the backing store 118. The mapping structure 1000, in one embodiment, is maintained by the direct mapping module 716. The mapping structure 1000, in the depicted embodiment, is a B-tree that is substantially similar to the forward map 904 described above with regard to FIG. 9, with several additional entries. Further, instead of links that map to entries in a reverse map 922, the nodes of the mapping structure 1000 include direct references to physical locations in the cache 102. The mapping structure 1000, in various embodiments, may be used either with or without a reverse map 922. As described above with regard to the forward map 904 of FIG. 9, in other embodiments, the references in the mapping structure 1000 may include alphanumerical characters, hexadecimal characters, pointers, links, and the like.

The mapping structure 1000, in the depicted embodiment, includes a plurality of nodes. Each node, in the depicted embodiment, is capable of storing two entries. In other embodiments, each node may be capable of storing a greater number of entries, the number of entries at each level may change as the mapping structure 1000 grows or shrinks through use, or the like. In a further embodiment, each entry may store one or more indicators of whether the data corresponding to the entry is clean or dirty, valid or invalid, read data or write data, or the like.

Each entry, in the depicted embodiment, maps a variable length range of logical addresses of the cache 102 to a physical location in the storage media 110 for the cache 102. Further, while variable length ranges of logical addresses, in the depicted embodiment, are represented by a starting address and an ending address, in other embodiments, a variable length range of addresses may be represented by a starting address and a length or by another representation. In one embodiment, the capital letters 'A' through 'M' represent a logical or physical erase block in the physical storage media 110 of the cache 102 that stores the data of the corresponding range of logical addresses. In other embodiments, the capital letters may represent other physical addresses or locations of the cache 102. In the depicted embodiment, the capital letters 'A' through 'M' are also depicted in the writing structure 1040 which represents the physical storage media 110 of the cache 102. Although each range of logical addresses maps simply to an entire erase block, in the depicted embodiment, for simplicity of description, in other embodiments, a single erase block may store a plurality of ranges of logical addresses, ranges of logical addresses may cross erase block boundaries, and the like.

In the depicted embodiment, membership in the mapping structure 1000 denotes membership (or storage) in the cache 102. In another embodiment, an entry may further include an indicator of whether the cache 102 stores data corresponding to a logical block within the range of logical addresses, data of the reverse map 922 described above, and/or other data. For example, in one embodiment, the mapping structure 1000 may also map logical addresses of the backing store 118 to physical addresses or locations within the backing store 118, and an entry may include an indicator that the cache 102 does not store the data and a physical address or location for the data on the backing store 118. In another embodiment, described below with regard to FIGS. 11A-D, the mapping structure 1000 may also store logical addresses or other metadata corresponding to data that the eviction module 732 has evicted from the cache 102. The mapping structure 1000, in the depicted embodiment, is accessed and traversed in a similar manner as that described above with regard to the forward map 904.

In the depicted embodiment, the root node 908 includes entries 1002, 1004 with noncontiguous ranges of logical addresses. A "hole" exists at logical address "208" between the two entries 1002, 1004 of the root node. In one embodiment, a "hole" indicates that the cache 102 does not store data corresponding to one or more logical addresses corresponding to the "hole." In one embodiment, a "hole" may exist because the groomer module 704 evicted data corresponding to the "hole" from the cache 102. If the groomer module 704 evicted data corresponding to a "hole," in one embodiment, the backing store 118 still stores data corresponding to the "hole." In another embodiment, the cache 102 and/or the backing store 118 supports block I/O requests (read, write, trim, etc.) with multiple contiguous and/or noncontiguous ranges of addresses (i.e., ranges that include one or more "holes" in them). A "hole," in one embodiment, may be the result of a single block I/O request with two or more noncontiguous ranges of addresses. In a further embodiment, a "hole" may be the result of several different block I/O requests with address ranges bordering the "hole."

In FIG. 9, the root node 908 includes a single entry with a logical address range of "205-212," without the hole at logical address "208." If the entry of the root node 908 were a fixed size cache line of a traditional cache, the entire range of logical addresses "205-212" would be evicted together. Instead, in the embodiment depicted in FIG. 10, the groomer module 704 evicts data of a single logical address "208" and splits the range of logical addresses into two separate entries 1002, 1004. In one embodiment, the direct mapping module 716 may rebalance the mapping structure 1000, adjust the location of a directed edge, root node, or child node, or the like in response to splitting a range of logical addresses. Similarly, in one embodiment, each range of logical addresses may have a dynamic and/or variable length, allowing the cache 102 to store dynamically selected and/or variable lengths of logical block ranges.

In the depicted embodiment, similar "holes" or noncontiguous ranges of logical addresses exist between the entries 1006, 1008 of the node 914, between the entries 1010, 1012 of the left child node of the node 914, between entries 1014, 1016 of the node 918, and between entries of the node 1018. In one embodiment, similar "holes" may also exist between entries in parent nodes and child nodes. For example, in the depicted embodiment, a "hole" of logical addresses "060-071" exists between the left entry 1006 of the node 914 and the right entry 1012 of the left child node of the node 914.

The "hole" at logical address "003," in the depicted embodiment, can also be seen in the logical address space 1020 of the cache 102 at logical address "003" 1030. The hash marks at logical address "003" 1030 represent an empty location, or a location for which the cache 102 does not store data. In the depicted embodiment, storage device address "003" 1080 of the storage device address space 1070 does store data (identified as 'b'), indicating that the eviction module 732 evicted data from logical address "003" 1030 of the cache 102. The "hole" at logical address 1034 in the logical address space 1020, however, has no corresponding data in storage device address 1084, indicating that the "hole" is due to one or more block I/O requests with noncontiguous ranges, a trim or other deallocation command to both the cache 102 and the backing store 118, or the like.

The "hole" at logical address "003" 1030 of the logical address space 1020, however, in one embodiment, is not viewable or detectable to a storage client. In the depicted embodiment, the combined logical address space 1019 represents the data that is available to a storage client, with data that is stored in the cache 102 and data that is stored in the backing store 118 but not in the cache 102. As described above, the read miss module 734 of FIG. 7 handles misses and returns requested data to a requesting entity. In the depicted embodiment, if a storage client requests data at logical address "003" 1030, the read miss module 734 will retrieve the data from the backing store 118, as depicted at address "003" 1080 of the storage device address space 1070, and return the requested data to the storage client. The requested data at logical address "003" 1030 may then also be placed back in the cache 102 and thus logical address 1030 would indicate 'b' as present in the cache 102.

For a partial miss, the read miss module 734 may return a combination of data from both the cache 102 and the backing store 118. For this reason, the combined logical address space 1019 includes data 'b' at logical address "003" 1030 and the "hole" in the logical address space 1020 of the cache 102 is transparent. In the depicted embodiment, the combined logical address space 1019 is the size of the logical address space 1020 of the cache 102 and is larger than the storage device address space 1080. In another embodiment, the direct cache module 116 may size the combined logical address space 1019 as the size of the storage device address space 1080, or as another size.

The logical address space 1020 of the cache 102, in the depicted embodiment, is larger than the physical storage capacity and corresponding storage device address space 1070 of the backing store 118. In the depicted embodiment, the cache 102 has a 64 bit logical address space 1020 beginning at logical address "0" 1022 and extending to logical address "$2^{64}-1$," 1026. The storage device address space 1070 begins at storage device address "0" 1072 and extends to storage device address "N" 1074. Storage device address "N" 1074, in the depicted embodiment, corresponds to logical address "N" 1024 in the logical address space 1020 of the cache 102. Because the storage device address space 1070 corresponds to only a subset of the logical address space 1020 of the cache 102, the rest of the logical address space 1020 may be shared with an additional cache 102, may be mapped to a different backing store 118, may store data in the cache 102 (such as a Non-volatile memory cache) that is not stored in the storage device 1070, or the like.

For example, in the depicted embodiment, the first range of logical addresses "000-002" 1028 stores data corresponding to the first range of storage device addresses "000-002" 1078. Data corresponding to logical address "003" 1030, as described above, was evicted from the cache 102 forming a "hole" and a potential cache miss. The second range of logical addresses "004-059" 1032 corresponds to the second range of storage device addresses "004-059" 1082. However, the final range of logical addresses 1036 extending from logical address "N" 1024 extends beyond storage device address "N" 1074. No storage device address in the storage device address space 1070 corresponds to the final range of logical addresses 1036. The cache 102 may store the data corresponding to the final range of logical addresses 1036 until the data backing store 118 is replaced with larger storage or is expanded logically, until an additional data backing store 118 is added, simply use the non-volatile storage capability of the cache 102 to indefinitely provide storage capacity directly to a storage client 504 independent of a backing store 118, or the like. In a further embodiment, the direct cache module 116 alerts a storage client 504, an operating system, a user application 502, or the like in response to detecting a write request with a range of addresses, such as the final range of logical addresses 1036, that extends beyond the storage device address space 1070. The user may then perform some maintenance or other remedial operation to address the situation. Depending on the nature of the data, no further action may be taken. For example, the data may represent temporary data which if lost would cause no ill effects.

The sequential, log-based, append-only writing structure 1040, in the depicted embodiment, is a logical representation of the log preserved in the physical storage media 110 of the cache 102. In a further embodiment, the backing store 118 may use a substantially similar sequential, log-based, append-only writing structure 1040. In certain embodiments, the cache 102 stores data sequentially, appending data to the writing structure 1040 at an append point 1044. The cache 102, in a further embodiment, uses a storage space recovery process, such as the groomer module 704 that re-uses non-volatile storage media 110 storing deallocated, unused, or evicted logical blocks. Non-volatile storage media 110 storing deallocated, unused, or evicted logical blocks, in the depicted embodiment, is added to an available storage pool 1046 for the cache 102. By evicting and clearing certain data from the cache 102, as described above, and adding the physical storage capacity corresponding to the evicted and/or cleared data back to the available storage pool 1046, in one embodiment, the writing structure 1040 is ring-like and has a theoretically infinite capacity.

In the depicted embodiment, the append point 1044 progresses around the log-based, append-only writing structure 1040 in a circular pattern 1042. In one embodiment, the circular pattern 1042 wear balances the solid-state storage media 110, increasing a usable life of the solid-state storage media 110. In the depicted embodiment, the eviction module 732 and/or the cache write module 714 have marked several blocks 1048, 1050, 1052, 1054 as invalid, represented by an "X" marking on the blocks 1048, 1050, 1052, 1054. The groomer module 704, in one embodiment, will recover the physical storage capacity of the invalid blocks 1048, 1050, 1052, 1054 and add the recovered capacity to the available storage pool 1046. In the depicted embodiment, modified versions of the blocks 1048, 1050, 1052, 1054 have been appended to the writing structure 1040 as new blocks 1056, 1058, 1060, 1062 in a read, modify, write operation or the like, allowing the original blocks 1048, 1050, 1052, 1054 to be recovered. In further embodiments, the groomer module 704 may copy forward to the append point 1044 any dirty data and selectively any valid data that the blocks 1048, 1050, 1052, 1054 store, if any.

Figure 11A:
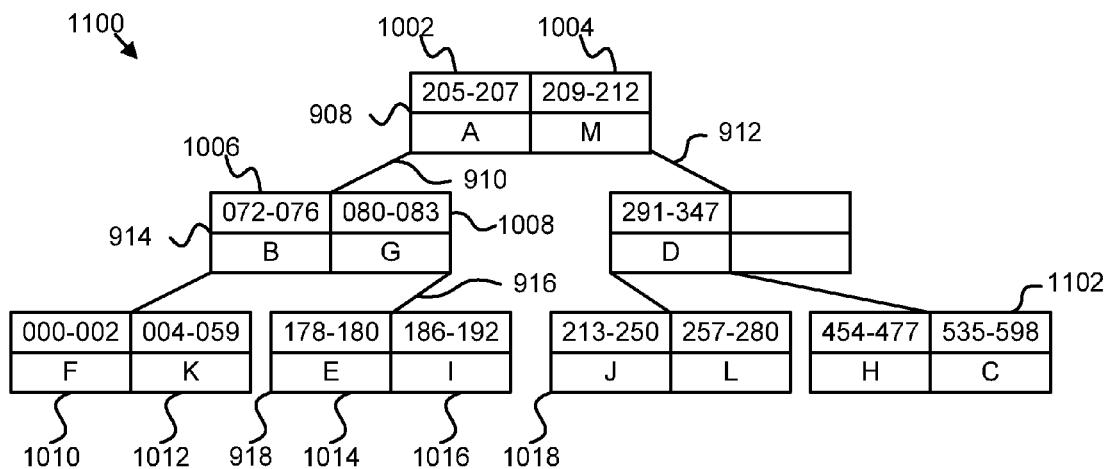
FIG. 11A is a schematic block diagram illustrating one embodiment of a mapping structure and a cache membership map in accordance with the present invention.

FIG. 11A depicts one embodiment of a mapping structure 1100 and a cache membership map 1110. In the depicted embodiment, the mapping structure 1100 is substantially similar to the mapping structure 1000 of FIG. 10, with similar entries and nodes. The mapping structure 1100, in the depicted embodiment, however, instead of mapping logical addresses to physical locations in the cache 102 as described above with regard to FIGS. 9 and 10, maps logical addresses to pseudo identifiers 1112 in the cache membership map 1110. The cache membership map 1110 comprises a secondary mapping structure that provides a layer of abstraction between the mapping structure 1100 and the storage media 110 of the cache 102. Use of the cache membership map 1110 may reduce the number of accesses to the mapping structure 1100 and/or the storage media 110.

The cache membership map 1110, in the depicted embodiment, maps pseudo identifiers 1112 to physical locations 1114 of the storage media 110 of the cache 102, with a NULL physical location 1114 or another predefined invalid physical location 1114 indicating that the eviction module 732 has evicted the data of the corresponding logical address or range of logical addresses, that the cache 102 does not yet store data of a read request, or the like. For example, in one embodiment, the physical location 1114 is a physical or logical erase block address (or another region address) and the pseudo identifier 1112 is a pseudo erase block address (or another pseudo region address). In a further embodiment, the pseudo identifier 1112 and/or the physical location 1114 may include block addresses, such as packet addresses, page addresses, offset, or the like, within a region, or other additional address information.

In one embodiment, the membership metadata module 718 maintains nodes and/or entries in the mapping structure 1100 for logical addresses or ranges of logical addresses that the eviction module 732 evicts from the cache 102. In the depicted embodiment, the eviction module 732 has evicted data of logical address range "535-598" from the cache 102 and the membership metadata module 718 maintains an evicted metadata entry 1102 and node in the mapping structure 1100 for the evicted logical address range mapping the range to the pseudo identifier 1112 of "C." In response to the eviction module 732 evicting the data of logical address range "535-598," in the depicted embodiment, the membership metadata module 718 updates the cache membership map 1110 so that the physical location 1114 for the pseudo identifier 1112 of "C" is NULL.

In other embodiments, the membership metadata module 718 may use zero or another predefined invalid physical location 1114 to indicate that the cache 102 does not currently store the data and/or that the eviction module 732 has evicted the data. The membership metadata module 718, in certain embodiments, may store other membership metadata, such as a frequency count, a pool indicator (e.g. a read/write indicator, a dirty/clean indicator, a recent/frequent indicator, a valid/invalid indicator), or the like as an entry in the mapping structure 1100 and/or as an entry in the cache membership map 1110. The membership metadata module 718 may store membership metadata in the mapping structure 1100 and/or in the cache membership map 1110 either in place of or in addition to a physical location 1114. For example, the membership metadata module 718 may store membership metadata, such as a frequency count, for one or more logical addresses when the cache 102 does not store data associated with the one or more logical addresses, as eviction metadata, preadmission metadata, or the like. In one embodiment, the membership metadata of the mapping structure 1100 and/or of the cache membership map 1110 comprises eviction metadata associated with data that the eviction module 732 evicts from the cache 102. In another embodiment, the membership metadata of the mapping structure 1100 and/or of the cache membership map 1110 comprises preadmission metadata associated with data that the cache 102 does not yet store.

The membership metadata may include a frequency count, such as a read request count and/or write request count, for a range of one or more logical addresses, as described above with regard to the storage request module 602 and the membership metadata module 718. The read request module 720 may wait a preadmission threshold number of read requests before admitting un-stored data into the cache 102, may wait a readmission threshold number of read requests before readmitting evicted data into the cache 102, or the like based on a frequency count for the data. In embodiments where the membership metadata module 718 selectively stores membership metadata, such as a frequency count or the like, in place of a valid physical location 1114, the membership metadata module 718 may store the membership metadata as an entry in the mapping structure 1100 and/or in the cache membership map 1110 prior to the read request module 720 admitting corresponding data into the cache 102, transition the entry to a valid physical location 1114 in response to the read request module 720 admitting the corresponding data into the cache 102, and transition the entry back to membership metadata in response to the eviction module 732 evicting the corresponding data from the cache 102, or the like. In such embodiments, the membership metadata may have a value that is invalid or out-of-bounds for a valid physical location 1114 to indicate that the entry comprises a frequency count or other membership metadata, not a valid physical location 1114. In other embodiments, an entry may comprise a predefined bit, a flag, or another indicator to distinguish membership metadata from a valid physical location 1114.

In a further embodiment, the membership metadata module 718 stores a timestamp, a sequence number such as a block or packet number from a log of the cache 102, or the like for each block or range of evicted data, un-stored data, or the like. The membership metadata module 718 may determine which data has been evicted and, in certain embodiments, an order of eviction, a time period of an eviction, or the like based on the stored timestamps or sequence numbers. For example, the membership metadata module 718, in one embodiment, may compare a stored timestamp or sequence number to a current time, a current sequence number of a log, an oldest sequence number of a log of the cache 102, or the like to determine whether the eviction module 732 evicted the data, how long ago the eviction module 732 evicted data, in what order the eviction module 732 evicted data, or the like. In the depicted embodiment, the membership metadata module 718 has also updated the physical location 1114 corresponding to the pseudo identifier 1112 of "G" to NULL in response to the eviction module 732 evicting data corresponding to the logical address range "080-083" from another entry 1008.

In one embodiment, the membership metadata module 718 periodically expires or ages out entries from the mapping structure 1100 that are associated with evicted data or other un-stored data, such as the depicted entries 1008, 1102. For example, in certain embodiments, the membership metadata module 718 may remove the entries 1008, 1102 with evicted metadata from the mapping structure 1100 in response to a predefined time period passing without a subsequent read request for the logical addresses of the entries 1008, 1102, or the like. In another embodiment, the membership metadata module 718 may periodically scan the mapping structure 1100 for dangling entries and/or nodes corresponding to evicted data and remove the dangling entries and/or nodes, replace the pseudo identifier 1112 of a dangling entry and/or node with an invalid or NULL pseudo identifier 1112, or the like. In a further embodiment, upon removing, expiring, or aging out an entry from the mapping structure 1100, the membership metadata module 718 reuses the pseudo identifier 1112 associated with the removed entries.

In another embodiment, entries of the mapping structure 1100 may include either physical locations 1114 or pseudo identifiers 1112 and the physical locations 1114 are distinguishable from the pseudo identifiers 1112, by a predefined bit, a flag, or the like. For example, in one embodiment, the mapping structure 1100 includes a first set of entries with ranges of logical addresses that map to pseudo identifiers 1112 and also includes a second set of entries with ranges of logical addresses that map directly to a physical location 1114. The mapping structure 1100 may distinguish between pseudo identifiers 1112 and physical locations 1114 with an indicator for each entry, such as a flag, a predefined bit, or the like. For the first set of entries that include a pseudo identifier 1112 without a physical location 1114, the direct mapping module 716 and/or the membership metadata module 718 checks the cache membership map 1110 to either map the pseudo identifier 1112 to a valid physical location 1114 or to determine that the eviction module 732 evicted the associated data. For the second set of entries that include a physical location 1114, the direct mapping module 716 and/or the membership metadata module 718, in certain embodiments, may map the entry directly to the included physical location 1114, without checking the cache membership map 1110.

The membership metadata module 718, in certain embodiments, may periodically scan the mapping structure 1100 and/or the cache membership map 1110 to update and/or convert between physical locations 1114 and pseudo identifiers 1112, or the like. For example, the membership metadata module 718 may scan the mapping structure 1100 to remove entries for evicted data, such as the "535-598" entry 1102 which maps to the "C" pseudo identifier 1112 and a NULL physical location 1114 in the cache membership map 1110 and the "080-083" entry 1008 which maps to the "G" pseudo identifier 1112 and a NULL physical location 1114. Pruning entries for evicted data from the mapping structure 1100, in certain embodiments, may increase data structure efficiency of the mapping structure 1100, decreasing access times and the like. The membership metadata module 718, upon removing the entries 1102, 1008 from the mapping structure 1100, in a further embodiment, may reuse the pseudo identifiers 1112 of "C" and "G." In another embodiment, the membership metadata module 718 may scan the mapping structure 1100 to replace pseudo identifiers 1112 with physical locations 1114 for entries that map to valid physical locations 1114.

In other embodiments, the mapping structure 1100 and/or the cache membership map 1110 may include additional membership metadata, such as one or more pool membership indicators for evicted data, a log order sequence number for evicted data such as a block or packet number, a frequency count for evicted data or other un-stored data, and/or other metadata related to evicted data or other un-stored data. In certain embodiments, the eviction module 732 may evict data from the cache 102 in log order, from oldest toward newest or the like, and the membership metadata module 718 may use a log order sequence number to determine which data the eviction module 732 has evicted, by comparing the log order sequence number to a last or oldest log order sequence number of a log of the cache 102, or the like. The membership metadata module 718 may use log order sequence numbers, in various embodiments, either in place of a cache membership map 1110, in conjunction with a cache membership map 1110 to determine which entries to prune or remove from the mapping structure 1100, or the like.

In one embodiment, maintaining metadata for evicted data or other un-stored data, such as entries and/or nodes in the mapping structure 1100 and/or the cache membership map 1110, assists the direct cache module 116 in balancing and adjusting pool sizes by providing a history or other metadata of the data. In other embodiments, the membership metadata for evicted data or other un-stored data may determine in which pool the data is added to upon a subsequent read request for the data. For example, in certain embodiments, the read pool module 604 may add data directly to a frequent pool upon caching the data if membership metadata for the data indicates that the eviction module 732 evicted the data within a predefined amount of time, that a frequency count for the data satisfies a preadmission or readmission threshold, or the like.

In a further embodiment, maintaining metadata for evicted data or other un-stored data may reduce accesses to the storage media 110 of the cache 102, because the eviction module 732 does not need to access a reverse map, such as the reverse map 922 or the like, when evicting the data to map evicted data back to the data structure 1100 to remove the entry corresponding to the evicted data, but may instead leave the entry dangling. In other embodiments, instead of using the cache membership map 1110 and maintaining evicted metadata in the mapping structure 1100, the eviction module 732 may access a reverse map 922 from the storage media 110, store a reverse map 922 in volatile memory, read a reverse map 922 from a region upon the groomer module 704 grooming the region, or the like and may remove entries and/or nodes from the mapping structure 1100 in response to evicting data corresponding to the entries and/or nodes.

As described above with regard to the direct mapping module 716 of FIG. 7, in certain embodiments, the direct mapping module 716 may maintain entries in the mapping structure 1100 for un-stored data that the cache 102 does not yet store or does not currently store. For example, in embodiments where the read request module 720 does not store data of a read request in the cache 102 until the cache 102 has received a read request threshold number of read requests for the data, the direct mapping module 716 may maintain an entry for the data in the mapping structure with a read request count or another frequency count. The cache membership map 1110 may map a pseudo identifier 1112 for the entry to a NULL or other invalid physical location 1114 until the read request count satisfies a read request threshold and the read request module 720 stores the data in the cache 102. In one embodiment, the cache membership map 1110 uses a different invalid physical location 1114 for eviction metadata entries than for read request metadata entries, to differentiate the two. In a further embodiment, the cache membership map 1110 and/or the mapping structure 1100 include an indicator or flag to differentiate eviction metadata entries from preadmission metadata entries.

In one embodiment, the direct mapping module 716 maintains entries for data of a recent read pool in the mapping structure 1100 and the read request module 720 does not store data of the recent read pool in the cache 102 until the data transitions to a frequent read pool, satisfies a read request threshold, or the like. In this embodiment, a recent read pool may exist logically in the mapping structure 1100 instead of including data stored physically in the cache 102. In other embodiments, a recent read pool or other data pool may include both data that the cache 102 does not store (un-stored data represented by membership metadata in the mapping structure 1100 or the like) and data that the cache 102 does store, or may include just data that the cache 102 currently stores.

Figures 11B, 11C:
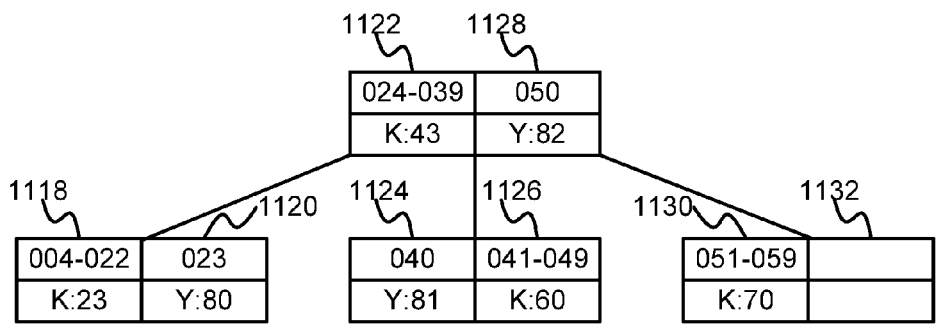
FIG. 11B is a schematic block diagram illustrating one embodiment of a mapping structure entry and a cache membership map in accordance with the present invention.
FIG. 11C is a schematic block diagram illustrating one embodiment of mapping structure entries and a cache membership map in accordance with the present invention.

FIG. 11B depicts one embodiment of a mapping structure entry 1012 and a cache membership map 1120a. In one embodiment, the mapping structure entry 1012 is substantially similar to the mapping structure entry 1012 depicted in FIG. 11A, and may be an entry in the mapping structure 1100. The mapping structure entry 1012, in the depicted embodiment, maps logical addresses "004-059" to a pseudo identifier 1112 of "K:23." The format of the pseudo identifier 1112 in the mapping structure entry 1012 is pseudo identifier:offset, where the offset indicates a relative position of data within a region corresponding to the pseudo identifier 1112. In the depicted embodiment, the cache membership map 1120a maps the pseudo identifier 1112 of "K" to the physical location 1114 of "50."

For example, in one embodiment, where the physical location 1114 of "50" is an erase block or other region (such as a logical erase block) of the cache 102, the mapping structure entry 1012 and the cache membership map 1120a indicate that the cache 102 stores data corresponding to logical addresses "004-059" in erase block "50" starting at an offset of "23." The offset, in various embodiments, may indicate a block number within a region, such as a packet number, an ECC chunk number, a sector number, a page number, or the like; a relative address within a region; or another relative position of a region. By including an offset in a mapping structure entry 1012, in certain embodiments, a mapping structure 1100 may map multiple logical addresses and/or ranges of logical addresses to physical locations within the same region.

The cache membership map 1120*a*, in one embodiment, is substantially similar to the cache membership map 1110 described above with regard to FIG. 11A, but further includes sequence numbers 1116 corresponding to physical locations 1114. The sequence numbers 1116, in general, identify a time, temporal order, and/or sequence that the direct cache module 116 and/or the storage controller 104 write data to a sequential log-based writing structure of the cache 102. Each sequence number 1116 is unique. In certain embodiments, the sequence number 1116 is a monotonically increasing number having a domain larger than the maximum number of elements that can be assigned sequence numbers 1116. In various embodiments, a sequence number 1116 may include a timestamp, a block or packet number, a region number, or the like. For example, in one embodiment, the storage controller 104 assigns a sequence number and/or records a timestamp for an erase block or other region as the storage controller 104 adds the erase block or other region to a sequential log-based writing structure of the cache 102. In a further embodiment, the storage controller 104 assigns a sequence number and/or records a timestamp for a block, such as a packet, sector, page, ECC chunk, or the like, as the block is written to a sequential log-based writing structure of the cache 102. As described above with regard to FIG. 2, the storage controller 104 may use timestamp and/or other sequence information to replay the sequence of changes made to an index or log-based writing structure to reestablish the most recent state of the cache 102, or the like.

FIG. 11C depicts another embodiment of mapping structure entries 1118, 1120, 1122, 1124, 1126, 1128, 1130, 1132 and a cache membership map 1120*b*. FIG. 11C depicts one example of updates that the direct mapping module 716 may make to the mapping structure entry 1012 and that the membership metadata module 718 may make to the cache membership map 1120*a* to form the depicted cache membership map 1120*b*. In one embodiment, the direct mapping module 716 and the membership metadata module 718 may make the updates in response to the groomer module 704 selecting the logical or physical erase block for grooming having physical location 1114 of "50," which logical or physical erase block stores data corresponding to the logical addresses "004-059" of mapping structure entry 1012 (See FIG. 11B).

In the depicted example, upon the groomer module 704 selecting erase block having the physical location 114 of "50" for grooming, the frequent data module 730 determines that the pool indicator module 706 has set a frequency indicator for data at logical addresses "23," "40," and "50" within the range of logical addresses "004-059" from the mapping structure entry 1012. In the example, there is no dirty or invalid data in the range of logical addresses "004-059," and the data of the logical addresses "23," "40," and "50" is either in the frequent read pool 812 of the cache 102 or in the clean write pool 806 and marked as frequently accessed data, or the like.

The frequent data module 730, in the example, writes the data of logical addresses "23," "40," and "50" forward to the physical location 1114 of "20." In another embodiment, the write forward module 710 writes the data of logical addresses "23," "40," and "50" forward to the physical location 1114 of "20" in response to read requests for the data, or the like. The physical location 1114 of "20," in certain embodiments, is a logical erase block or other region at an append point of a sequential log-based writing structure of the cache 102, or the like.

The direct mapping module 716, in the example, updates the mapping structure 1100 by replacing the mapping structure entry 1012 with the mapping structure entries 1118, 1120, 1122, 1124, 1126, 1128, 1130, 1132, splitting the range of logical addresses "004-059" to represent the new physical location 1114 of "20" for the logical addresses "23,""40," and "50." Only the new mapping structure entries 1118, 1120, 1122, 1124, 1126, 1128, 1130, 1132 are depicted in FIG. 11C, for clarity. The mapping structure entries 1118, 1120, 1122, 1124, 1126, 1128, 1130, 1132 may be part of a larger mapping structure such as the mapping structure 1100 of FIG. 11A. The direct mapping module 716 maps the physical location 1114 of "20" to the pseudo identifier 1112 of "Y," with the entry 1120 mapping the logical address of "23" to the pseudo identifier 1112 and offset of "Y:80," the entry 1124 mapping the logical address of "40" to the pseudo identifier 1112 and offset of "Y:81," and the entry 1128 mapping the logical address of "50" to the pseudo identifier 1112 and offset of "Y:82." The cache membership map 1120*b* maps the pseudo identifier 1112 of "Y" to the physical location 1114 of "20" which is associated with the sequence number 1116 of "0729."

In one embodiment, the direct mapping module 716 and the membership metadata module 718 have a larger set of pseudo identifiers 1112 than physical locations 1114 so that there are enough pseudo identifiers 1112 to map evicted/unstored data to "NULL" or other invalid locations. As described above, with regard to FIG. 11A, the membership metadata module 718 may reuse or recycle pseudo identifiers 1112 once the membership metadata module 718 clears logical addresses associated with the pseudo identifiers 1112 from the mapping structure 1100 by reassigning the pseudo identifiers 1112 from "NULL" or other invalid physical locations 1114 to valid physical locations 1114, or the like.

In certain embodiments, where the write forward module 710 writes data of the logical addresses "23," "40," and "50," forward on a sequential log-based writing structure of the cache 102 in response to a read request for the data or the like, the cache membership map 1120*b* may continue to map the pseudo identifier 1112 of "K" to the physical location 1114 of "50" until the groomer module 704 erases, clears, or otherwise recovers storage capacity of the physical location 1114 of "50." In one embodiment, the direct mapping module 716 and/or the membership metadata module 718 updates the physical location 1114 associated with the pseudo identifier 1112 of "K" in the cache membership map 1120*b* to "NULL" or to another invalid physical location 1114 in response to the groomer module 704 recovering storage capacity of the physical location 1114 of "50."

Instead of removing the entries 1118, 1122, 1126, 1130 for the logical addresses of the evicted data, in the depicted embodiment, the membership metadata module 718 maintains the entries 1118, 1122, 1126, 1130 as membership metadata, indicating that the cache 102 previously stored the evicted data. By setting the physical location 1114 associated with the evicted data to "NULL" without removing the entries associated with the evicted data from the mapping structure 1100, in certain embodiments, the membership metadata module 718 maintains the membership metadata and updates the status of the evicted data without accessing or locking the mapping structure 1100.

Entries with membership metadata may also inform the read pool module 604 and/or the eviction module 732 that data was prematurely evicted from the cache 102. As described above with regard to the membership metadata module 718 of FIG. 7, for example, the read pool module 604 may place data directly in the frequent read pool, bypassing the recent read pool, in response to a subsequent read request (or a threshold number of read requests) for evicted data based on membership metadata indicating that the data was recently evicted, or the like. Maintaining membership metadata indicating when the eviction module 732 evicted data from the cache can increase the efficiency of the eviction module 732 and allow the eviction module 732 to make more intelligent, informed eviction decisions.

Use of the cache membership map 1120b, in a further embodiment, allows the mapping structure 1100 to become unsynchronized with a validity map or with other valid/invalid indicators that the pool indicator module 706 maintains. In certain embodiments, as described above with regard to FIG. 11A, the membership metadata module 718 may scan the mapping structure 1100 and/or the cache membership map 1120b at intervals to update entries. In one embodiment, the membership metadata module 718 scans and updates the mapping structure 1100 and/or the cache membership map 1120b to synchronize with a validity map or with other valid/invalid indicators that the pool indicator module 706 maintains.

By allowing the mapping structure 1100 and a validity map or other valid/invalid indicators to become at least partially unsynchronized, in certain embodiments, the direct cache module 116 may reduce access to the mapping structure 1100, maintain membership metadata for evicted data or other un-stored data, and/or reduce access to the storage media 110 while maintaining validity information using the cache membership map 1120b and/or using a validity map of the pool indicator module 706. In other embodiments, instead of using a cache membership map 1120b and maintaining membership metadata in the mapping structure 1100, the direct mapping module 716 may keep the mapping structure 1100 substantially synchronized with a validity map or other valid/invalid indicators of the pool indicator module 706 such that membership in the mapping structure 1100 indicates membership in the cache 102.

Therefore, depending on whether or not the direct cache module 116 keeps the mapping structure 1100 synchronized with a validity map or other valid/invalid indicators for data of the cache 102, there may be different ways of determining that data of the cache is invalid, or that the data is not in the cache 102. First, if the direct cache module 116 keeps the mapping structure 1100 synchronized with a validity map, if one or more logical addresses for the data are not in the mapping structure 1100, then the data is either invalid or is not stored in the cache 102. Second, if the direct cache module 116 allows the mapping structure 1100 to continue to map invalid data and/or evicted data, if one or more logical addresses for the data are in the mapping structure 1100 and the cache membership map 1110 maps the one or more logical addresses to a valid physical location 1114 of the cache 102, then a validity map or another valid/invalid indicator indicates whether or not the data is valid. Third, if the direct cache module 116 allows the mapping structure 1100 to continue to map invalid data and/or evicted data, if one or more logical addresses for the data are in the mapping structure 1100 and the cache membership map 1110 maps the one or more logical addresses to an invalid or NULL physical location 1114, then the data is either invalid or not stored in the cache 102.

Figure 11D:
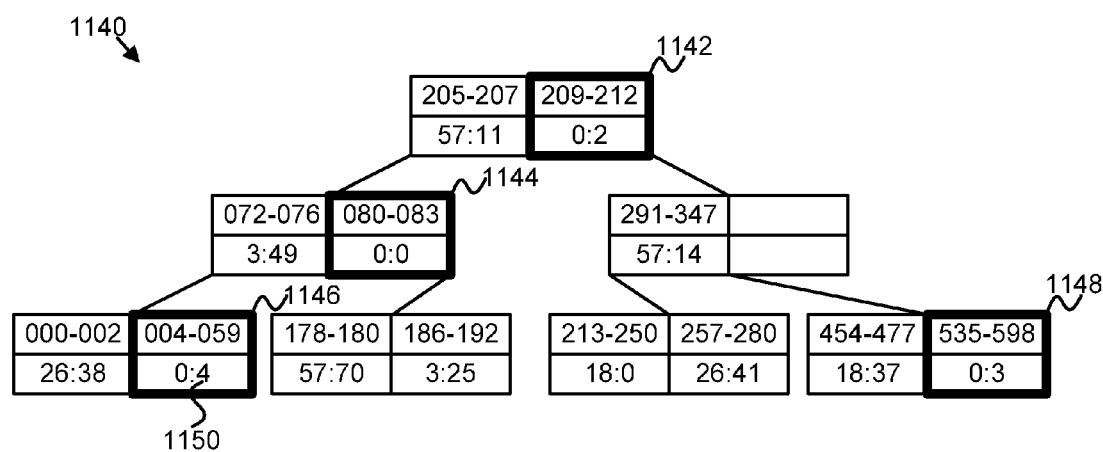
FIG. 11D is a schematic block diagram illustrating one embodiment of a mapping structure in accordance with the present invention.

FIG. 11D depicts one embodiment of a mapping structure 1140 that stores membership metadata 1150 in entries 1142, 1144, 1146, 1148. The entries 1142, 1144, 1146, 1148 that store membership metadata 1150 instead of a valid physical address are highlighted in FIG. 11D for clarity. The mapping structure 1140, in certain embodiments, may be substantially similar to the mapping structure 1100 of FIG. 11A, but without a cache membership map 1110. In other embodiments, the mapping structure 1140 may be used in conjunction with a cache membership map 1110 as described above. The mapping structure 1140, in one embodiment, may represent a subset of a larger mapping structure.

In the depicted embodiment, the membership metadata module 718 stores membership metadata 1150 for ranges of logical addresses in the entries 1142, 1144, 1146, 1148 of the mapping structure 1140. The cache 102 does not currently store data for the logical address ranges of entries 1142, 1144, 1146, 1148, as indicated by an invalid or out-of-range physical location stored in entries 1142, 1144, 1146, 1148, described in greater detail below. For example, the eviction module 732 may have previously evicted data for the logical address ranges of entries 1142, 1144, 1146, 1148, the read request module 720 may have not yet admitted data for the logical address ranges of entries 1142, 1144, 1146, 1148 into the cache 102, or the like.

The format for entries of the mapping structure 1140, in the depicted embodiment, is region:offset, where the offset indicates a relative position of data within the corresponding region. In one embodiment, the region comprises a logical erase block, physical erase block, or the like and the offset comprises a packet, logical or physical page. ECC chunk, block, sector, or the like within the region. In the depicted embodiment, a value of zero (the "0:" in the region fields of entries 1142, 1144, 1146, 1148) is an invalid or out-of-range value for a region, and a value of zero in the entries 1142, 1144, 1146, 1148 indicates that the cache 102 does not currently store data of the corresponding ranges of logical addresses. The offset corresponding to the region with a value of zero, instead of indicating an offset, comprises membership metadata 1150, such as a frequency count, a pool indicator (e.g. a read/write indicator, a dirty/clean indicator, a recent/frequent indicator, a valid/invalid indicator, or the like), a sequence number, or the like. In the depicted embodiment, the offset for the entries 1142, 1144, 1146, 1148 comprises a frequency count such as a read request count for the corresponding ranges of logical addresses. In other embodiments, instead of replacing a physical location with membership metadata 1150, the entries 1142, 1144, 1146, 1148 of the membership map 1140 may include one or more additional fields for storing membership metadata 1150 separate from a physical location field.

In one embodiment, the membership metadata module 718 cooperates with the direct mapping module 716 to maintain entries 1142, 1144, 1146, 1148 in the mapping structure 1140 for ranges of logical addresses for which the cache 102 does not currently store data. The membership metadata module 718, in certain embodiments, may add an entry 1142, 1144, 1146, 1148 with membership metadata 1150 to the mapping structure 1140 in response to the storage request module 602 receiving a read request for a range of one or more logical addresses, even though the data for the read request is not added to the cache. Instead of adding the data of the requested range of logical addresses to the cache 102, in one embodiment, the membership metadata module 718 increments a frequency count such as a read request count in an entry 1142, 1144, 1146, 1148 until the frequency count satisfies a preadmission threshold. The read request module 720, in response to the frequency count of an entry 1142, 1144, 1146, 1148 satisfying the preadmission threshold, stores data of the corresponding range of logical addresses from the backing store 118 in the cache 102 and the membership metadata module 718 transitions the corresponding entry 1142, 1144, 1146, 1148 from storing a frequency count or other membership metadata 1150 to storing a valid physical location. For example, in the depicted embodiment, the membership metadata module 718 may change the region:offset values of an entry 1142, 1144, 1146, 1148 from an invalid value (e.g. zero, NULL) and a frequency count to the actual region and offset of the physical location of the corresponding data in the cache 102.

The membership metadata module 718, in another embodiment, in response to the eviction module 732 evicting data of a range of logical addresses from the cache 102, transitions a corresponding entry 1142, 1144, 1146, 1148 from storing a valid physical location to storing membership metadata 1150, such as a frequency count, pool indicator, sequence number, or the like. For example, the membership metadata module 718 may change the region:offset values of an entry 1142, 1144, 1146, 1148 from a valid region value to an invalid value (e.g. zero, NULL) and set a frequency count to zero so that the membership metadata module 718 may increment the frequency count to track read requests, write requests, or the like. In response to the frequency count for an entry 1142, 1144, 1146, 1148 satisfying a readmission threshold, the read request module 720 may readmit previously evicted data of an entry 1142, 1144, 1146, 1148 back into the cache 102, and the membership metadata module 718 may transition the entry 1142, 1144, 1146, 1148 back to storing a valid physical location for the data in the cache 102. While the membership metadata module 718, in the depicted embodiment, uses an invalid physical location of zero to indicate that an entry 1142, 1144, 1146, 1148 corresponds to data the cache does not currently store and that the entry 1142, 1144, 1146, 1148 stores membership metadata 1150, in other embodiments, each entry 1142, 1144, 1146, 1148 may include additional fields for membership metadata 1150, may include a flag or other indicator that the cache 102 does not currently store data of the corresponding range of logical addresses, or the like.

Figure 12:
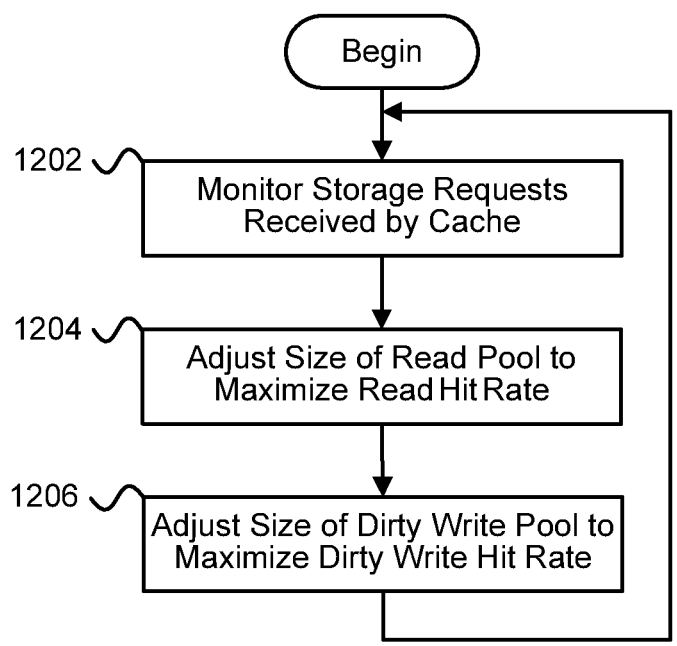
FIG. 12 is a schematic flow chart diagram illustrating one embodiment of a method for managing contents of a cache in accordance with the present invention.

FIG. 12 depicts one embodiment of a method 1200 for managing contents of a cache 102. The method 1200 begins and the storage request module 602 monitors 1202 storage requests received by the cache 102. The read pool module 604 adjusts 1204 a size of a read pool of the cache 102 to maximize a read hit rate of the cache 102 based on the monitored 1202 storage requests. The dirty write pool module 606 adjusts 1206 a size of a dirty write pool of the cache 102 to maximize a dirty write hit rate of the cache 102 based on the monitored 1202 storage requests. The method 1200 continues, in the depicted embodiment, and the storage request module 602 continues to monitor 1202 storage requests.

Figure 13:
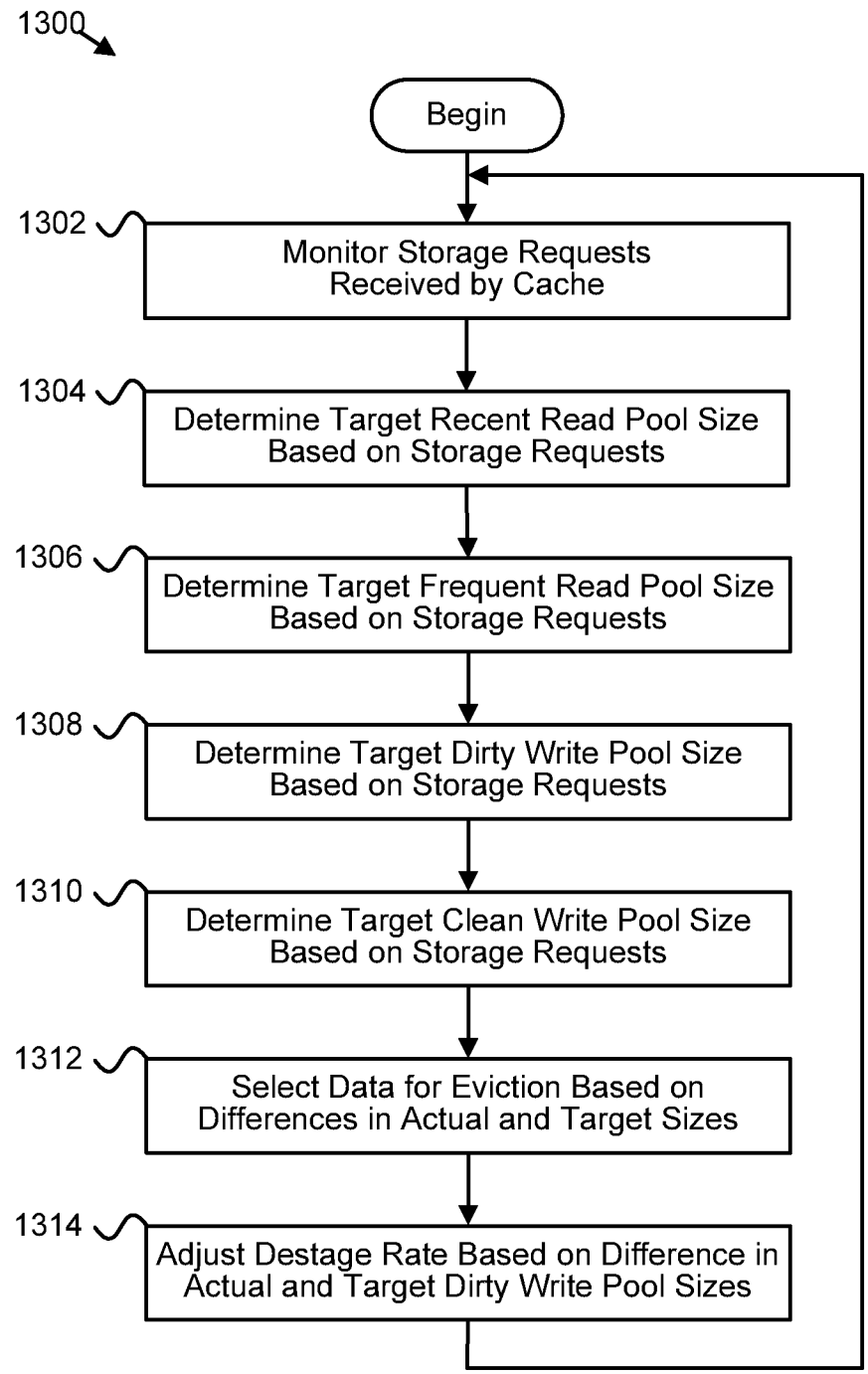
FIG. 13 is a schematic flow chart diagram illustrating another embodiment of a method for managing contents of a cache in accordance with the present invention.

FIG. 13 depicts another embodiment of a method 1300 for managing contents of a cache 102. The method 1300 begins and the storage request module 602 monitors 1302 storage requests received by the cache 102. The recent pool module 724 determines 1304 a target recent read pool size for a recent read pool of the cache 102 based on the monitored 1302 storage requests. The frequent pool module 726 determines 1306 a target frequent read pool size for a frequent read pool of the cache 102 based on the monitored 1302 storage requests. The dirty write pool module 606 determines 1308 a target dirty write pool size for a dirty write pool of the cache 102 based on the monitored 1302 storage requests. The clean write pool module 702 determines 1310 a target clean write pool size for a clean write pool of the cache 102 based on the monitored 1302 storage requests.

The eviction module 732, in the depicted embodiment, selects 1312 data for eviction from the cache 102 and/or adjusts an eviction rate based on a difference between an actual size of the recent read pool and the recent read pool size, a difference between an actual size of the frequent read pool and the target frequent read pool size, and/or a difference between an actual size of the clean read pool and the target clean read pool size, so that the actual sizes tend to follow the target sizes over time. The destage module 708 adjusts 1314 a destage rate at which the destage module 708 destages data from the dirty write pool to the backing store 118 based on a difference between an actual size of the dirty write pool and the target dirty write pool size and/or a difference between an actual size of the clean write pool and the target clean write pool size. The method 1300 continues, in the depicted embodiment, and the storage request module 602 continues to monitor 1302 storage requests.

Figure 14:
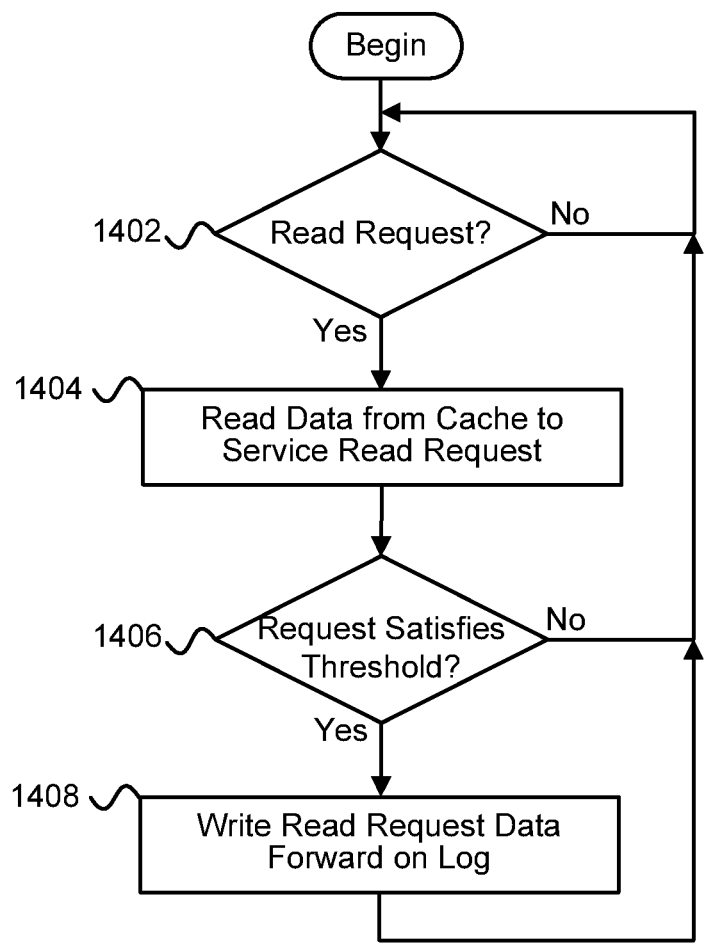
FIG. 14 is a schematic flow chart diagram illustrating one embodiment of a method for preserving read data in a cache in accordance with the present invention.

FIG. 14 depicts one embodiment of a method 1400 for preserving read data in a cache 102. The method 1400 begins and the storage request module 602 determines 1402 whether the cache 102 has received a read request. If the storage request module 602, in the depicted embodiment, does not detect 1402 a storage request, the method 1400 continues and the storage request module 602 continues to monitor 1402 read requests.

If the storage request module 602 determines 1402 that the cache 102 has received a read request, the read request module 720 reads 1404 the read request data from the cache 102 to service the read request. The read pool module 604 determines 1406 whether the read request satisfies a frequent read threshold. In the depicted embodiment, if the read pool module 604 determines 1406 that the read request does not satisfy the frequent read threshold, the method 1400 continues and the storage request module 602 continues to monitor 1402 read requests.

If the read pool module 604 determines 1406 that the read request satisfies the frequent read threshold, the write forward module 710 writes 1408 the read request data forward on a log of the cache 102. In one embodiment, the write forward module 710 reduces a number of reads from the storage media 110 of the cache 102 by writing forward data that the read request module 720 has already read 1404 from the storage media 110, instead of reading the data from the storage media 110 again or allowing the frequent data module 730 to read the data from the storage media 110. The method 1400, in the depicted embodiment, continues and the storage request module 602 continues to monitor 1402 read requests.

Figure 15:
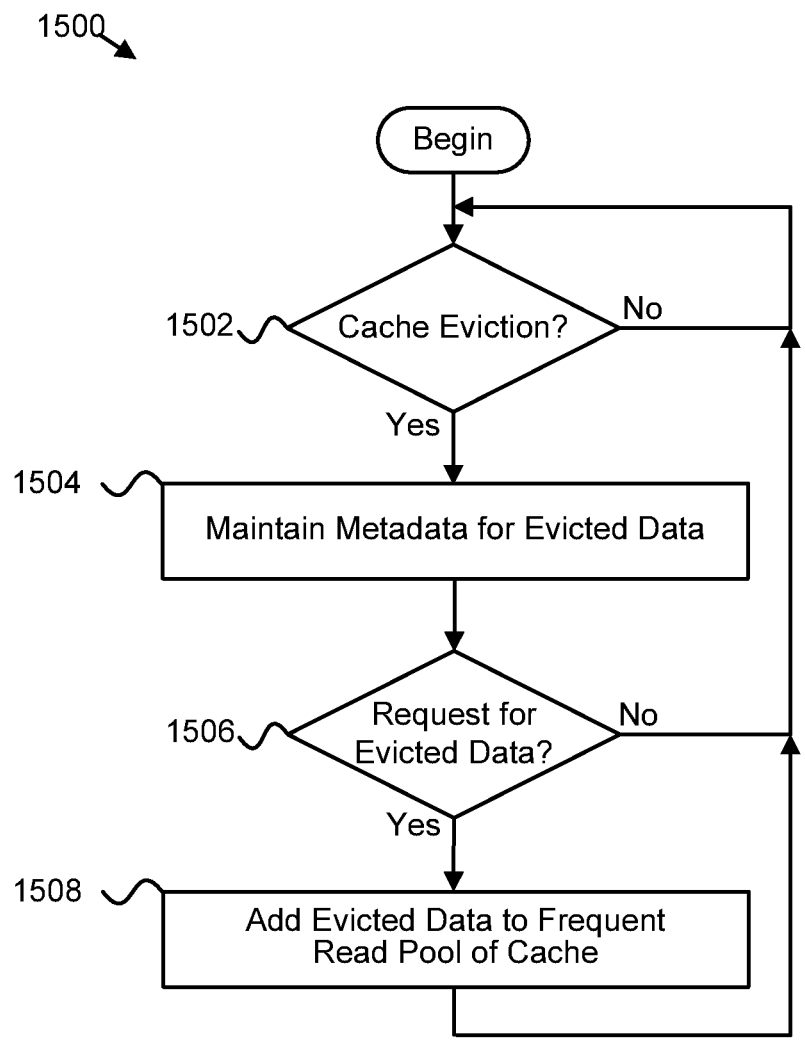
FIG. 15 is a schematic flow chart diagram illustrating one embodiment of a method for maintaining metadata for evicted data in accordance with the present invention.

FIG. 15 depicts one embodiment of a method 1500 for maintaining metadata for evicted data. In the depicted embodiment, the method 1500 begins and the membership metadata module 718 determines 1502 whether the eviction module 732 has evicted data from the cache 102. If the membership metadata module 718 determines 1502 that the eviction module 732 has not evicted data from the cache 102, the membership metadata module 718 continues to monitor 1502 cache evictions.

If the membership metadata module 718, in the depicted embodiment, determines 1502 that the eviction module 732 has evicted data from the cache 102, the membership metadata module 718 maintains 1504 metadata for the evicted data. Maintaining 1504 metadata, in one embodiment, may include updating a mapping structure, such as the mapping structure 1100 and the cache membership map 1110, 1120 of FIGS. 11A and 11B or the like, to indicate that the cache 102 no longer stores the evicted data and that the data has been evicted. In a further embodiment, the metadata may include a pool membership indicator or the like indicating from which data pool the eviction module 732 evicted the data, a sequence number, or other membership metadata.

The storage request module 602, in the depicted embodiment, determines 1506 whether there is a subsequent read request for the evicted data. For example, in one embodiment, the storage request module 602 may determine 1506 whether there is a subsequent read request for the evicted data within a predefined period of time, at least a readmission threshold number of read requests for the evicted data, or the like. If the storage request module 602 determines 1506 that there is not a subsequent read request for the evicted data, that a number of read requests for the evicted data does not satisfy a readmission threshold, or the like, the membership metadata module 718 continues to monitor 1502 cache evictions. If the storage request module 602 determines 1506 that there is a subsequent read request for the evicted data, that a number of read requests for the evicted data satisfies a readmission threshold, or the like, the read pool module 604 adds 1508 the evicted data directly to a frequent read pool of the cache 102, instead of adding the evicted data to a recent read pool of the cache 102, or the like. The method 1500 continues and the membership metadata module 718 continues to monitor 1502 cache evictions. While the method 1500 illustrates maintaining metadata for evicted data, in other embodiments, the method 1500 or a similar method may be applied to maintaining metadata for data that has not yet been stored in the cache 102, and the read pool module 604 may add 1508 the data to a frequent read pool or another read pool of the cache 102 in response to a subsequent read request for the data, a number of read requests for the data satisfying a preadmission threshold, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing contents of a cache, the method comprising:
   receiving a read request for data stored in a non-volatile cache;
   reading the data of the read request from a sequential log-based writing structure of the cache into volatile memory to service the read request;
   determining whether the read request satisfies a frequent read threshold for the cache; and
   writing the data of the read request forward on the sequential log-based writing structure from the volatile memory without re-reading the data of the read request from a non-volatile storage medium of the cache in response to determining that the read request satisfies the frequent read threshold.

2. The method of claim 1, further comprising invalidating a previous version of the data in the sequential log-based writing structure of the non-volatile cache in response to writing the data forward on the sequential log-based writing structure.

3. The method of claim 1, further comprising transitioning the data of the read request from a recent read pool to a frequent read pool in response to determining that the read request satisfies the frequent read threshold.

4. The method of claim 1, further comprising buffering the data of the read request with other data satisfying the frequent read threshold in a storage region and writing the storage region of the buffered data forward on the sequential log-based writing structure in response to filling the storage region.

5. The method of claim 1, wherein writing the data of the read request forward comprises combining data of the read request with data queued to be written to the non-volatile storage medium and writing the combined data to an append point of the sequential log-based writing structure.

6. The method of claim 1, wherein writing the data of the read request forward comprises appending the data of the read request to a separate append point of the sequential log-based writing structure, the separate append point associated with data satisfying the frequent read threshold.

7. The method of claim 1, wherein writing the data of the read request forward comprises writing the data of the read request to a separate sequential log-based writing structure, the separate sequential log-based writing structure associated with data satisfying the frequent read threshold.

8. The method of claim 7, further comprising recovering storage capacity from the separate sequential log-based writing structure less frequently than from an ingestion sequential log-based writing structure.

9. The method of claim 7, wherein the data of the read request is written to one of a plurality of separate sequential log-based writing structures based on a read request frequency count for the data of the read request such that the plurality of separate sequential log-based writing structures are grouped based on frequency of access.

10. The method of claim 1, wherein in response to writing forward frequently accessed data from a storage region, the storage region comprises solely evictable data such that a storage recovery process recovers the storage region without relocating data of the storage region.

11. The method of claim 1, wherein the volatile memory comprises volatile memory of a host device in communication with the non-volatile cache.

12. An apparatus for managing contents of a cache, the apparatus comprising:
   a read request module configured to cause data stored in a non-volatile storage medium of a cache to be read from a sequential log-based writing structure of the cache into volatile memory in response to a read request for the data;
   a read pool module configured to determine whether the read request satisfies a frequent read threshold; and
   a write forward module configured to write the data forward from the volatile memory to an append point of the sequential log-based writing structure of the cache without an additional read transaction with the non-volatile storage medium of the cache in response to the read pool module determining that the read request satisfies the frequent read threshold.

13. The apparatus of claim 12, wherein the write forward module is configured to cause the data of the read request to be copied to one of a plurality of separate sequential log-based writing structures of the cache, the one of the plurality of separate sequential log-based writing structures selected based on a read request frequency count for the data of the read request.

14. A computing system having a memory and one or more processors for managing contents of a cache, the computing system comprising:
   a storage controller for a non-volatile solid-state storage device, the non-volatile solid-state storage device in communication with a processor over one or more communications buses;

a cache controller in communication with the storage controller, the cache controller comprising,
- a storage request module configured to monitor read requests received for the cache controller;
- a read request module configured to cause data stored in a non-volatile storage medium of the solid-state storage device to be read from a sequential log-based writing structure of the non-volatile storage medium into volatile memory in response to the storage request module monitoring a read request for the data, the data read into the volatile memory to service the read request;
- a read pool module configured to determine whether the read request satisfies a frequent read threshold; and
- a write forward module configured to cause the data of the read request to be written forward on the sequential log-based writing structure from the volatile memory without an additional read transaction with the non-volatile storage medium in response to the read pool module determining that the read request satisfies the frequent read threshold.

15. The computing system of claim 14, further comprising a host computer system, the host computer system comprising the processor, wherein the storage controller and the cache controller comprise one or more device drivers executing on the processor of the host computer system.

16. A computer program product comprising a non-transitory computer readable storage medium storing computer usable program code executable to perform operations for managing contents of a cache, the operations comprising:
- monitoring read requests received for a non-volatile cache;
- causing data of a read request to be read from a sequential log-based writing structure of the cache into volatile memory to service the read request;
- determining whether the read request satisfies a frequent read threshold for the cache; and
- causing data of the read request to be written forward to an append point of the sequential log-based writing structure of the cache without re-reading the data of the read request from a non-volatile storage medium of the cache in response to determining that the read request satisfies the frequent read threshold.

17. The computer program product of claim 16, wherein the operations further comprise identifying the data of the read request as frequently accessed data in response to determining that the read request satisfies the frequent read threshold.

18. An apparatus for managing contents of a cache, the apparatus comprising:
- means for receiving a read request for data stored in a non-volatile cache;
- means for reading the data from a storage region of a sequential log-based writing structure of the cache into volatile memory to service the read request; and
- means for writing the data from the volatile memory forward to a different storage region of the sequential log-based writing structure of the cache without re-reading the data of the read request from a non-volatile storage medium of the cache in response to determining that the read request for the data satisfies a frequent read threshold for the cache.

19. The apparatus of claim 18, further comprising means for recovering storage capacity of the entire storage region subsequent to writing the data of the read request to the different storage region.

* * * * *